United States Patent [19]

Schultz et al.

[11] Patent Number: 5,592,648

[45] Date of Patent: Jan. 7, 1997

[54] METHOD FOR DEVELOPING PHYSICAL DISK DRIVE SPECIFIC COMMANDS FROM LOGICAL DISK ACCESS COMMANDS FOR USE IN A DISK ARRAY

[75] Inventors: Stephen M. Schultz, Houston; David S. Schmenk, The Woodlands; E. David Neufeld, Tomball; David L. Grant, Houston; David L. Flower, Tomball, all of Tex.

[73] Assignee: Compaq Computer Corporation, Houston, Tex.

[21] Appl. No.: 163,011

[22] Filed: Dec. 7, 1993

Related U.S. Application Data

[62] Division of Ser. No. 145,029, Oct. 28, 1993, Pat. No. 5,440,716, which is a continuation of Ser. No. 431,748, Nov. 3, 1989, abandoned.

[51] Int. Cl.⁶ .................................................. G06F 7/22
[52] U.S. Cl. ........................ 395/441; 395/438; 395/439; 395/825; 360/69; 364/DIG. 1
[58] Field of Search ................................ 364/200, 900; 360/69 MS; 395/425, 725, 441, 438, 439

[56] References Cited

U.S. PATENT DOCUMENTS

| | | | |
|---|---|---|---|
| 4,215,400 | 7/1980 | Denko | 395/404 |
| 4,276,595 | 6/1981 | Brereton et al. | 395/375 |
| 4,454,595 | 6/1984 | Cage | 395/872 |
| 4,612,613 | 9/1986 | Gershenson | 395/894 |
| 4,633,392 | 12/1986 | Vincent et al. | 395/284 |
| 4,660,141 | 4/1987 | Ceccon et al. | 395/829 |
| 4,773,004 | 9/1988 | Gershenson | 395/440 |
| 4,805,090 | 2/1989 | Coogan | 395/894 |
| 4,811,279 | 3/1989 | Bean et al. | 395/306 |
| 4,817,035 | 3/1989 | Timsit | 395/185.07 |
| 4,825,403 | 4/1989 | Gershenson | 360/52 |
| 4,825,404 | 4/1989 | Theus | 395/284 |
| 4,843,544 | 6/1989 | DeLac et al. | 395/250 |
| 4,849,929 | 7/1989 | Timsit | 395/182.03 |
| 4,855,903 | 8/1989 | Carleton et al. | 395/200.05 |
| 4,885,683 | 12/1989 | Coogan | 395/183.12 |
| 4,888,691 | 12/1989 | George et al. | 395/700 |
| 4,910,614 | 3/1990 | Arai et al. | 360/69 |
| 4,951,248 | 8/1990 | Lynch | 395/402 |
| 4,980,850 | 12/1990 | Morgan | 395/497.03 |
| 5,014,237 | 5/1991 | Masters | 395/500 |
| 5,027,313 | 6/1991 | Culley | 395/497.03 |
| 5,163,131 | 11/1992 | Row et al. | 395/200.01 |
| 5,355,453 | 10/1994 | Row et al. | 395/200.09 |

OTHER PUBLICATIONS

Introduction to Redundant Inexpensive Disk Arrays (RAID), D. Patterson et al., Computer Science Division, Univ. Cal.—Berkley, 1989.

(List continued on next page.)

*Primary Examiner*—Tod R. Swann
*Assistant Examiner*—James Peikari
*Attorney, Agent, or Firm*—Pravel, Hewitt, Kimball & Krieger

[57] ABSTRACT

For use with a computer system having an intelligent mass storage disk array subsystem, including a microprocessor controller, a method for the distribution of data within the disk array based upon logical commands issued by the computer system. The disk controller reads a logical command and translates the commands into multiple drive specific commands, including drive physical parameter information such as head, sector and cylinder selection. The calculation of these physical parameters is based upon a number of factors including the operating system installed in the computer system, the type of interleave scheme, if any, specified by the computer system configuration, and disk specific parameters. The physical drive requests are then placed in a queue and executed by the microprocessor controller. The method also encompasses a method for creating a disk array configuration to be loaded on all disks within the array based on existing valid disk array information and configuration information maintained by the computer system.

11 Claims, 30 Drawing Sheets

OTHER PUBLICATIONS

A Case for Redundant Arrays of Inexpensive Disks (RAID), D. Patterson et al., Computer Science Division, Univ. Cal.—Berkley, Dec. 1987.

Considerations in the Design of a RAID Prototype, M. Schulze, Computer Science Div., Univ. Cal.—Berkley, Aug. 1988.

Two Papers on RAID, P. Chen et al., Computer Science Div., Univ. Cal.—Berkley, Dec. 1988.

Disk Array Considerations, D. Anderson et al., Imprimis Technology, Inc., Dat Unknown.

Disk Arrays: Performance and Data Availability, W. Moren, Cipricio, Inc., Presented May 24, 1989 at IEEE Systems Design and Networks Conference, Santa Clara, CA.

How Reliable is RAID?, M. Schulze et al., Computer Sciences Div., Univ. Cal.—Berkley, reprinted by IEEE 1989.

Coding Techniques for Handling Failures in Large Disk Arrays, G. Gibson et al., Computer Sciences Div., Univ. Cal.—Berkley, Dec. 1988.

Industrial Participation in RAID/XPRS, R. Katz et al., Computer Science Div., Univ. Cal.—Berkley, Date believed to be Sep. 2, 1988.

Some Design Issues of Disk Arrays, S. Ng., IBM Research Div., reprinted by IEEE 1989.

Pacstor Shows Subsystem with "Fail–Safe" Software, S. Kovsky, Computer Science News, Apr. 11, 1988.

Dataquest Research Newsletter, Dataquest, Inc., May 1988.

Pacstor, Inc. Promotional Literature on Integra I and III Disk Subsystems, 1989.

Parallel Disk Array Controller Promotional Literature, Ciprico, Inc., Data unknown.

Synchronized 5 ¼ in. Winchester Drives . . . , Electronic Data News, Nov. 26, 1987.

Breaking the Data–Rate Logjam with Arrays of Small Disk Drives, pp. 97099, Electronics, Feb. 1989.

Disk Arrays: Here Come the Disk Drive Sextuplets, J. Dodge, Nov. 1, 1989 Electronic Business, pp. 126–130.

1776, Inc. Promotional Literature for Patrick Henry Disk Array Subsystem, 1989.

Disk Arrays Promise Reliability, Better Access, D. Chandler, Oct. 17, 1988 PC Week, pp. 84, 92.

Disk Array Features 1–Gbyte Fault–Tolerant Storage, T. Williams, Jun. 15, 1988 Computer Design, p. 33.

SCSI–2 Controller Board Builds Parallel Disk Drive Arrays, D. Lieberman, Apr. 1, 1989 Computer Design, pp. 32, 36.

Parallel Disk Assembly Packs 1.5 Gbytes, runs at 4 Mbytes/s, N. Mokhoff, Nov. 12, 1987 Electronic Design, pp. 45–46.

Disk Array Forum, Proceedings of Conference held Sep. 18, 1989 in San Jose CA.

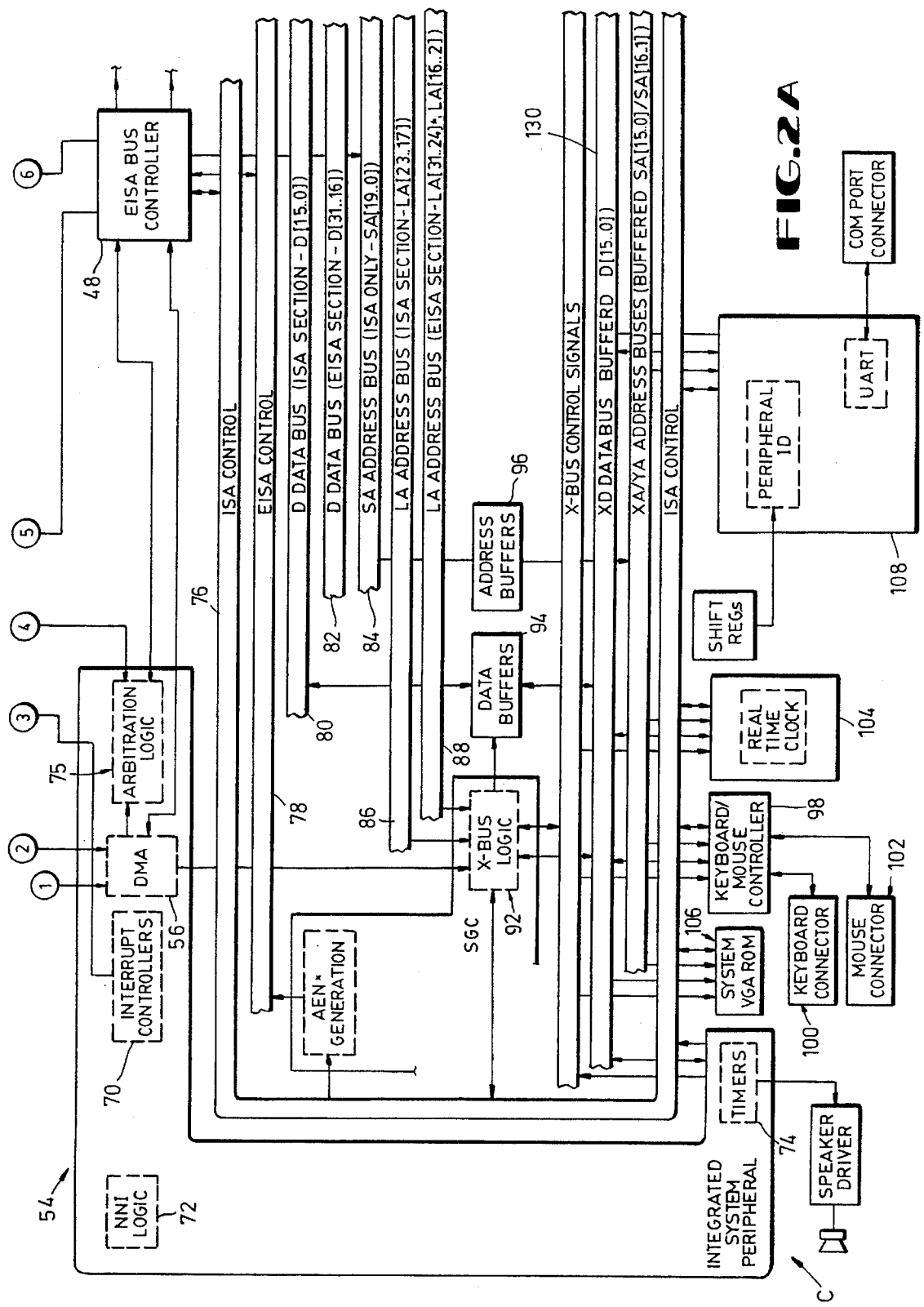

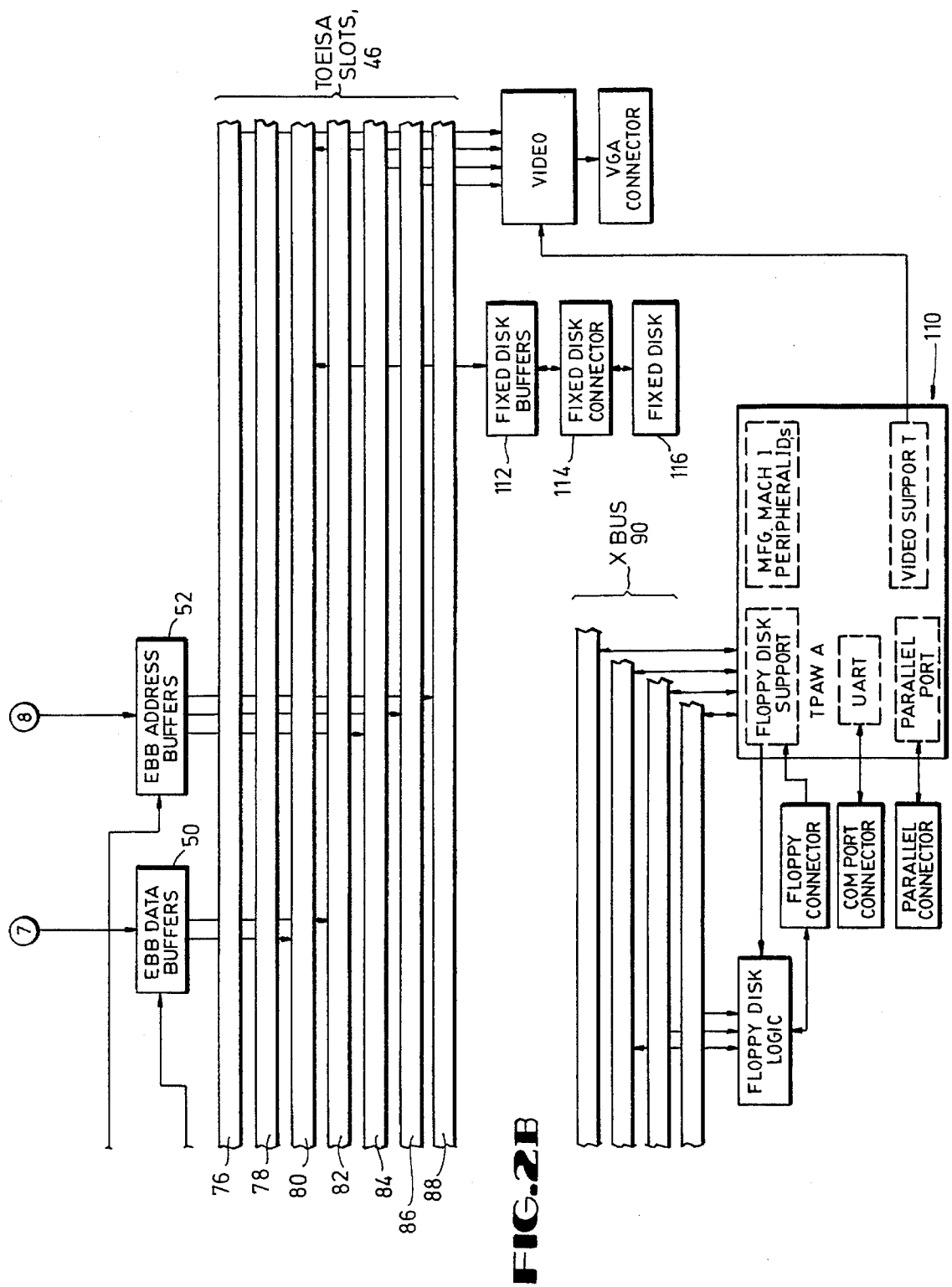

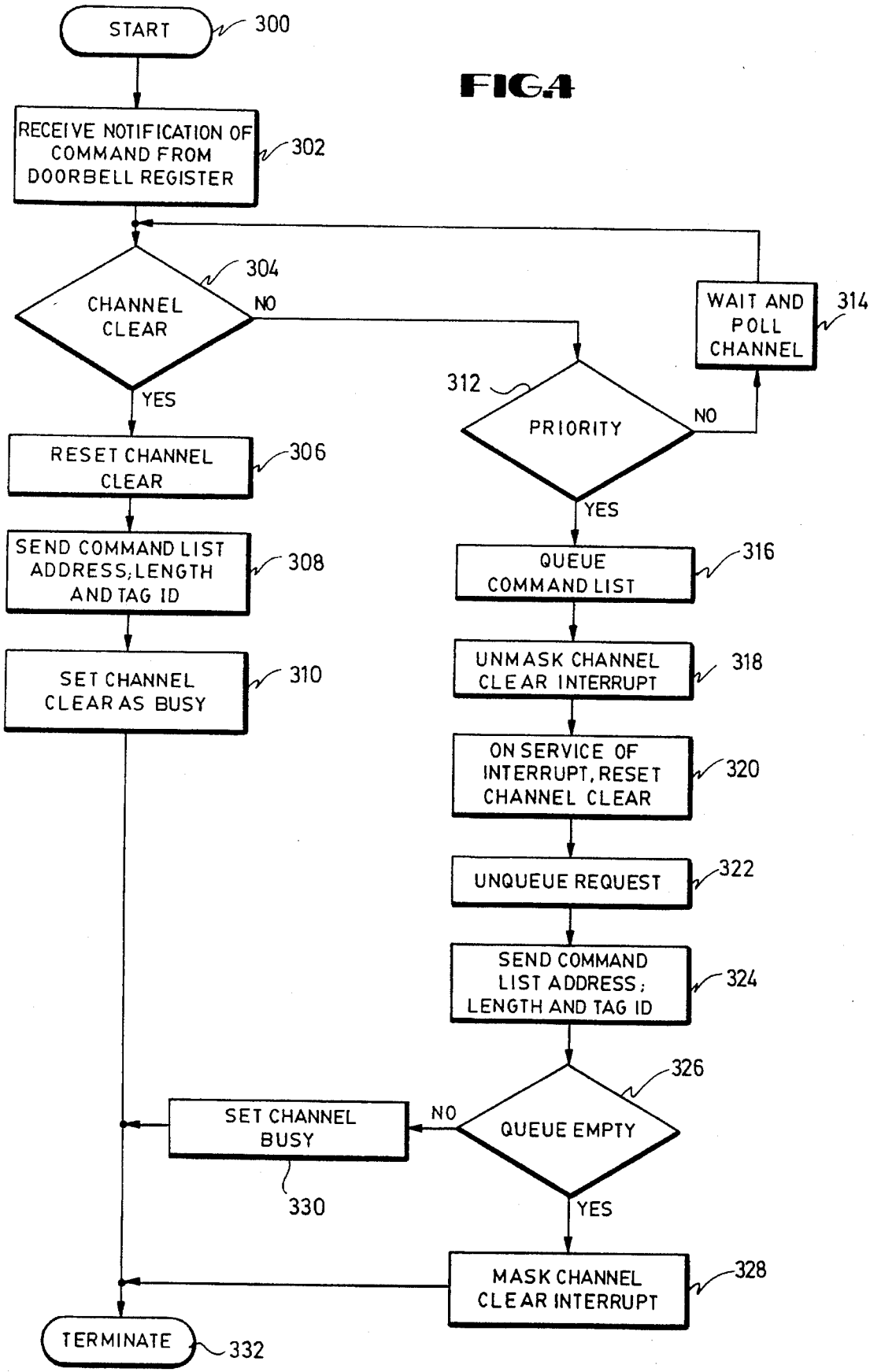

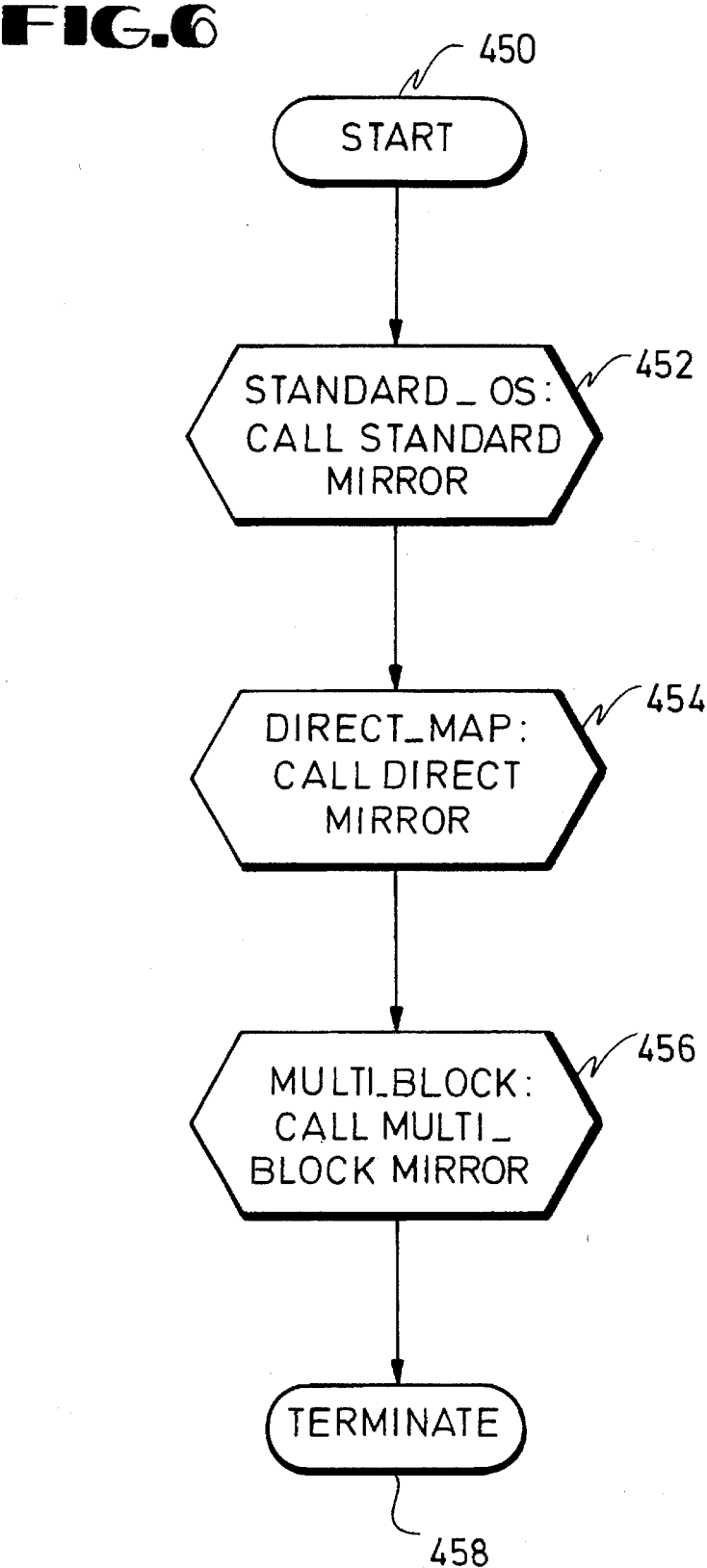

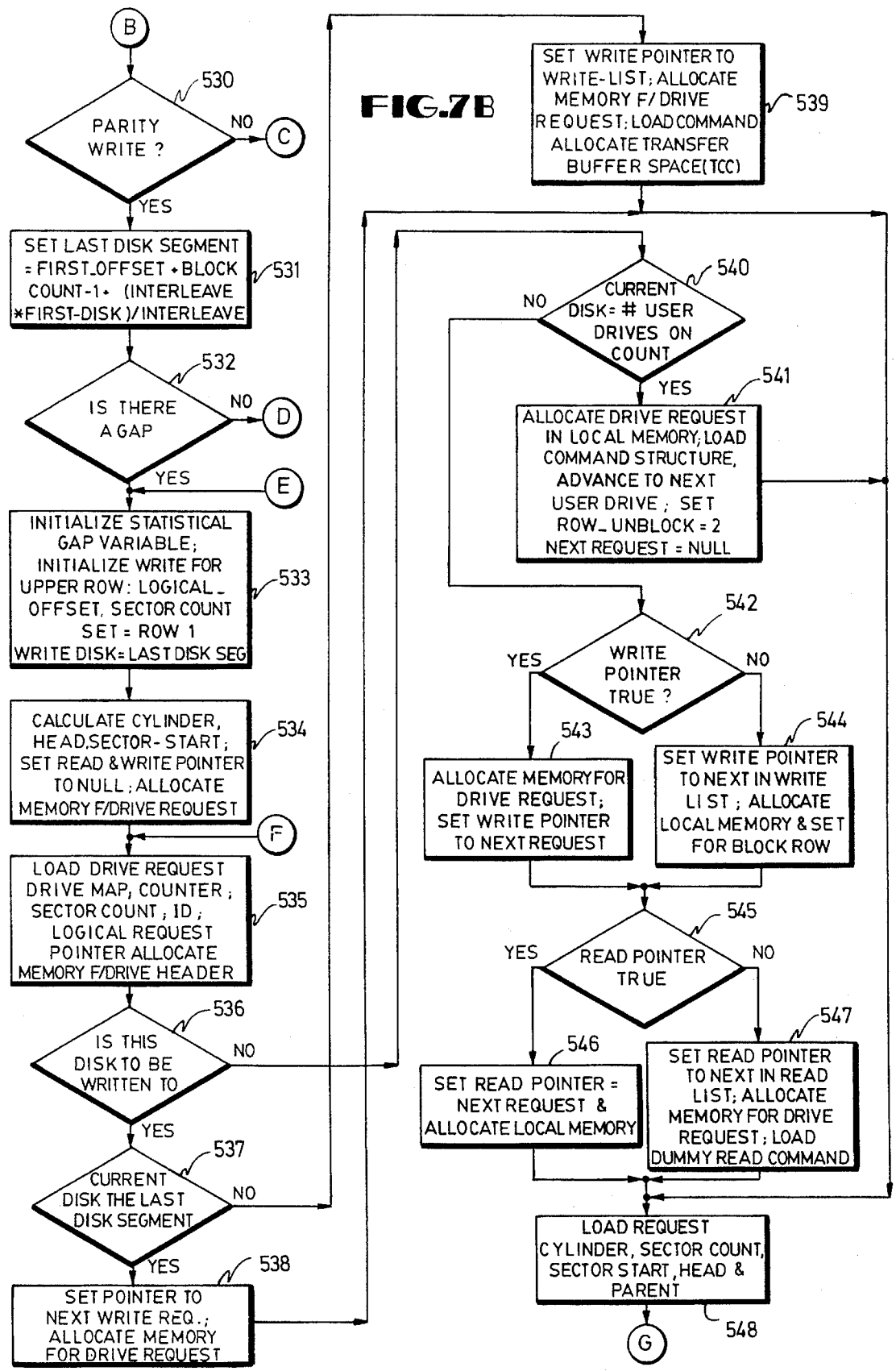

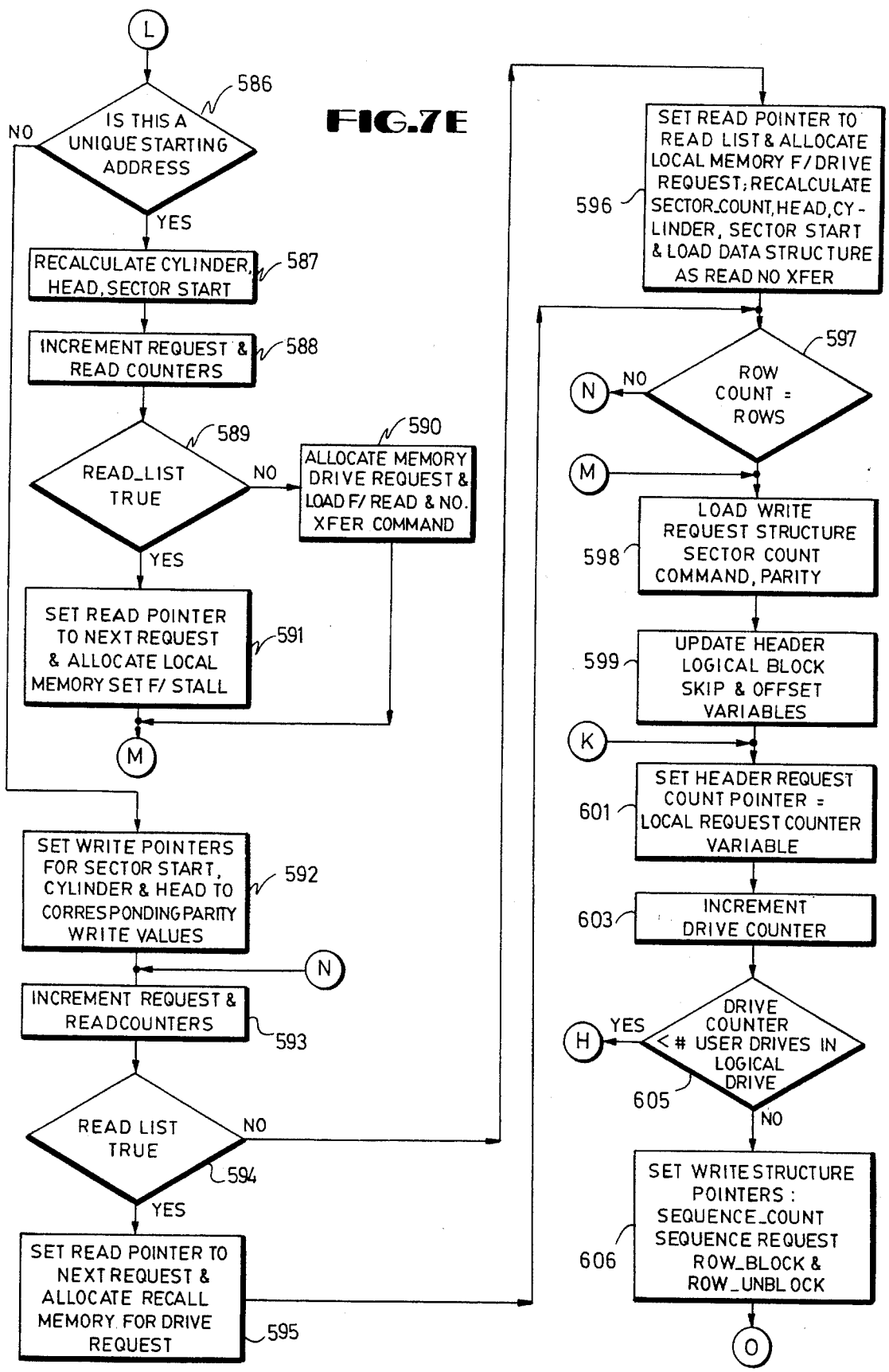

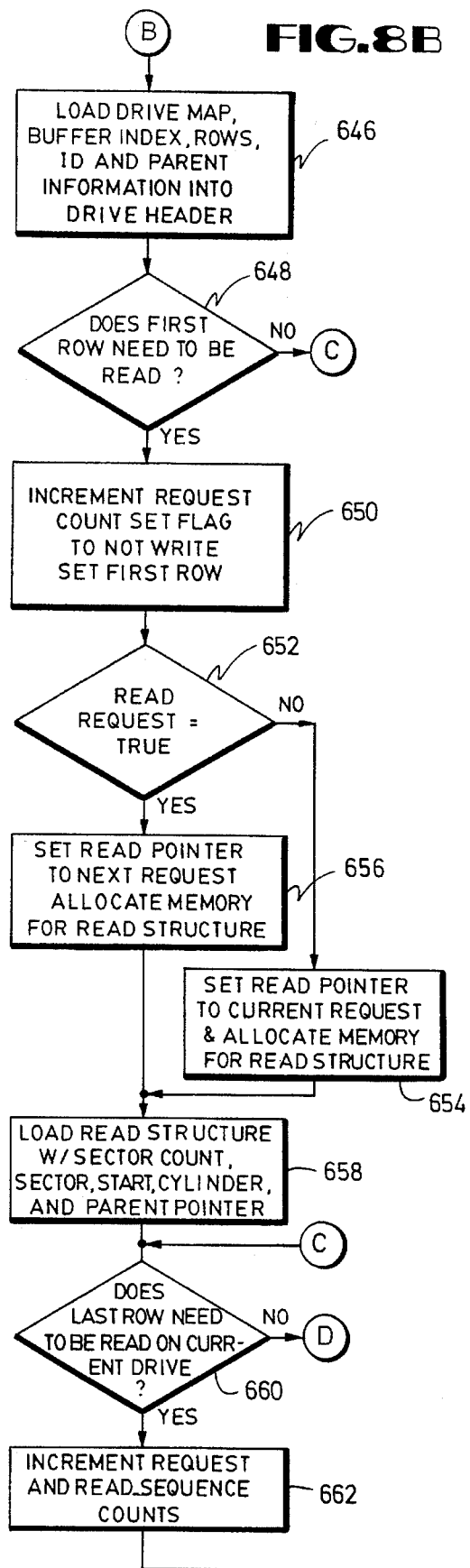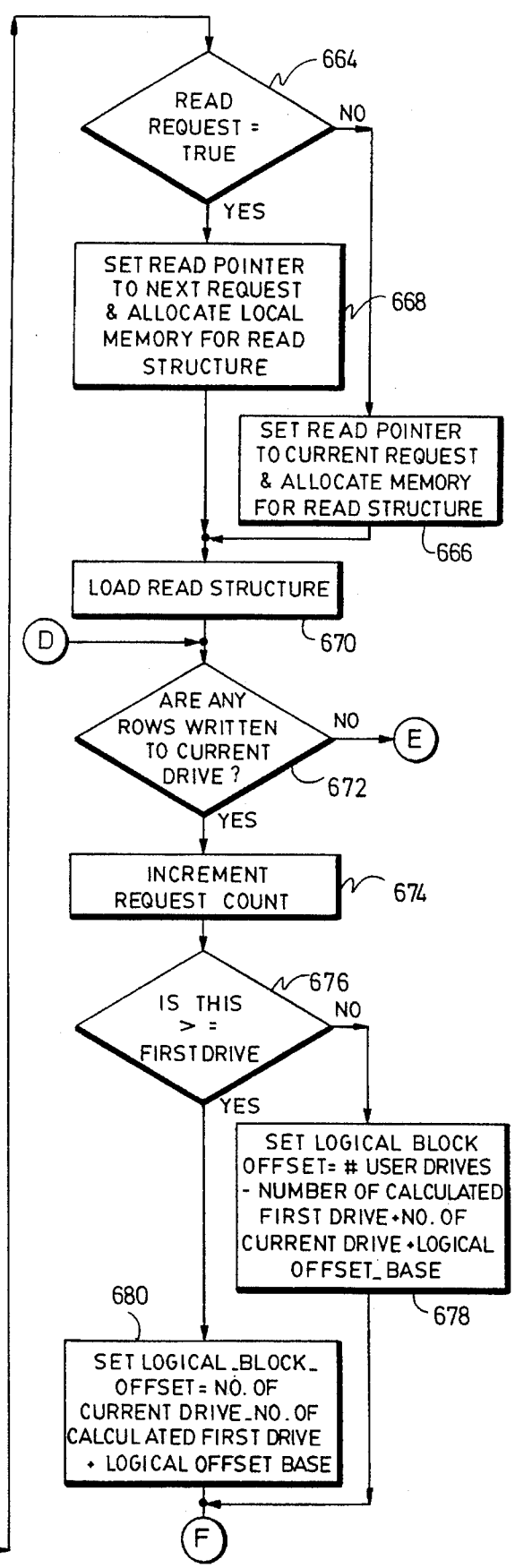
FIG. 8B

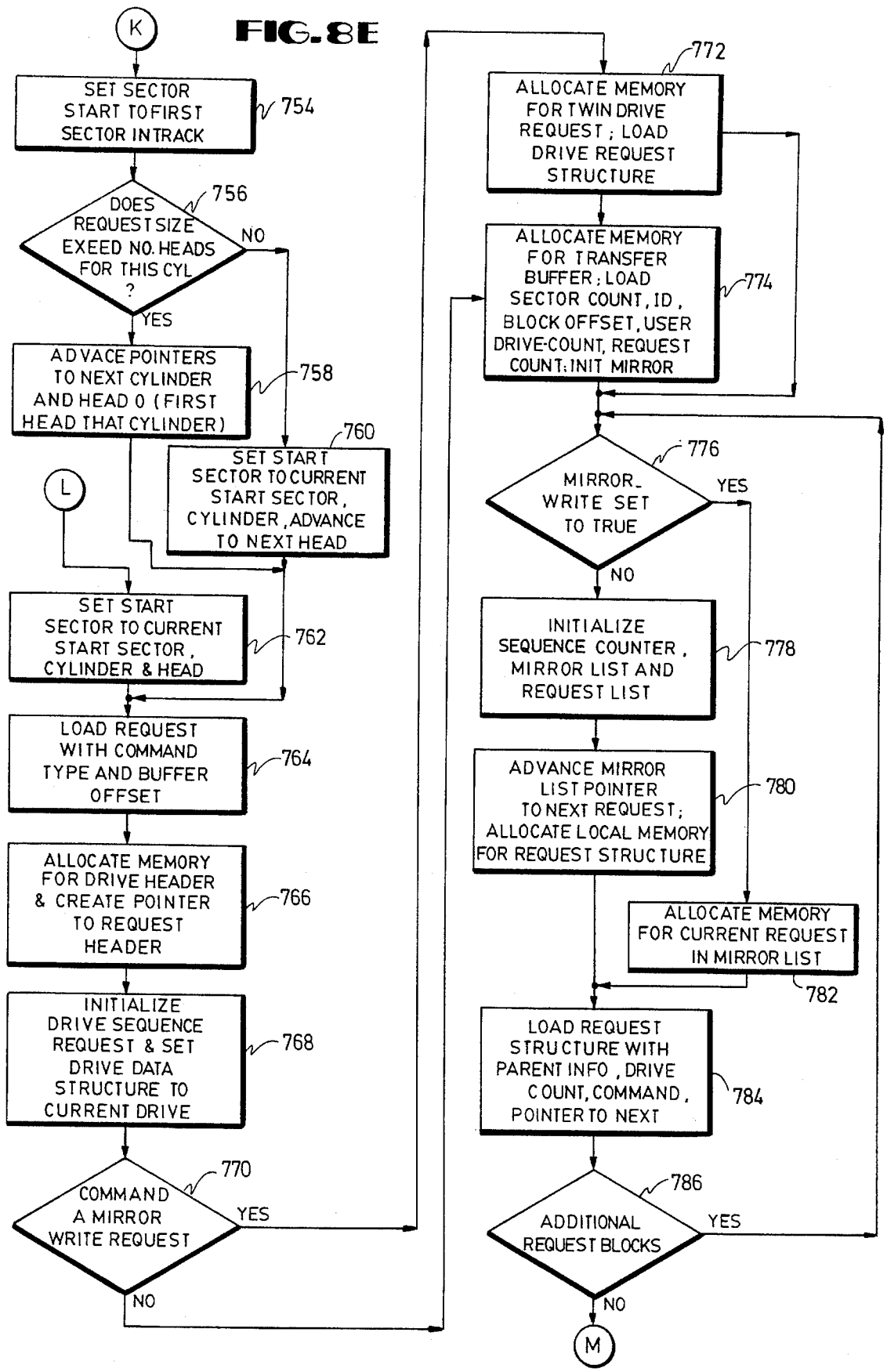

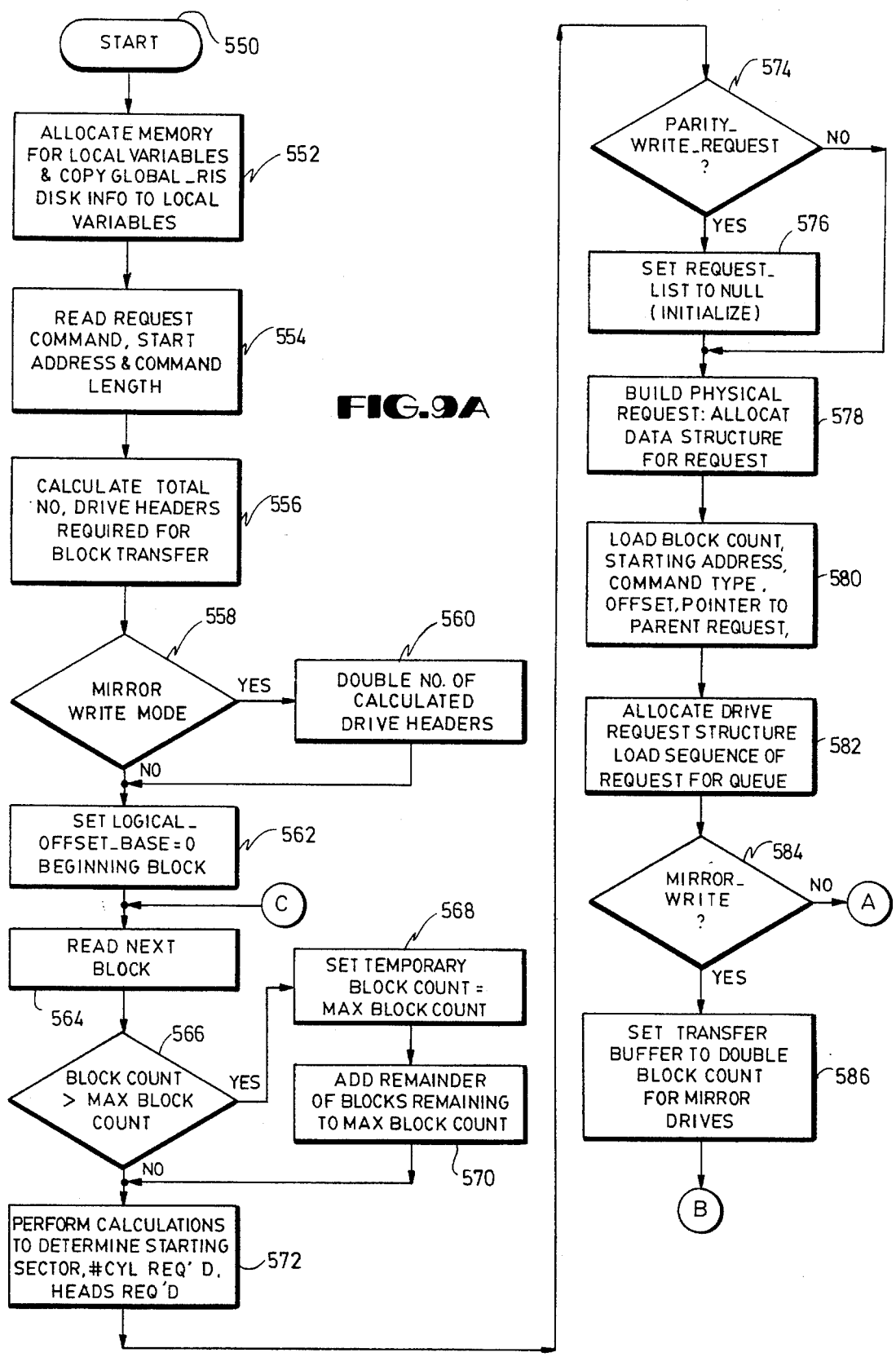

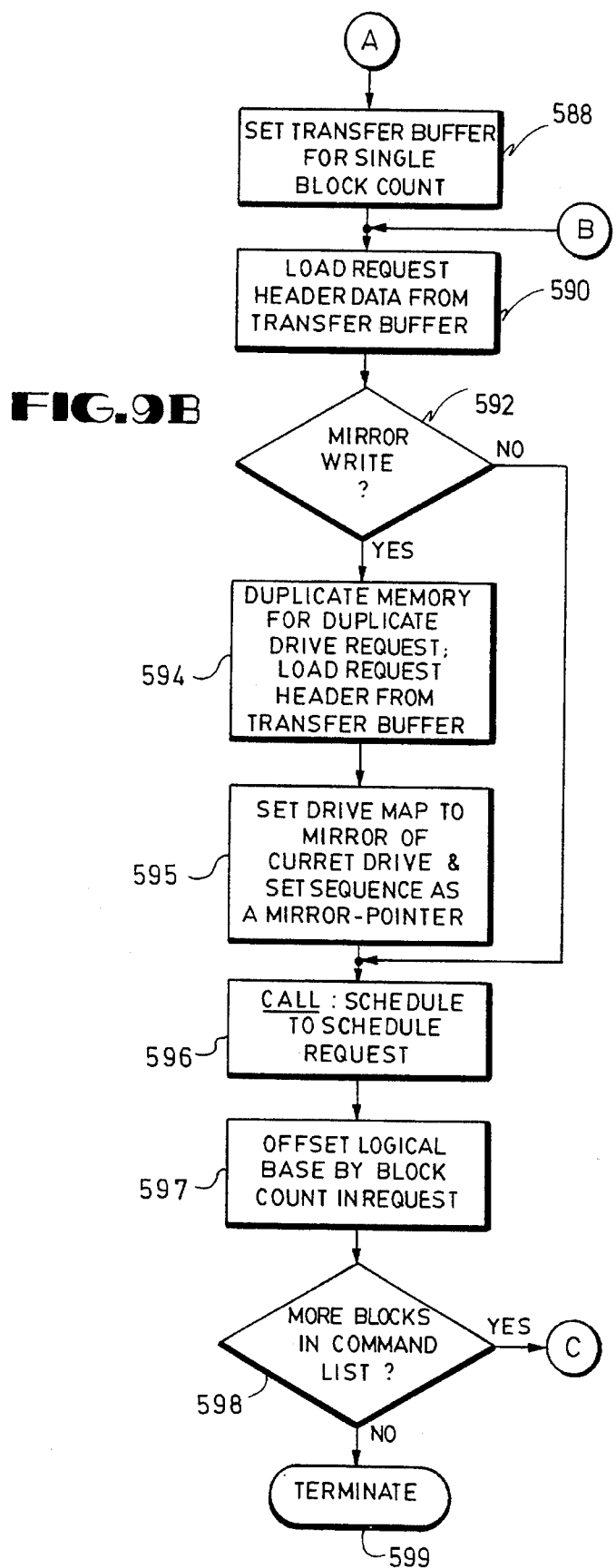

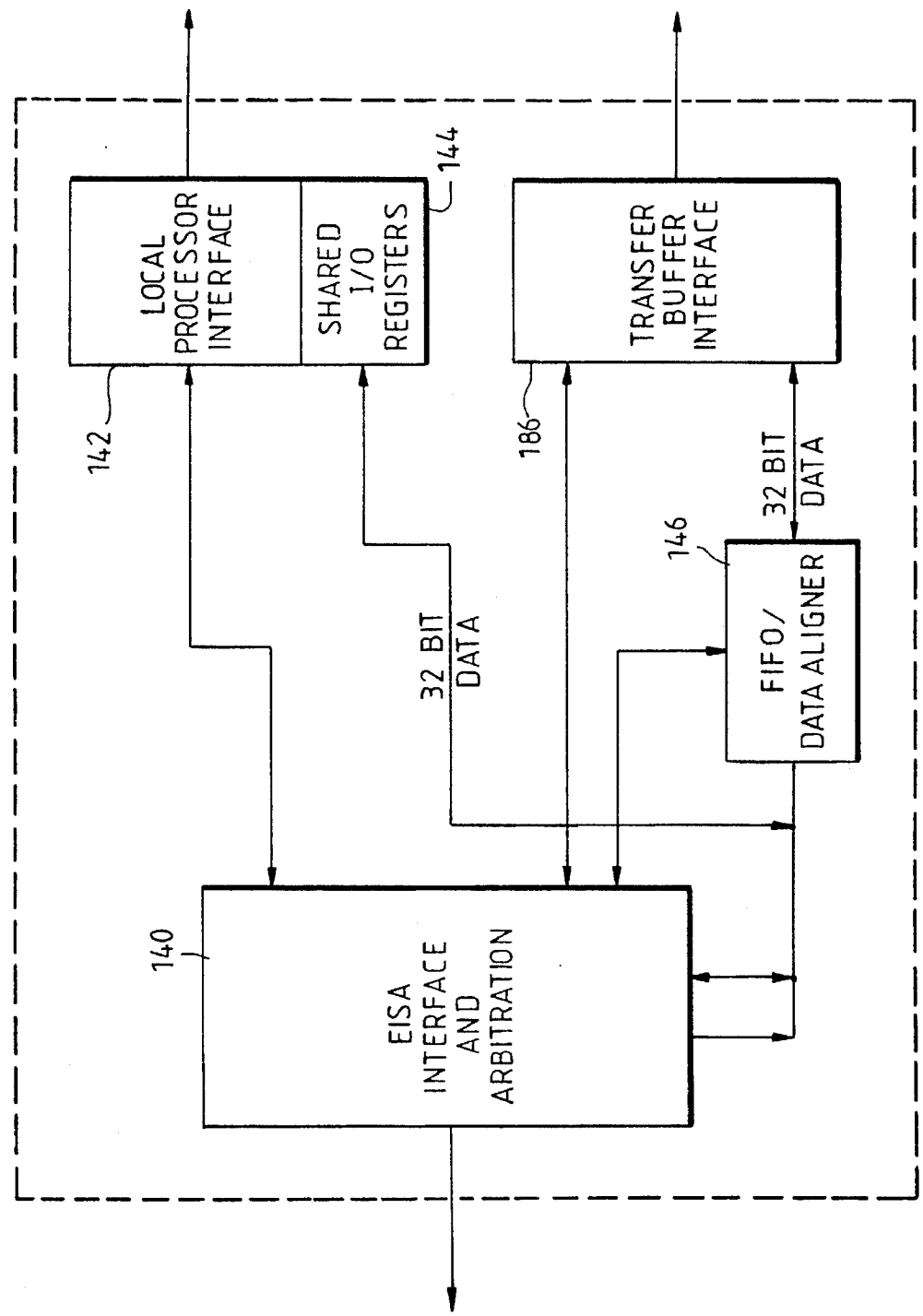

METHOD FOR DEVELOPING PHYSICAL DISK DRIVE SPECIFIC COMMANDS FROM LOGICAL DISK ACCESS COMMANDS FOR USE IN A DISK ARRAY

This is a divisional, of application Ser. No. 08/145,029, filed Oct. 28, 1993, now U.S. Pat. No. 5,440,716, which is a continuation of application Ser. No. 07/431,748, filed Nov. 3, 1989, now abandoned.

BACKGROUND OF THE INVENTION

1. Field of the Invention

The present invention relates to the control of multiple disk drives within computer systems, and more particularly to a method for distributing data across a multiple disk array for personal computer systems.

2. Description of the Related Art

Microprocessors and the personal computers which utilize them have become more power over the recent years. Currently available personal computers have capabilities easily exceeding the mainframe computers of 20 to 30 years ago and approach the capabilities of many computers currently manufactured. Microprocessors having word sizes of 32 bits wide are now widely available, whereas in the past 8 bits was conventional and 16 bits was common.

Personal computer systems have developed over the years and new uses are being discovered daily. The uses are varied and, as a result, have different requirements for various subsystems forming a complete computer system. Because of production volume requirements and the reduced costs as volumes increase, it is desirable that as many common features as possible are combined into high volume units. This has happened in the personal computer area by developing a basic system unit which generally contains a power supply, provisions for physically mounting the various mass storage devices and a system board, which in turn incorporates a microprocessor, microprocessor related circuitry, connectors for receiving circuit boards containing other subsystems, circuitry related to interfacing the circuit boards to the microprocessor, and memory. The use of connectors and interchangeable circuit boards allows subsystems of the desired capability for each computer system to be easily incorporated into the computer system. The use of interchangeable circuit boards necessitated the development of an interface or bus standard so that the subsystems could be easily designed and problems would not result from incompatible decisions by the system unit designers and the interchangeable circuit board designers.

The use of interchangeable circuit boards and an interface standard, commonly called a bus specification because the various signals are provided to all the connectors over a bus, was incorporated into the original International Business Machines Corporations (IBM) personal computer, the IBM PC. The IBM PC utilized in Intel Corporation 8088 as the microprocessor. The 8088 has an 8 bit, or 1 byte, external data interface but operates on a 16 bit word internally. The 8088 has 20 address lines, which means that it can directly address a maximum of 1 Mbyte of memory. In addition, the memory components available for incorporation in the original IBM PC were relatively slow and expensive as compared to current components. The various subsystems such as video output units or mass storage units, were not complex and also had relatively low performance levels because of the relative simplicity of the devices available at a reasonable costs at that time.

With these various factors and the component choices made in mind, an interface standard was developed and used in the IBM PC. The standard utilized 20 address lines and 8 data lines, had individual lines to indicate input or output (I/O) space or memory space read/write operations, and had limited availability of interrupts and direct memory access (DMA) channels. The complexity of the available components did not require greater flexibility or capabilities of the interface standard to allow the necessary operations to occur. This interface standard was satisfactory for a number of years.

As is inevitable in the computer and electronics industry, capabilities of the various components available increased dramatically. Memory component prices dropped and capacities and speeds increased. Performance rate and capacities of the mass storage subsystems increased, generally by the incorporation of hard disk units for previous floppy disk units. The video processor technology improved so that high resolution color systems were reasonably affordable. These developments all pushed the capabilities of the existing IBM PC interface standard so that the numerous limitations in the interface standard became a problem. With the introduction by Intel Corporation of the 80286, IBM developed a new, more powerful personal computer called the AT. The 80286 has a 16 bit data path and 24 address lines so that it can directly address 16 Mbytes of memory. In addition, the 80286 has an increased speed of operation and can easily perform many operations which taxed 8088 performance limits.

It was desired that the existing subsystem circuit boards be capable of being used in the new AT, so the interface standard used in the PC was utilized and extended. A new interface standard was developed, which has become known as the industry standard architecture (ISA). A second connector for each location was added to contain additional lines for the signals used in the extension. These lines included additional address and data lines to allow the use of the 24 bit addressing capability and 16 bit data transfers, additional interrupt and direct memory access lines and lines to indicate whether the subsystem circuit board was capable of using the extended features. While the address values are presented by the 80286 microprocessor relatively early in the operation cycle, the PC interface standard could not utilize the initial portions of the address availability because of different timing standards for the 8088 around which the original PC interface was designed. This limited the speed at which operations could occur because they were now limited to the interface standard memory timing specifications and could not operate at the rates available with the 80286. The newly added address lines included address signals previous available, but the newly added signals were available at an early time in the cycle. This change in the address single timing allowed operations which utilized the extended portions of the architecture to operate faster.

With a higher performance components available, it became possible to have a master unit other than the system microprocessor or direct memory access controller operating the bus. However, because of the need to cooperate with circuit boards which operated under the new 16 bit standard or the old 8 bit standard, each master unit was required to understand and operate with all the possible combinations of circuit boards. This increased the complexity of the master unit and resulted in a duplication of components, because the master unit had to incorporate many of the functions and features already performed by the logic and circuitry on the system board and other master units. Additionally, the master unit was required to utilize the direct memory access controller to gain control of the bus, limiting prioritizing and the number of master units possible in a given computer system.

The capability of components continued to increase. Memory speeds and sizes increased, mass storage units and size increased, video unit resolutions increased and Intel Corporation introduced the 80386. The increased capabilities of the components created a desire for the use of master units, but the performance of a master unit was limited by the ISA specification and capabilities. The 80386 could not be fully utilized because it offered the capability to directly address 4 Gbytes of memory using 32 bits of address and could perform 32 bit wide data transfers, while the ISA standard allowed only 16 bits of data and 24 bits of address. The local area network (LAN) concept, where information and file stored on one computer called server and distributed to local work stations having limited or no mass storage capabilities, started becoming practical with the relatively low cost of high capability components needed for adequate servers and the low costs of the components for work stations. An extension similar to that performed in developing the ISA could be implemented to utilize the 80386's capabilities. However, this type of extension would have certain disadvantages. With the advent of the LAN concept and the high performance requirements of the server and of video graphics work stations used in computer-added design and animation work, the need for a very high data transfer rates became critical. An extension similar to that performed in developing the ISA would not provide this capability, even if slightly shorter standards cycle was provided, because this would still leave the performance below desired levels.

With the increased performance of computer systems, it became apparent that mass storage subsystems, such as fixed disk drives, played an increasingly important role in the transfer data to and from the computer system. In the past few years, a new trend in mass storage subsystems has emerged for improving data transfer performance, capacity and reliability. This is generally known as a disk array subsystem. One key reason for wanting to build a disk array subsystem is to create a single logical device that has very high data transfer rate. This may be accomplished by "ganging" multiple standard disk drives together and transferring data to or from these drives to the system memory. If n drives are ganged together, then the effective data transferred rate is increased n times. This technique, called "striping" originated in the super computing environment where the transfer of large amounts of data to and from secondary storage is a frequent requirement. With this approach, the end physical drives would become a single logical device and may be implemented either through software or hardware.

A number of reference articles on the design of disk arrays have been published in recent years. These include "Some Design Issues of Disk Arrays" by Spencer Ng, April 1989 IEEE; "Disk Array Systems" by Wes E. Meador, April 1989 IEEE; and "A Case for Redundant Arrays of Inexpensive Disks (RAID)" by D. Patterson, G. Gibson and R. Catts report No. UCB/CSD 87/391, December 1987, Computer Science Division, University of California, Berkley, Calif.

SUMMARY OF THE INVENTION

The present invention is directed towards a method and apparatus for an intelligent disk array controller, permitting the controller to manage the operation of an array of up to eight(8) standard integrated disk drives connected in drive pairs without significant supervision by the computer system host. Specifically, the present invention is directed toward the translation of logical I/O request from the computer system host or other device driver to specific physical drive commands used to distribute the data among the drives in the disk array. Further, the present invention is directed to a technique which will maximize performance based upon the operating environment of the host computer system. The improved performance results from improved subsystem performance due to the use of a highly specialized subsystem controller. Further, improved system performance is attained by minimizing the level of host processing. The disk array controller of the present invention permits the host processor or device driver to be independent of the physical configuration of the array and drives which make up the disk array, the data distribution technique; drive parity operations, and most error recover and fault tolerance activities.

The communication mechanism between the disk array controller and device driver software is through a bus master interface controller or a compatibility port interface controller. The bus master controller is capable of data transfer rates across the EISA bus at a rate of 32 Mbytes per seconds using 32 bit bus master burst DMA (type C) cycles as defined in the EISA specification through bus master interface controller. The data transfer rate from a single drive in the array is approximately 2 Mbytes per second, which, when implemented over four disk drives, allows burst data rate of 8 Mbytes per second, a major improvement over existing transfer rates for a single EISA integrated disk drive.

In the present invention a local processor within the disk array controller receives information packets or "logical requests" from the host processor specifying a disk I/O command. The information packet includes information relating to the specific command, the priority of the command, and addresses within system memory for the sources or targets for the data transfer to or from the disk array. This information is, by itself, insufficient to carry out disk level operations. The local processor breaks these logical requests into a series of "drive requests" which include drive specific information including disk drive number, head, cylinder and sector information based upon the type of disks within the array, the particular controller, and type of operating system being run on the host computer. Each of the drive requests maintains a relationship with the parent logical request, such that the drive request also contains information relating to the source or target address in system memory for the transfer. The drive requests are then scheduled for execution by the disk array controller. The actual transfer of data between the disk array and system memory is managed by a bus master or compatibility port controller within the disk array controller. Thus, the present invention permits the system host processor to issue logical commands as opposed to the creation of drive requests to be carried out by the disk array controller, thereby significantly reducing system processor overhead and increasing system efficiency.

The present invention is also capable of initializing a logical unit configuration based upon information which exists within the reserved sectors on disk within the disk array. In configuring the logical unit, the present invention reads the reserved sectors for all of the disks within the array and determines which, if any, of the disks have a valid but inconsistent configuration image. If there exist more than one valid configuration image among the disks within the logical unit, the present invention will "vote" as to which of the valid configurations is to be used as a "template" for the remaining disks within the array. Further, if none of the disks have a valid configuration, the computer system including the present invention will initiate the operation of a utility designed to create a valid configuration.

BRIEF DESCRIPTION OF THE DRAWINGS

A better understanding of the invention can be had when the following detailed description of the preferred embodiment is considered in conjunction with the following drawings, in which:

FIGS. 1 and 2 are schematic block diagrams of a computer system incorporating the present invention;

FIG. 4 is a flow diagram depicting the manner in which I/O requests are submitted to the disk array controller of the present invention;

FIG. 6 is a flow diagram of the manner in which the preferred embodiment selects a data distribution scheme for a disk array request;

FIG. 7A, 7B, 7C, 7D, 7E, 7F and 7G are flow diagrams of one of the data distribution schemes used within the preferred embodiment;

FIGS. 8A, 8B, 8C, 8D, 8E and 8F are flow diagrams of another of the data distribution schemes used by the preferred embodiment;

FIG. 9A and 9B is a flow diagram of a third data distribution scheme utilized by the preferred embodiment;

FIG. 16 is a schematic block diagram of a bus master interface.

DETAILED DESCRIPTION OF THE PREFERRED EMBODIMENT

Table of Contents

I. Computer System Overview
II. Disk Array Controller
III. Command Protocol and Definition
IV. Bus Master Interface Controller
V. Data Distribution Operation
　A. Overview of Command Submission
　B. Data Distribution Technique
　　1. Disk RIS sectors
　　2. Disk Array Configuration
　　3. Distribution Scheme Selection
　　4. Multi_Block Mapper
　　5. Direct Mapper
　　6. Standard Mapper
　　7. Scheduler
　　8. Check Drive
　　9. All Consistent Module
　　10. Consistent Module
　　11. Vote
VI. Conclusion
I. Computer System Overview Referring now to FIGS. 1 and 2, the letter C designates generally a computer system incorporating the present invention. For clarity, system C is shown in two portions, with the interconnections between FIGS. 1 and 2 designated by reference to the circled numbers one to eight. System C is comprised of a number of block elements interconnected via four buses. Throughout this specification, signal mnemonics with an asterisk following the signal descriptors indicates the signal is active at a logic low level. Signal mnemonics having numbers or ranges between angled brackets refer to those particular bits or positions in a bus.

Figure 1:
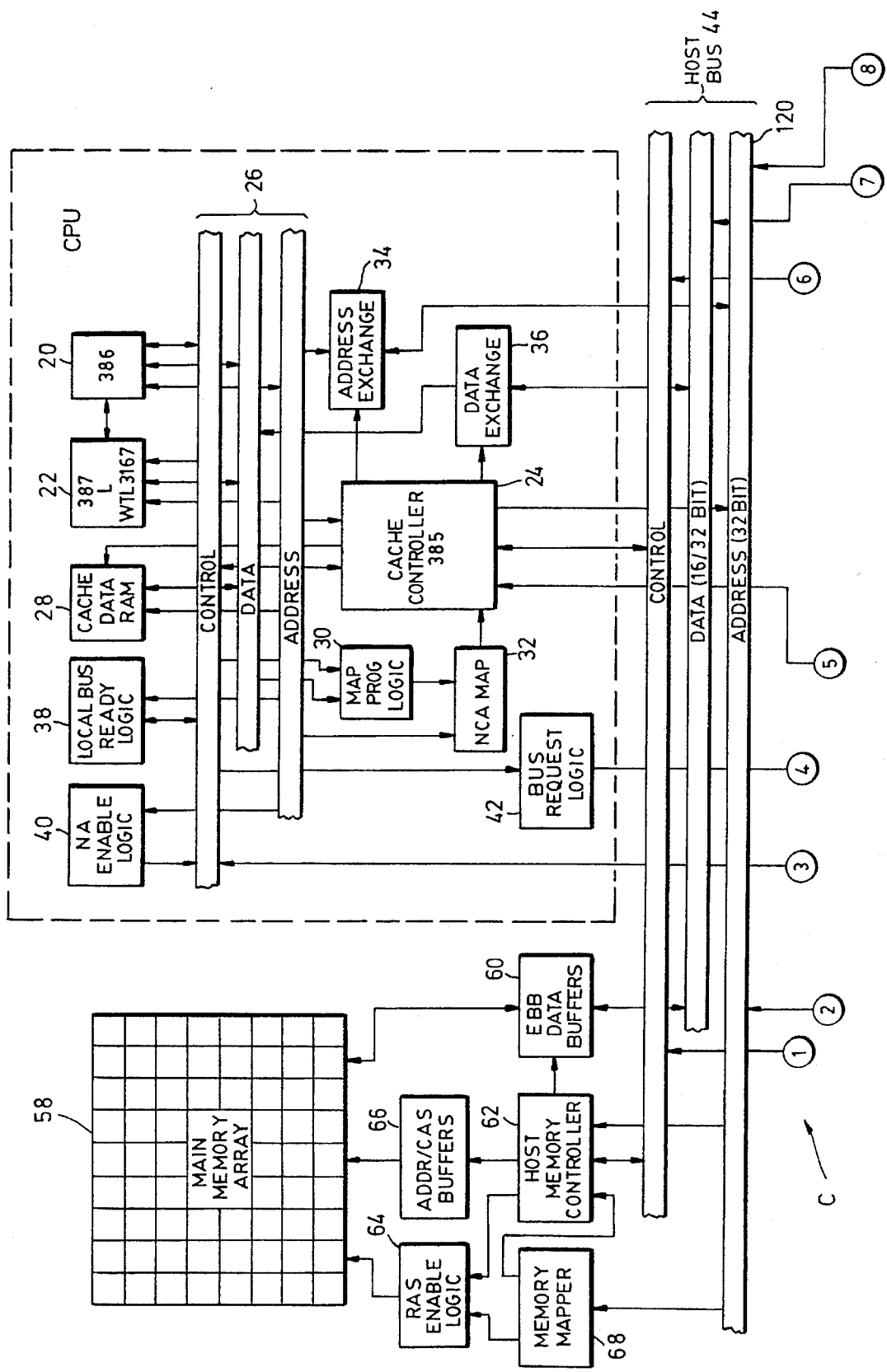

In FIG. 1, a computer system is depicted. A central processing unit CPU comprises a processor 20, a numerical coprocessor 22 and a cache memory controller 24 and associated logic circuits connected to a local processor bus 26. Associated with cache controller 24 is high speed cache data random access memory 28, noncacheable memory address map programming logic circuitry 30, noncacheable address memory 32, address exchange latch circuitry 34 and data exchange transceiver 36. Also associated with the CPU also are local bus ready logic circuit 38, next address enable logic circuit 40 and bus request logic circuit 42.

The processor 20 is preferably an Intel 80386 microprocessor. The processor 20 has its control, address and data lines interfaced to the local processor bus 26. The coprocessor 22 is preferably an Intel 80387 and/or Weitek WTL 3167 numeric coprocessor interfacing with the local processor bus 26 and the processor 20 in the conventional manner. The cache ram 28 is preferably suitable high-speed static random access memory which interfaces with the address and data elements of bus 26 under control of the cache controller 24 to carry out required cache memory operations. The cache controller 24 is preferably an Intel 82385 cache controller configured to operate in two-way set associative master mode. In the preferred embodiment the components are the 33 MHz versions of the respective units. Address latch circuitry 34 and data transceiver 36 interface the cache controller 24 with the processor 20 and provide a local bus interface between the local processor bus 26 and a host bus 44.

Circuit 38 is a logic circuit which provides a bus ready signal to control access to the local bus 26 and indicate when the next cycle can begin. The enable circuit 40 is utilized to indicate that the next address of data or code to be utilized by subsystem elements in pipelined address mode can be placed on the local bus 26.

Noncacheable memory address map programmer 30 cooperates with the processor 20 and the noncacheable address memory 32 to map noncacheable memory locations. The noncacheable address memory 32 is utilized to designate areas of system memory that are noncacheable to avoid many types of cache memory incoherency. The bus request logic circuit 42 is utilized by the processor 20 and associated elements to request access to the host bus 44 in situations such as when requested data is not located in the cache memory 28 and access to system memory is required.

In the drawings, system C is configured having the processor bus 26, the host bus 44, an extended industry standard architecture (EISA) bus 46 (FIG. 2) and an X bus 90. The details of the portion of the system illustrated in FIG. 2 and not discussed in detail below are not significant to the present invention other than to illustrate an example of a fully configured computer system. The EISA specification Version 3.1 is attached as Appendix 1 to U.S. Pat. No. 5,101,492, assigned to Compaq Computer Corporation, assignee of the present invention, which patent is hereby incorporated by reference and fully explains requirements of an EISA system. The portion of system C illustrated in FIG. 2 is essentially a configured EISA system which includes the necessary EISA bus 46, and EISA bus controller 48, data latches and transceivers 50 and address latches and buffers 52 to interface between the EISA bus 46 and the host bus 44. Also illustrated in FIG. 2 is an integrated system peripheral 54, which incorporates a number of the elements used in an EISA-based computer system.

The integrated system peripheral (ISP) 54 includes a direct memory access controller 56 for controlling access to main memory 58 (FIG. 1) or memory contained in EISA slots and input/output (I/O) locations without the need for access to the processor 20. The main memory array 58 is considered to be local memory and comprises a memory circuit array of size suitable to accommodate the particular requirements of the system. The ISP 54 also includes interrupt controllers 70, nonmaskable interrupt logic 72 and system timers 74, which control the interrupt signals and generate necessary timing signals and wait states in a manner according to the EISA specification and conventional practice. In the preferred embodiment, processor generated interrupt request are controlled via dual interrupt control circuits emulating and extending conventional Intel 8259 interrupt controllers. The ISP 54 also includes bus arbitration logic 75 which, in cooperation with the bus controller 48, controls and arbitrates among the various requests for the EISA bus 46 by the cache controller 24, the DMA controller 56 and bus master devices located on the EISA bus 46.

The main memory array 58 is preferably dynamic random access memory. Memory 58 interfaces with the host bus 44 via a data buffer circuit 60, a memory controller circuit 62 and a memory mapper 68. The buffer 60 performs data transceiving and parity generating and checking functions. The memory controller 62 and the memory mapper 68 interface with the memory 58 via address multiplexer and column address strobe buffers 66 and row address enable logic circuit 64.

The EISA bus 46 includes ISA and EISA control buses 76 and 78, ISA and EISA control buses 80 and 82 and address buses 84, 86 and 88. System peripherals are interfaced via the X bus 90 in combination with the ISA control bus 76 from the EISA bus 46. Control and data/address transfer for the X bus 90 are facilitated by X bus control logic 92, data transceivers 94 and address latches 96.

Attached to the X bus 90 are various peripheral devices such as keyboard/mouse controller 98 which interfaces the X bus 90 with a suitable keyboard and mouse via connectors 100 and 102, respectively. Also attached to the X bus 90 are read only memory circuits 106 which contain basic operations software for the system C and for system video operations. A serial communications port 108 is also connected to the system C via the X bus 90. Floppy and fixed disk support, a parallel port, a second serial port, and video support circuits are provided in block circuit 110.

II. Disk Array Controller

Figure 3:
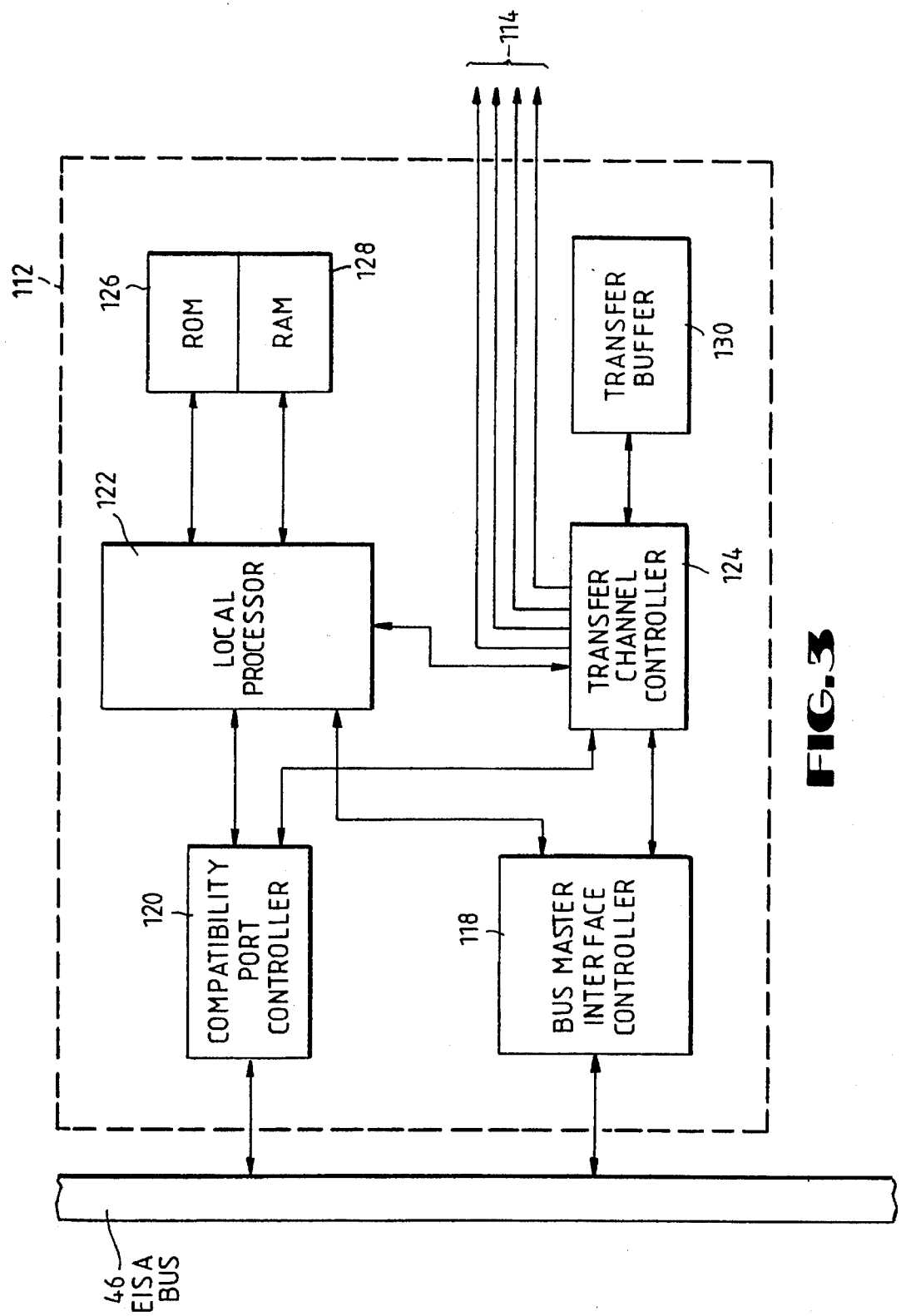
FIG. 3 is a schematic block diagram of a disk array controller incorporating the present invention.

The disk array controller 112 is connected to the EISA bus 46 to provide for the communication of data and address information through the EISA bus. Fixed disk connectors 114 are connected to the fixed disk support system and are in turn connected to a fixed disk array 116. FIG. 3 is a schematic block diagram of the disk array controller 112 incorporating the present invention. The disk array controller 112 incorporating the present invention includes a bus master interface controller 118 (BMIC), preferably an Intel Corporation 82355, which is designed for use in a 32 bit EISA bus master expansion board and provides all EISA control, address, and data signals necessary for transfers across the EISA bus. The BMIC 118 supports 16 and 32 bit burst transfers between the disk array system and system memory. Further, the BMIC 118 is capable of converting a transfer to two 32 bit transfers if the memory to be transferred is nonburstable. Additionally, the BMIC 118 provides for the transfers of varying data sizes between an expansion board and EISA and ISA devices.

The disk array controller 112 of the present invention also includes a compatibility port controller (CPC) 120. The CPC 120 is designed as a communication mechanism between the EISA bus 46 and existing host driver software not designed to take advantage of EISA capabilities.

Also included in the disk array controller 112 which incorporates the present invention is a microprocessor 122, preferably an Intel Corporation 80186 microprocessor. The local processor 122 has its control, address and data lines interfaced to the BMIC 118, CPC 120, and transfer channel controller 124. Further, the local processor 122 is also interfaced to local read only memory (ROM) 126 and dynamic random access memory (RAM) 128 located within the disk array controller 112.

The transfer channel controller 124 (TCC) controls the operation of four major DMA channels that access a static RAM transfer buffer 130. The TCC 124 assigns DMA channels to the BMIC 118, the CPC 120, the local processor 122 and to the disk array DMA channel 114. The TCC 124 receives requests for the four channels and assigns each channel a priority level. The local processor 122 has the highest priority level. The CPC 120 channel has the second highest priority level. The BMIC 118 channel has the third highest priority level and the disk array DMA channel 114 has the lowest priority level.

The disk array DMA channel 114 is shared by four disk drive subchannels. The four disk drive subchannels may be assigned to any one of eight different disk drives residing in the disk array. The four drive subchannels have equal priority within the disk array DMA channel. The subchannels are rotated equally to become the source for the disk array DMA channel. One of the subchannels is inserted in rotation only if it has an active DMA request. The remaining three subchannels are always active in the rotation.

In the preferred embodiment, a disk read or write request is submitted to the disk array controller 112 through the BMIC 118. The local processor 122 on receiving this request through the BMIC 118 builds a data structure in local processor RAM memory 128. This data structure is also known as a command list and may be a simple read or write request directed to the disk array, or it may be a more elaborate set of request containing multiple read/write or diagnostic and configuration requests. The command list is then submitted to the local processor 122 for processing according to the method of the present invention. The local processor 122 then oversees the execution of the command list, including the transferring of data. Once the execution of the command list is complete, the local processor 122 notifies the operating system device driver. The submission of the command list and the notification of a command list completion are achieved by a protocol which uses the BMIC 118 I/O registers. To allow multiple outstanding request to the disk array controller 112, these I/O registers are divided into two channels: a command list submit channel and a command list complete channel.

III. Command Protocol and Definition

Referring now to FIG. 16, the method of the present invention includes the development of a data structure for the disk array controller 112 known as a command list 200. The command list 200 consist of a command list header 202, followed by a variable number of request blocks 204. The request blocks are variable in length and may be any combination of I/O request which will be described further below. A command list 200 typically contains a number of related request blocks 204; from 1 to any number that take up less than 16 Kbyte of memory. The command list header 202 contains data that applies to all request blocks 204 in a given command list 200: logical drive number, priority and control flags. The request blocks 204 consist of a request block header 206 and other requested parameters, based on the nature of the request. The request block header 206 has a fixed length, whereas other request parameters are variable in length.

The individual request blocks 204 each represent an individual I/O request. By forming a command list 200 out of several individual request blocks, and submitting the command list 200 to the disk array controller 112 (FIG. 2), the computer system C microprocessor 20 overhead is reduced.

Still referring to FIG. 16, a command list header 202 contains information that applies to each of the request blocks 204 contained in the command list 200. The command list header 202 is a total of 4 bytes in length. The logical drive number specifies to which logical drive that all request blocks 204 within the command list 200 apply. The method of the present invention permits a total of 256 logical drives to be specified. The priority bit is used to provide control over the processing of a command list. The disk array controller 112 is capable of operating upon many command list concurrently. In specifying priority the method of the present invention permits a command list to be processed prior to those already scheduled for processing by the disk array controller. The control flag bytes under the method of the present invention are used for error processing and ordering of request of the same priority. Ordered requests are scheduled according to priority, however, they are placed after all previous request of the same priority. If all requests are of the same priority and the order flag is set, the request are performed on a first come, first-serve basis.

Error condition reporting options are specified by error flags in the control flag bytes. In the event of an error, the disk array controller 112 can either: notify the requesting device and continue processing request blocks 204 in the list; notify the requesting device and stop processing of all other request blocks 204 in the list; or not notify the requesting device of the error. In all instances, an error code will be returned in the command list status register at the time the next command list complete notification and in the error code field in the request block 204 where the error occurred. Further, notification of completion may be set for each individual request block 204 or for the entire command list 200. In the event the EISA bus 46 is to be notified each time a request block has been completed a "notify on completion of every request" flag may be set in the control flags field.

A request block 204 is comprised of two parts, a fixed length request header 206 and variable length parameter list 208. The parameters are created as data structures known as scatter/gather (S/G) descriptors which define data transfer addresses. The request header 206 fields contain a link to the next request block 204, the I/O command, space for a return status, a block address and a block count, and a count of the scatter/gather descriptor structure elements for two S/G structures. The request header is a total of 12 bytes in length.

The scatter/gather descriptor counters are used to designate the number of scatter/gather descriptors 208 which utilized in the particular request. The number of scatter/gather descriptors 208 associated with the request block 204 will vary. Further, if the command is a read command, the request may contain up to two different sets of scatter/gather descriptors. Thus, the present invention, permits a read command to read data from two distinct, non-contiguous addresses in either system or disk memory. Each scatter/gather descriptor 208 contains a 32 bit buffer length and a 32 bit address. This information is used to determine the system memory data transfer address which will be the source or destination of the data transfer. Unlike the request blocks 204 in the command list, the scatter/gather descriptors 208 must be contiguous and, if there exists a second scatter/gather descriptor 208 set for a request, it must directly follow the first set of scatter/gather descriptors 208.

A command list 200 has a variable number of request blocks 204. In order to quickly and efficiently traverse the list of variable request blocks 204 the request header includes a pointer or next request offset which specifies an offset of "n" bytes from the current request block address to the next request block. This field makes the command list 200 a set of linked list request blocks 204. The last request block 204 has a value of 000 h in the next request offset to signify the end of the command list 200. Thus, the method in the present invention permits memory space between request blocks 204 within a command list 200 which may be used by an operating system device driver. However, it should be noted that the greater the extra space between the request blocks 204 the longer it will require the disk array controller 112 to transfer the command list 200 into its local memory. The command specifies the function of the particular request block and implies the format of the parameter list. The commands supported by the disk array controller 112 include:

COMMAND
   IDENTIFY LOGICAL DRIVE
   IDENTIFY CONTROLLER
   IDENTIFY LOGICAL DRIVE STATUS
   START RECOVERY
   READ
   WRITE
   DIAGNOSTIC MODE
   SENSE CONFIGURATION
   SET CONFIGURATION

The Identify logical drive command is used to identify the defined logical drives within the disk array. Processing of the command returns information related to the logical drive in a 28 byte buffer. Information included is block length; number of blocks; logical drive parameter table entry; and fault tolerance type. If a logical drive is not defined, the length and number of blocks for that logical drive will be returned as 0 values. In the current implementation of the preferred embodiment only logical drives 0–7 may be defined for the BMIC 118 or for the logical drives CPC 120.

The Identify controller command is used to identify the configuration of the disk array controller 112. It returns information in a 256 byte buffer and is used primarily to return the number of logical drives that are defined. In the preferred embodiment, information returned includes the number of logical drives, the configuration signature for the disk array controller; and the firmware revision for the disk array controller.

The identify logical drive status command is used to indicate the status of a particular logical drive. Information is returned after processing of this command in a 256 byte buffer. Information includes the logical drive status and drive failure assignment information. Possible values that may be returned regarding the logical drive status include: a logical drive failure; the logical drive needs to be configured; the logical drive is operating in the regenerate mode; the logical drive is ready to start recover; and the logical drive will resume recovery after a power off. The start recover command is used exclusively by the computer system C ROM memory during a post. This command gives the disk array controller permission to start the recovery process.

The present invention is directed toward a method for distributing data among the disk array drives for I/O commands, such as READ or WRITE. The I/O commands instruct the disk array controller 112 to perform scatter/gather operations on sequential blocks of data. This scatter/gather descriptor structure is used by the disk array controller 112 to locate data within the array. The descriptor structure may specify buffer addresses and buffer lengths for data to be transferred to or from system memory 58. The total buffer length must equal the number bytes to be transferred for any I/O operation.

The read command transfers sequential blocks of data from the disk into buffers in the system memory 58. Two scatter/gather descriptors are available to specify dual destinations for the data. The preferred embodiment also includes a method for specifying partial block transfers. If an initial buffer address is 0FFFFFFFFh (NULL), the present invention will skip to the offset of the requested bytes and the data for the specified is effectively ignored. The preferred embodiment will then read the remainder of the data within the particular block and transfer it to the address as requested. A null address will generate an error during a write operation.

The write command transfers data from the system memory 58 or device driver and writes it to sequential blocks on the disk drive array. A scatter/gather descriptor count number of 2 is ignored by a write command. The diagnostic command is a special command in the preferred embodiment that allows the direct manipulation of hardware. This command is generally issued as the only request in a command list. The only valid field in a diagnostic command is the command field. If there exist any outstanding request when the diagnostic command is submitted, an abort error will be returned. Once the disk array controller 112 has been placed in a diagnostic mode, the disk array controller 112 is ready to accept diagnostic commands upon receipt of the command complete notification. The disk array controller 112 will remain in diagnostic mode until otherwise notified and will not process nondiagnostic command list.

The sense configuration command is used to determine the configuration of a disk array controller and returns the information to a 56 byte buffer. Information returned includes configuration signature which is supplied by the EISA configuration utility and is written on the reserved sectors on each of the physical drives. The configuration signature is generated by EISA configuration utility when the drive is first configured. This signature is saved in EISA CMOS and on the disks within a logical unit. The configuration signature is used by the preferred embodiment to reliably identify that a physical drive is a member of the configured logical unit and that the logical unit configuration matches the EISA configuration. The sense configuration buffer also includes information relating to whether a compatibility port has been configured to be the primary or secondary means of entry into the disk array. The sense configuration buffer also includes a value which indicates the type of operating system that has been specified during EISA configuration. This command also returns information regarding the total number of physical drives detected by the configuration utility through the diagnostic mode, the number physical drives assigned to the logical drive during the configuration utility, and the type of fault tolerance (parity, mirror or none) assigned to the logical drive by the configuration utility. The sense configuration buffer also includes information relating to the specific drive parameter such as sectors per cylinder number of cylinders, number of heads, and number of platters. The buffer returned upon completion of the sense configuration command also includes logical drive parameters supplied by the configuration utility and a bit map indicating which physical drives are assigned to the particular logical drive.

The method of the present invention relies upon communication protocol utilizing unidirectional channels to communicate between the system processor 20 and the disk array controller local processor 122. The channel that is used to submit the new command list 200 to the disk array controller 112 is also used to send the length of the command list 200 in bytes and a tag I.D. used to identify the command list 200. The length is required so that the disk array controller 112 may allocate the proper amount of memory in its local memory to process the command list. The tag I.D. is used exclusively by the operating system device driver and does not effect the processing of the command list 200 by the disk array controller 112. The channel that returns the command list 200 completion and error notifications uses the addresses of the command list 200 and offset pointer to the request block 204 that generated the notification, the command list 200, the status at the time of notification, and the tag I.D. given when the command list 200 was submitted.

IV. Bus Master Interface Controller

FIG. 16 is a schematic block diagram of BMIC 118. What follows is a brief discussion of the functions and features of the BMIC 118.

In EISA slave mode, the BMIC 118 monitors the EISA bus 46 address lines for general I/O address decoding, slot-specific address decoding, and shared register 144 accessing. During slave mode operations, all BMIC 118 internal registers are accessible through the local processor interface 142, and all shared registers 144 are accessible to the EISA bus 46 or local processor 122 through the EISA interface 140 or the local processor interface 142 respectively.

In EISA master mode, the BMIC 118 becomes the master of the EISA bus 46. It may perform bursts, nonburst, mismatched or peek/poke data transfers. During master mode operations, all internal registers of the BMIC 118 are accessible to the local processor 122 (FIG. 3) through the local processor interface 140 of the BMIC 118. The arbiter portion of the EISA interface 140 determines which mode the BMIC 118 is in; performs EISA arbitration; and provides the control signal necessary to regulate the slave and master activities internal to the BMIC 118. In slave mode, the arbiter portion of the EISA interface 140 also mediates between the EISA side and the local side during shared register 144 accesses.

|  | Local CPU | | EISA I/O | |
|---|---|---|---|---|
|  | Shared Reg. Accessing | Only Reg. Accessing | Address Decoding | Data Transfers |
| EISA Slave Mode | YES | YES | YES | NO |
| EISA Master Mode | YES | YES | NO | YES |

The EISA interface and arbiter 140 contains two identical independent transfer channels which are configurable to run either burst or nonburst cycles to and from system memory 58 (FIG. 1). The BMIC 118 will automatically run nonburst or mismatched cycles if the memory addressed by the BMIC 118 cannot run burst cycles. Mismatched cycles will be run if data size translation is required from 32 bit to 16 bit or 8 bit.

Each transfer channel has three sets of registers to regulate data transfers. These are the base register group, the current register group, and the data status/control register group. This implementation of a triple register set allows the local processor 122 to program the next transfer on the channel while the current transfer is being executed.

The base register contains seven 8-bit registers. These registers are programmed by the local processor 122 when a transfer is required across one of the channels. Four transfer channel base address registers are combined to form the starting 32-bit EISA address to be used during the transfer. The remaining three registers are the transfer channel base count registers. The base count registers are utilized to determine the number of transfers to be performed. The number of bits which can be transferred ranges from 1 bit to 4 Gbytes. The most significant bit of the transfer channel base count register is used to control the start of the transfer and the second most significant bit is used to control the direction of the transfer.

The current register set contains seven registers, each of which correspond to a base register. These registers are loaded from the base registers. The transfer channel current address registers contain the 32 bit real-time EISA memory addresses. The transfer channel current count registers contain the number of bits remaining to be transferred on the channel. The current register set may be read by the local processor 122 (FIG. 3) through the local processor interface 142. The status/control register set contains three registers: the transfer channel strobe register, the transfer channel configuration register and the transfer channel status register. The transfer channel strobe register is used to initiate the transfer of data from the base register set associated current register. A transfer request for the channel will be generated following the current register load. The transfer channel configuration register is used to program the mode of the transfer. The transfer channel status register provides current FIFO 146 and transfer channel status.

In initializing a transfer over either of the two transfer channels, the present invention first determines whether the base registers for the desired transfer channel are available. The local processor 122 programs or loads the transfer channel's base register set with the desired transfer information. The local processor 122 then loads the current register set from the base register and schedules a request by writing to the channel's transfer strobe register. If a transfer is in progress on the requested channel, the base to current register load will take place immediately after the data transfer on the requested channel has been completed.

The BMIC 118 may be programmed for burst or nonburst, data transfers to and from EISA memory. This is set by a write to the channel configuration register. If a burst mode is enabled, BMIC 118 will look for a slave burst signal at the beginning of the transfer to determine if the slave device that is being addressed is capable of running burst cycles. If the slave device does not respond with an active slave burst signal, BMIC 118 will not attempt to make a burst transfer and will proceed with either a nonburst or mismatched data transfer.

In order to permit the local processor 122 (FIG. 3) to communicate with other devices in the computer system C (FIGS. 1, 2), the method of the present invention permits the local processor 122 to execute individual I/O or memory cycles over the EISA bus 46. These cycles can be thought of as being similar to "peek" and "poke" statements in the BASIC programming language. These cycles may be reads, writes or locked exchanges in 8, 16, 24 or 32 bit values. PEEK/POE transfer cycles must be contained within a single double word. The peek/poke operation requires four 8 bit peek/poke address registers which are combined to provide the 32 bit peek/poke address; an 8 bit peek/poke control register which contains the bits defining whether the cycle is I/O or memory, peek (read)/poke (write) or locked exchange, and which bit enables are to be active during the cycle; and four 8-bit peek/poke data registers which are used to hold the data for the peek/poke cycle. To do an individual write cycle (poke), the local processor 122 loads the peek/poke address register to specify the 32 bit memory address or the 16 bit I/O address. The local processor 122 then loads the data to be transferred into the peek/poke data register set in the appropriate bit positions in the data register sets such that the data is transferred on the correct bit lanes during a 32 bit bus master transfer. The local processor 122 then loads the peek/poke control registers to specify the cycle type and to initiate the data transfer cycle. Bit 2 in the local status/control register will be set to a 1 by the BMIC 118 to indicate that a peek/poke request is pending and that the peek/poke registers are busy. When the poke cycle has finished executing on the EISA bus 46 the peek/poke status bit in local status/control register will return to normal (0). To perform an individual read cycle (peek), the local processor 122 loads the 32 bit memory address into the peek/poke address register. The local processor 122 then loads the peek/poke control register to initiate the read cycle. The peek/poke cycle will set bit 2 in the local status/control register will be set high and will remain active until the peek cycle finishes on the EISA bus 46. The local processor 122 can then read the data from the peek/poke data register. When a locked exchange cycle is requested by the local processor 122, a peek cycle is scheduled first and then immediately following by a poke cycle. A "LOCK" signal is asserted during the locked exchange cycle to indicate that no other access to the addressed location may be made.

The disk controller 112 will begin master mode operation any time a transfer request is pending. If more than one transfer request is pending, the disk controller 112 will service them in the following order: Peek/poke cycles have the highest priority access to the EISA bus 46, followed by the two data channels. Once the disk controller 112 has gained control of the EISA bus 46, the controller will first perform any peek, poke, or locked exchange transfers that may be pending. If there are no peek, poke or locked exchange transfers pending, the disk controller 112 will run data transfers initiated by either of the two transfer channels.

The two transfer channels have equal priority with respect to each other and are serviced in an alternating fashion. The disk controller will continue to assert ownership of the EISA bus 46 until it has serviced all outstanding data transfer request or it is preempted from the EISA bus 46. The disk controller 112 may be configured to relinquish the EISA bus 46 immediately or for set time periods after a preempt signal is received across the EISA bus.

The transfer buffer interface 148 of portion of the BMIC 118 provides for signals essential for interfacing to the disk array controller 112 to the physical disk array. The transfer buffer interface 148 is connected to a high speed data transfer controller and utilizes simple logic similar to that used in traditional DMA designs. This interface includes a 16 bit data bus, one clock input and seven control signals. The 16 data lines are used by the BMIC 118 to transfer the data to and from the transfer controller 124 (FIG. 3) in the disk array controller 112. The BMIC 118 automatically assembles the data received from the transfer controller 124 into 32 bit double words for 32 bit transfers over the EISA bus 46. The data lines are also used by the BMIC 118 to transport internally generated transfer start and real time addresses to the local processor 122 for use during data transfers. The transfer data buffer interface 148 includes four 8 bit transfer buffer interface registers: two base registers and two current registers all of which may be programmed with 16 bit start addresses by the local processor 122. Each transfer channel has an associated base and current register pair. The base registers contain the start address and the current registers provide the real-time addresses used to track the current to transfer. The current registers automatically advance address 1 each time a 16 bit word is transferred across the transfer buffer interface 148. The 16 bit start address is transferred from the transfer buffer interface 148 to the transfer channel controller 124 (FIG. 3) at the beginning of all new data transfers. The contents of the transfer buffer interface 148 base registers are transferred to the transfer buffer interface 148 current registers. The BMIC 118 provides a load signal which may be used to latch the start address into an external address counter for use by the transfer channel controller 124.

The BMIC 118 may also be programmed by the local processor 122 (FIG. 3) to generate a transfer address each time an associated channel regains control of the EISA bus 46, in which instance, the address in the base register set is also the address in the current register set. By programming bit 7 in the channel configuration register to a "1", a start address will be transferred to the transfer channel controller 124 at the beginning of all new transfers and the real time addresses will be transferred each time the associated channel regains control of the EISA bus 46. If bit 7 in the channel configuration register is set to a "0", the transfer start address will be transferred at the beginning of all new transfers and the real-time address need not be transferred to the current channel configuration register.

The BMIC 118 also includes two identical first in first out buffers (FIFOs), one per a transfer channel and a common data aligner for data transfers between computer system memory 58 and the disk array controller. The primary function of the FIFO/data aligner unit 146 is to isolate and simplify timing relationships between the EISA bus 46 and the devices in the disk array controller 112. The FIFO 146 allow the timing on the disk array controller 112 side of the BMIC 118 to be based on locally generated clock signals. This local clock may be independent of the EISA bus clock signal that governs EISA bus 46 timing. The FIFO also provides latency protection for wait states generated on either the EISA bus 46 or the disk array controller. Each FIFO register 146 within the BMIC 118 is 24 bytes in size. The transfer data is loaded into the FIFOs from either the disk array controller 112 or the EISA bus 46 side, given the direction of the data transfer. The data is written into the FIFO as a double word during the data transfer. However, if the data is not a double word aligned, partial FIFO loads will be formed at the beginning or end of a transfer depending on the bit count, address program and the direction of the transfer. The condition of the FIFOs 146 may be determined by from the transfer channel status register set which will indicate whether the FIFOs 146 are stalled or active. A FIFO stall is defined as a FIFO that is full during an EISA read or empty during an EISA write. In either instance, the transfer channel controller 124 will be unable to maintain data transfer requested by the EISA device. If a FIFO stall occurs, the data transfer will be halted and the BMIC 118 will either service the transfer request with the highest priority or relinquish the EISA bus 46 to the computer system.

The data aligner function arranges the 16-bit data from the transfer channel controller 124 into an arbitrary bit alignment into system memory 58. The data aligner also performs the assembly and disassembly of the EISA data during the transfer. The data aligner 146 is also used to arrange bit alignment for the EISA bus 46 in the event of a misaligned double word boundary. The data aligner 146 will permit the BMIC 118 to do partial double word transfers as required at the beginning and the end of all such transfers.

The local processor interface 142 portion of the BMIC 118 contains two 8-bit registers through which the local processor 122 (FIG. 3) may access all the BMICs 118 internal registers. The registers are mapped into the local processor interface 142 and include a local data registers and a local index register. These registers are selected by the local processor 122 through the local processor interface 142 address lines. The local status/control register is also directly mapped into the local processor interface 142 and is used to provide the local processor 122 with interrupt peek/poke and base register status.

The local processor 122 (FIG. 3) and the EISA bus 46 communicate with each other through a set of command/status registers known as the shared I/O registers 144. The shared registers 144 include a set of mailbox registers, semaphore ports and doorbell registers. The mailbox registers are used to pass instructions and data to between the local processor and the EISA bus 46 and are controlled by the semaphore ports. The doorbell register set is utilized to inform the local processor 122 or EISA bus 46 side of the appearance of new messages. Also included as part of the shared I/O register set 144 are identification registers which are used to support EISA expansion for identification functions.

The two semaphore ports within the shared I/O register 144 are used for set and test functions in the I/O space. The ports are used to lock access to mailbox registers. Each of the two semaphore ports consist of a semaphore flag bit and a semaphore test bit. When a write occurs to the semaphore flag bit through either the EISA interface 140 or the local processor interface 142, the old value of the semaphore flag bit is copied to the appropriate semaphore test bit. The old value of the semaphore flag bit is then available and the test bit to be read back by either the local processor 122 or a device on the EISA bus 46. If the value read back from the semaphore test bit is a "1", the requested resource is unavailable for use. Conversely, if the value read back is a "0", the requested resource is available for use and will be locked by the requesting processor or bus master.

The mailbox register set comprises a set of sixteen 8-bit general-purpose registers utilized to pass information between the disk array controller and the EISA system C. The sixteen registers are mapped continuously into EISA slot-specific I/O space and may be accessed as bits, words or double words. The registers may be used directly to pass command and status information or may be used as pointers to larger command blocks in memory. The mailbox registers may be read or written at either time from either the EISA bus 46 or the local processor interface 142. The mailbox register set also includes an internal arbitration scheme which will prevent the existence of indeterminate bits in the event there is a simultaneous read and write from both sides of the mailbox register.

The shared I/O register 144 set also includes two 8-bit doorbell interrupt/status registers; one assigned to the EISA side and one assigned to the disk array controller side. The EISA system doorbell register set is utilized by the local processor 122 to request service from the EISA side of the BMIC and the local doorbell register is utilized by a device on the EISA side of the BMIC 118 to send an interrupt request to the local processor 122 on the disk array controller. The 8 bit doorbell registers permit up to eight separate devices or events in each direction to have interrupt request simultaneously pending. Each doorbell register has an associated 8-bit interrupt enable register which may be used to enable or disable the interrupts for the doorbell register on an individual basis. The BMIC 118 also includes a system interrupt enable/control register and a local status/control register used to disable the system and local interrupts and to verify the status of the system and local interrupts on a global basis. Each device or event that may interrupt the disk array controller 112 may be assigned a bit position within the BMIC's 118 local interrupt/status doorbell register. When the device on the EISA bus 46 attempts to send an interrupt request to the disk array controller, it writes to the local interrupt/status doorbell register from the EISA side with the devices assigned bit position set active. This will set that bit in the local interrupt/status doorbell register but leave other bits in the register unaffected. If that bit position has not been disabled by the system interrupt enable/control register, the interrupt signal will be passed on through the local processor interface 142 to the local processor 122. When the local processor 122 services the interrupt, it will read the local status/control register to determine the source of the interrupt. If the control register indicates that the local doorbell register is one of the enabled interrupt sources, the local processor 122 will read the local doorbell register to determine which bits are active and the requesting interrupts. The local processor services one of the request from the local doorbell register, it will write to the local doorbell register with the bit position set. This will cause that bit in the local doorbell register to reset but the other bits will remain unaffected.

V. Data Distribution Operation

The method of the present invention is implemented as a number of application tasks running on the local process 122 (FIG. 3). Because of the nature of interactive input/output operations, it is impractical for the present invention to operate as a single batch task on a local processor 122. Accordingly, the local processor 122 utilizes a real time multitasking system which permits multiple tasks to be addressed by the local processor 122, including the present invention. Preferably, the operating system on a local processor 122 is the AMX86 Multitasking Executive by Kadak Products Limited. The AMX operating system kernel provides a number of system services in addition to the applications which compose the present invention.

A. Overview of Command Submission

When a new command list 200 is submitted to the disk array controller 112, the system processor 20 determines if the transfer channel is clear. If the channel is busy, the system processor 20 may poll, waiting for the channel to clear, or it may unmask the channel clear interrupt so that it will be notified when the disk array controller clears the channel. FIG. 4 is a flowchart of the method used to submit a new command list 200 to the disk array controller 112. Operation of submission begins at step 300. The local processor 122 receives notification of submission a command list from the doorbell register in step 302. Control transfers to step 304 the local processor 122 determines whether the channel 0 (command submission channel) is clear. If the channel is clear, control transfers to step 306, wherein the BMIC 118 resets the channel clear bit. Control transfers to step 308, wherein the BMIC 118 loads the command list address, length and tag I.D. to the mailbox registers to be read by the local processor. Control transfers to step 310 wherein the local processor 122 sets the channel clear bit to busy. Control transfers to step 332 which terminates the submission of the command. If in step 304 the local processor 122 determines that the command submit channel is not clear, control transfer to step 312, wherein the local processor 122 determines whether the command list submission is a priority submission. If not a priority submission, control transfers back to step 304, wherein the local processor 122 continues to check for a channel clear state. If in step 312, the local processor 122 determines that the command list submission is a priority submission, control transfers to step 316, wherein the local processor 122 places the command list address length in a tag I.D. into a ring queue, effectively queuing the command list 200 to be transferred by BMIC 118 when the command submission channel is clear. Control transfers to step 318 wherein the local processor 122 unmasks the channel clear interrupt bit. On service of the interrupt by the local processor, control transfers to step 320 which resets the channel clear. Control transfers to step 322 which then dequeues the command list and transfers the command list 200 to the BMIC 118 mailbox register. Control transfers to step 324 which loads the command list address, length and tag I.D. into the channel registers. Control transfers to step 326 which determines whether the command list submission queue is empty. If the command list submission list queue is empty, control transfers to step 328, in which the local processor 122 masks the channel clear interrupt bit. Control transfers to step 332, which terminates the command list submission routine. If the local processor determines in step 326 that the queue is not empty, control transfers to step 330 which sets the channel busy bit. Control is then transferred to step 332 which terminates the submission of the command list.

1. Disk RIS Sectors

The method of the present invention calls for the use of reserved sectors on each disk within the logical unit. The reserved information sectors ("RIS") include information which relate to the individual drives, the logical unit in its entirety, configuration signature, RIS revision level and individual drive status. These RIS parameters include individual drive parameters such as: the number of heads for a particular drive; the number of bytes per track for a drive; the number of bytes per sector for a drive; and the number of sectors per track for a drive and the number of cylinders. On a more global level, RIS information will include the particular drive I.D.; the drive configuration; the physical number of drives which make up the logical unit; logical unit physical parameters and the drive state for a particular drive.

The RIS data also includes information which applies to the logical unit in its entirety as opposed to individual drives. This type of information includes the particular volume state; a compatibility port address; the type of operating system and interleave factor being used; the fault tolerance mode being utilized; and the number of drives which are actually available to the user, as well as logical physical parameters including cylinders, heads, etc. The RIS data is utilized for purposes of configuring the logical unit as well as management of fault tolerance information.

The present invention is directed to accepting a complete logical command (including scatter/gather descriptors) and translating the logical commands to the physical operations necessary to fulfill the logical command. This translation process includes converting the original scatter/gather descriptions into drive specific information that accompanies each physical command. The translation process is based on the selected controller configuration, which takes into account the divisions of drives within the array into groups, the physical characteristics of the drives within each group within the logical unit, the selected error correction mode for the particular drive group, the selected parameters for the drive group, and the error history of the drive group. What follows is the method by which the present invention selects the mapping scheme to be used in distributing or gathering the data. The preferred embodiment reads a field within the configuration information which specifies the distribution techniques.

2. Logical Unit Configuration

Figure 5A:
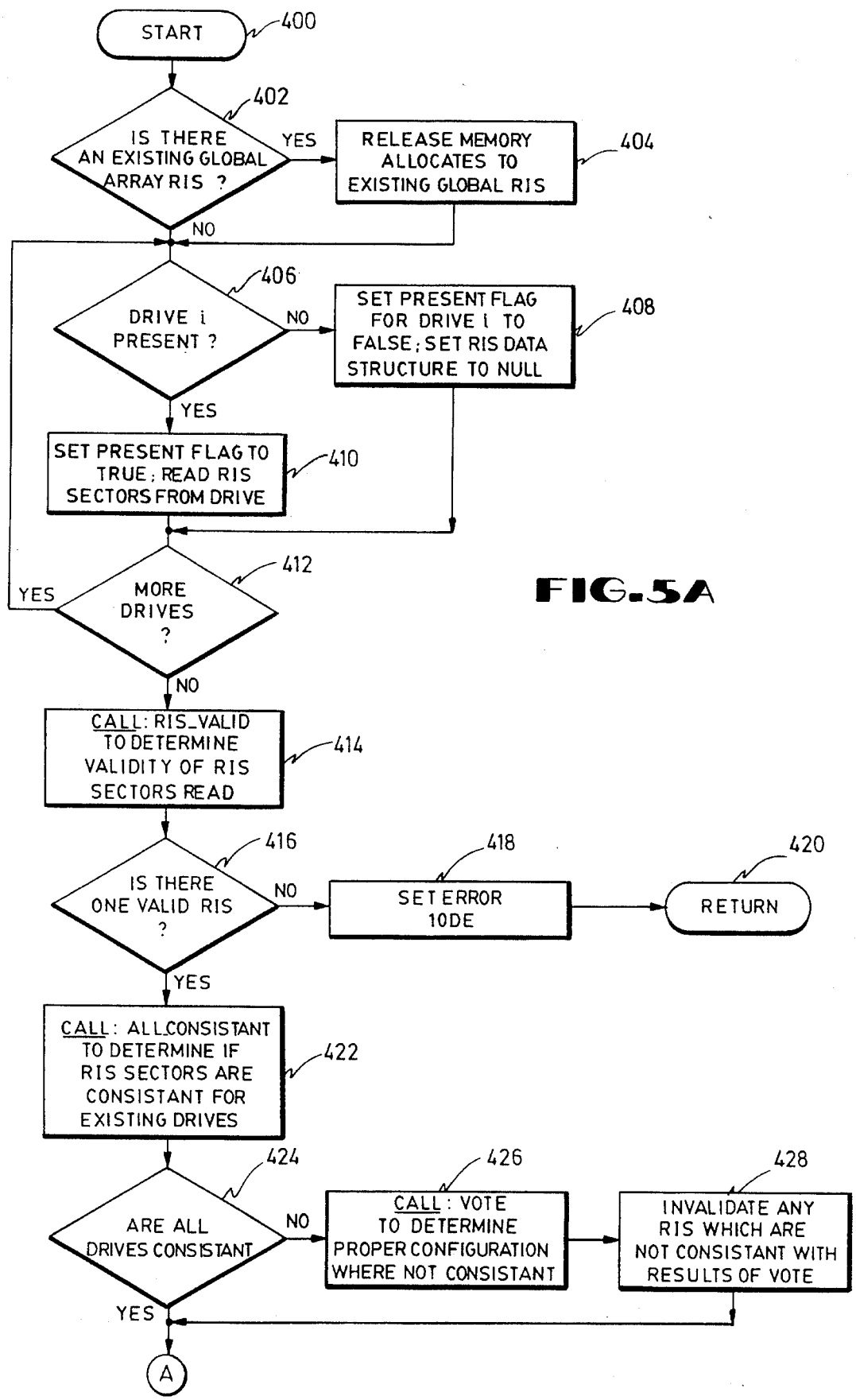
FIG. 5A and 5B are flow diagrams of the manner in which the preferred embodiment initiates configuration for a disk array.
Figure 5B:
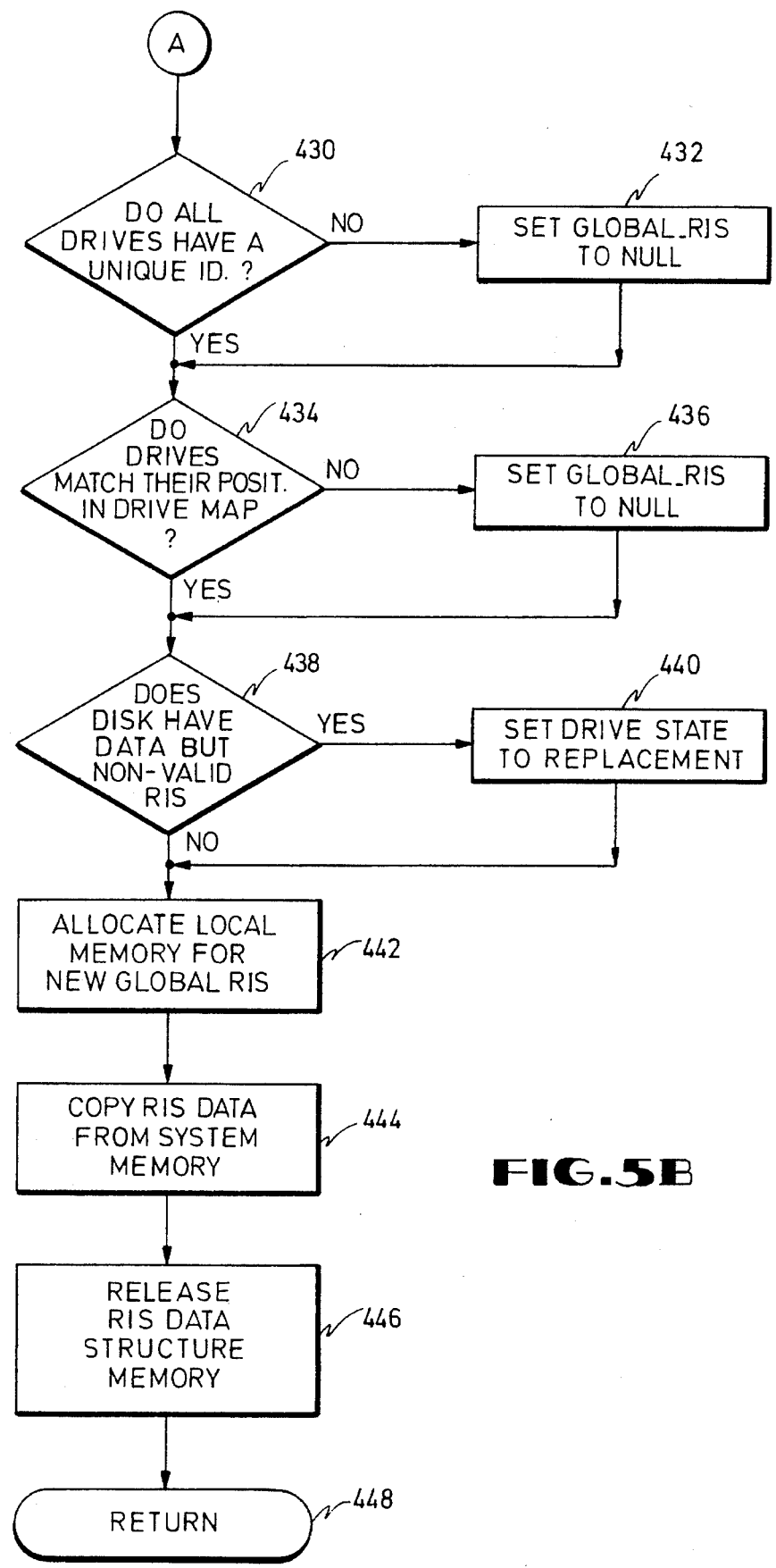
Figure 7A:
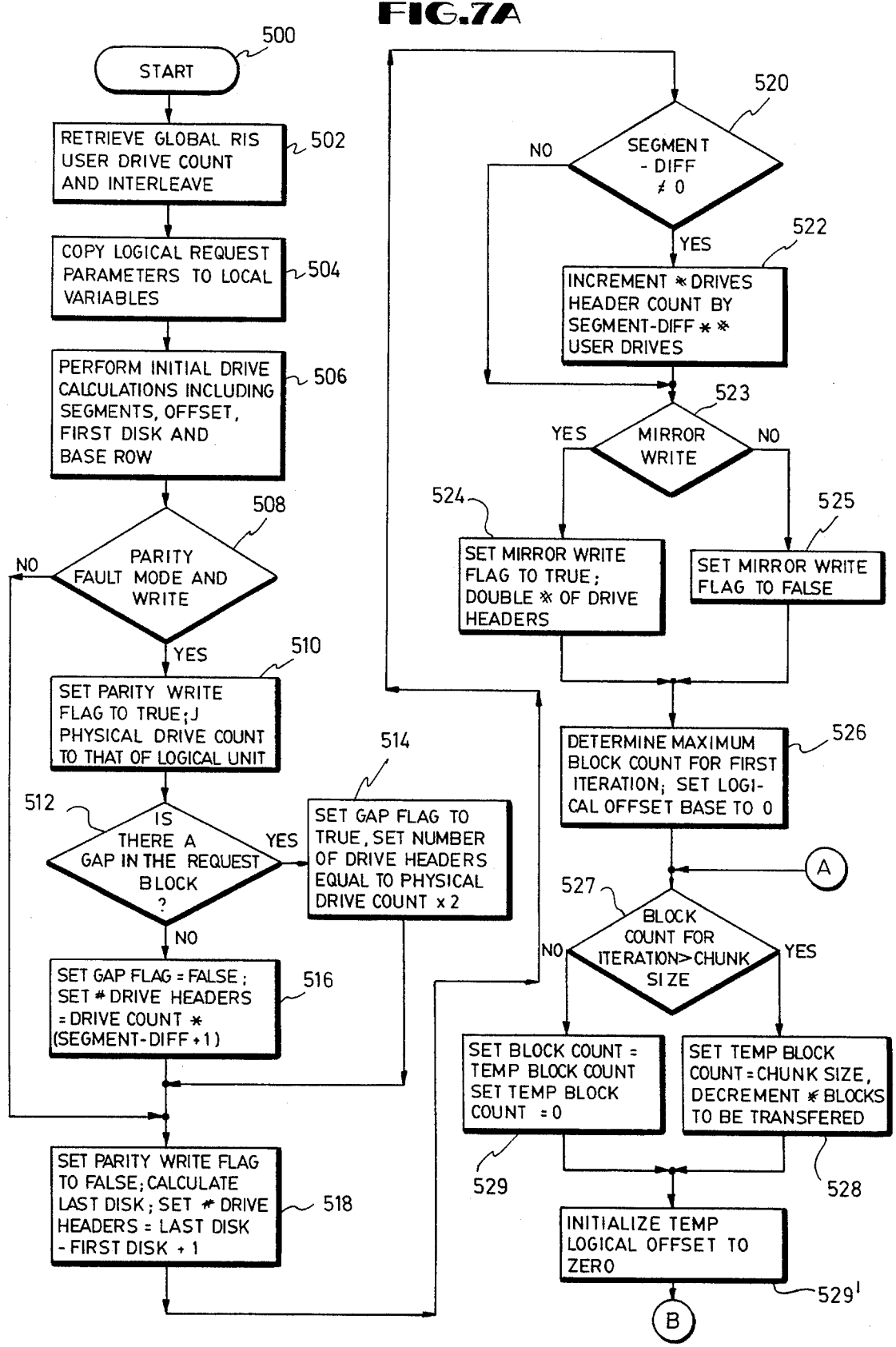
Figure 7C:
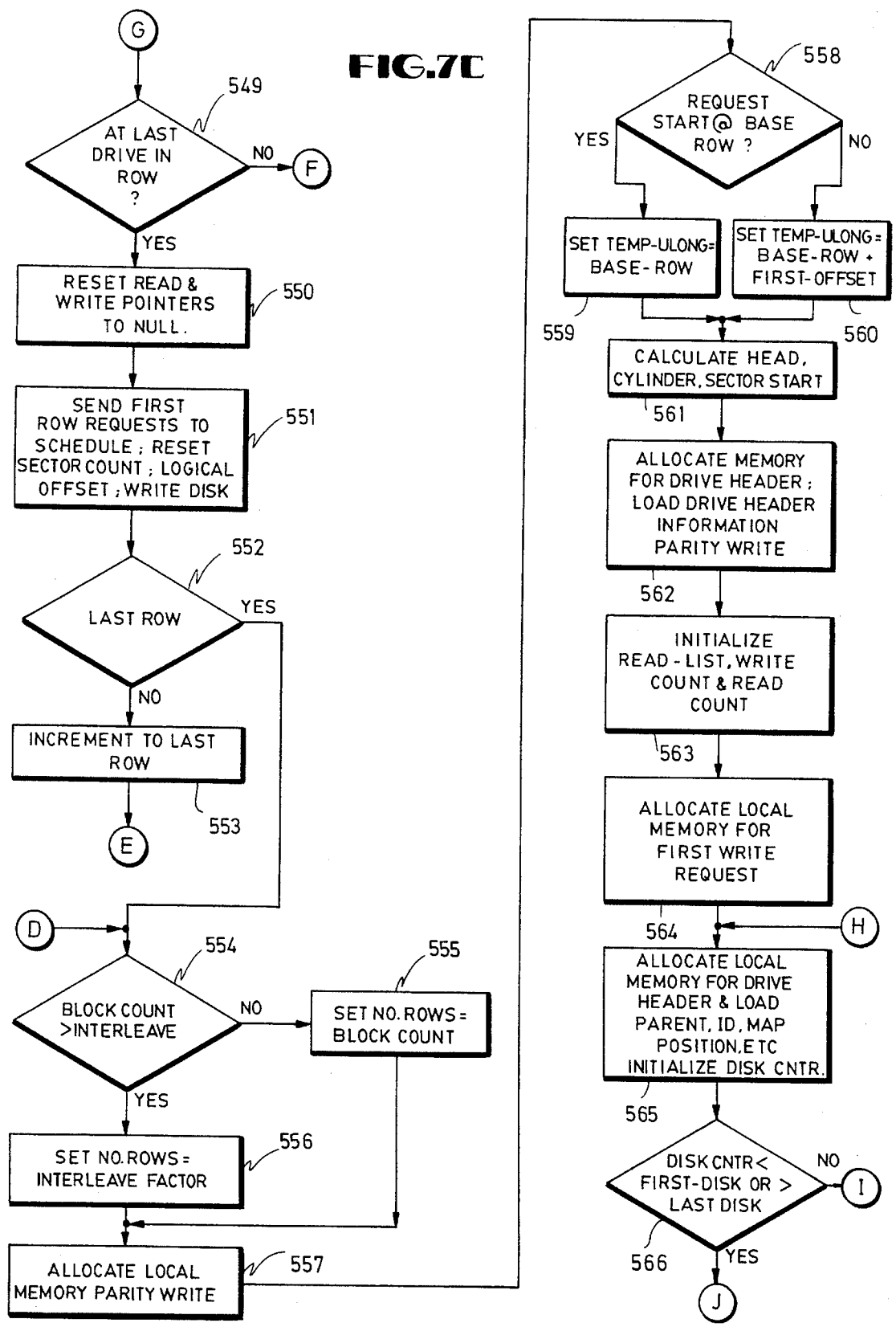
Figure 7D:
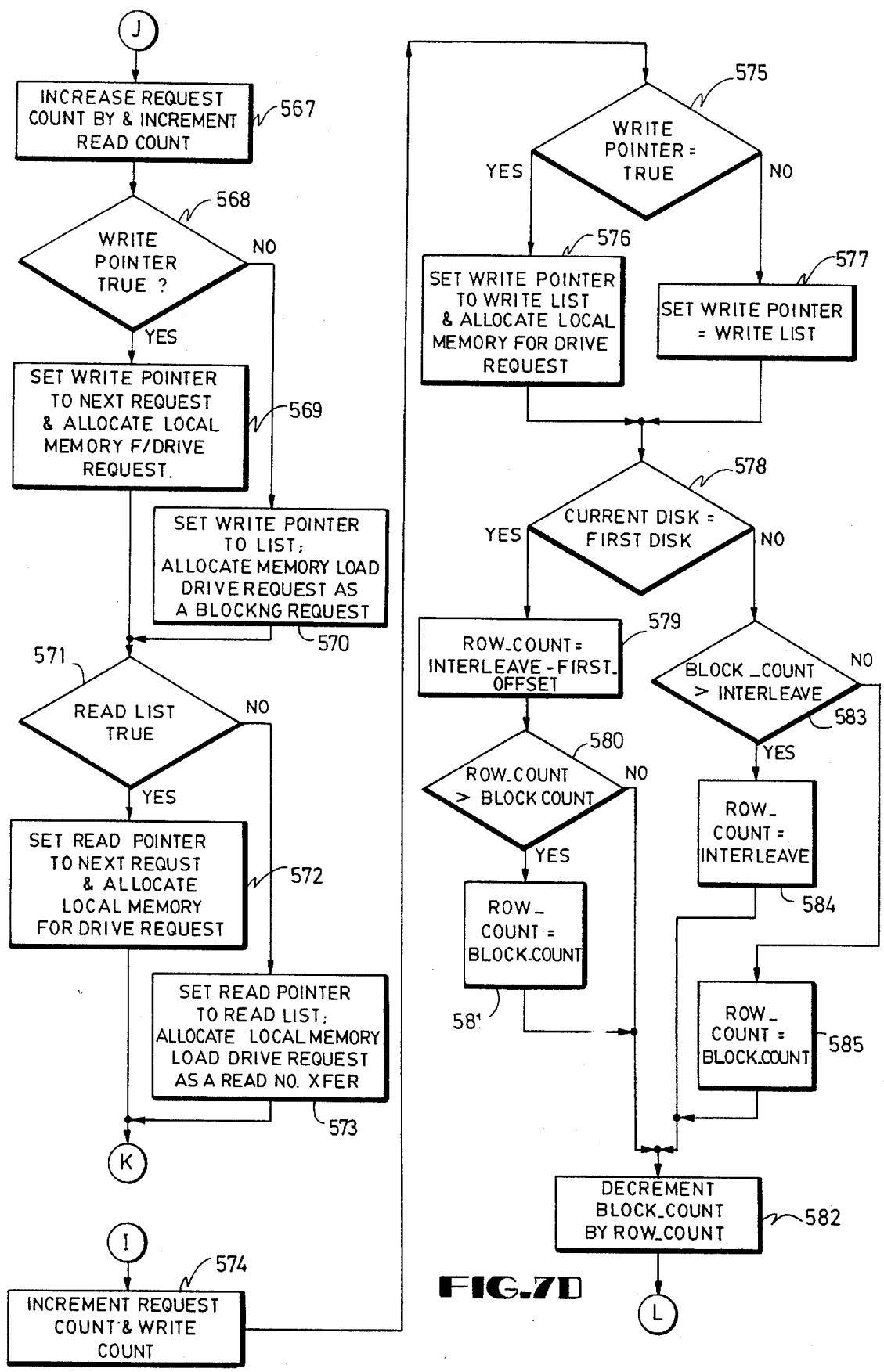
Figure 7F:
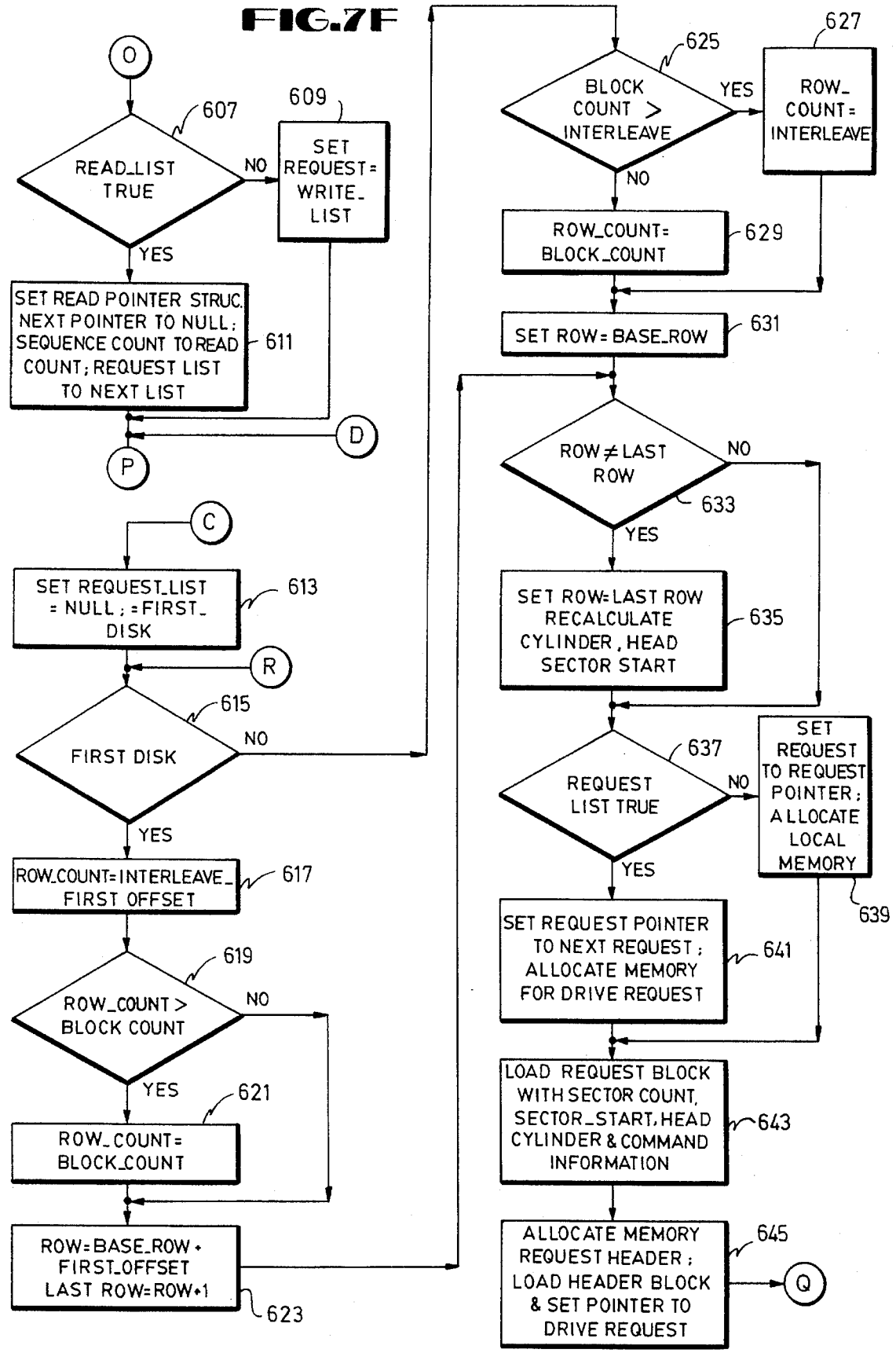
Figure 7G:
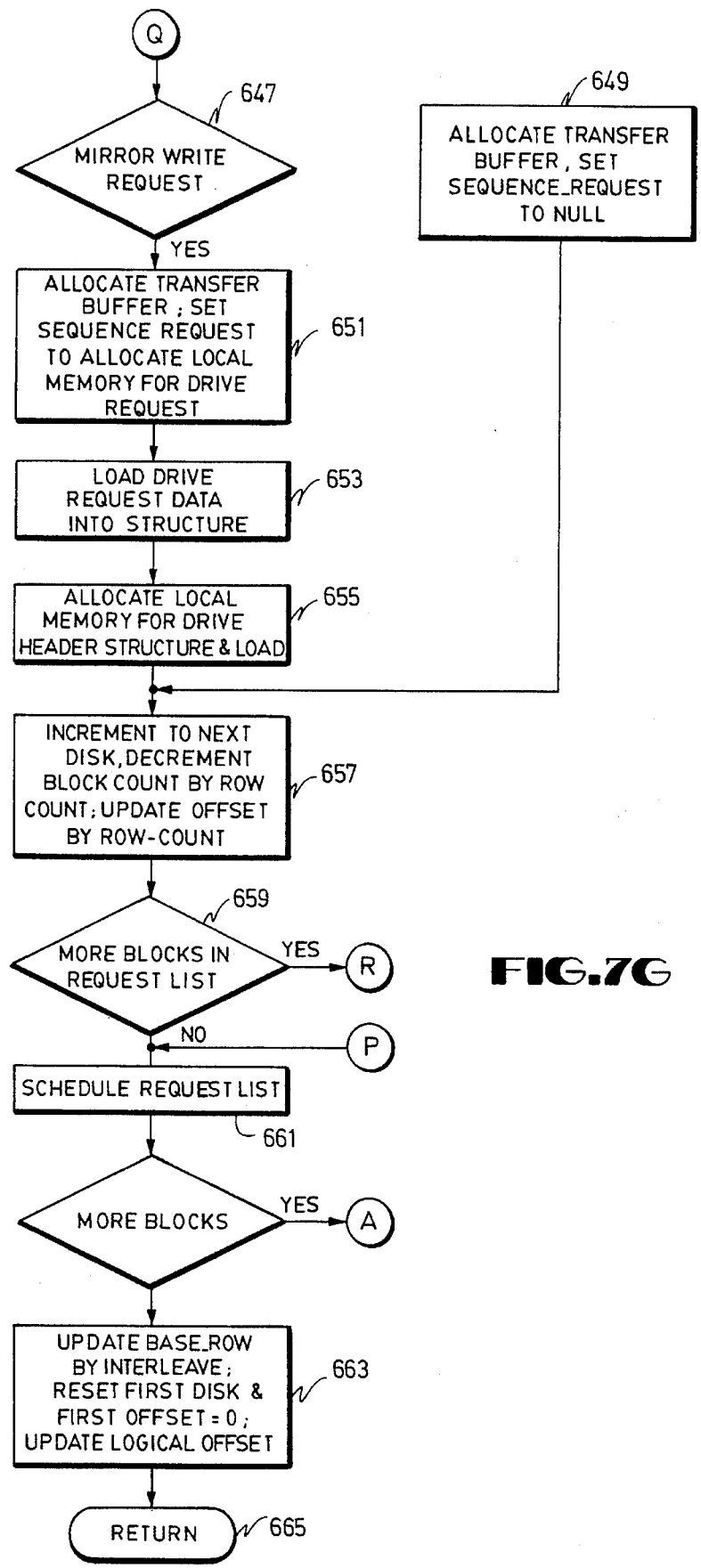
Figure 8A:
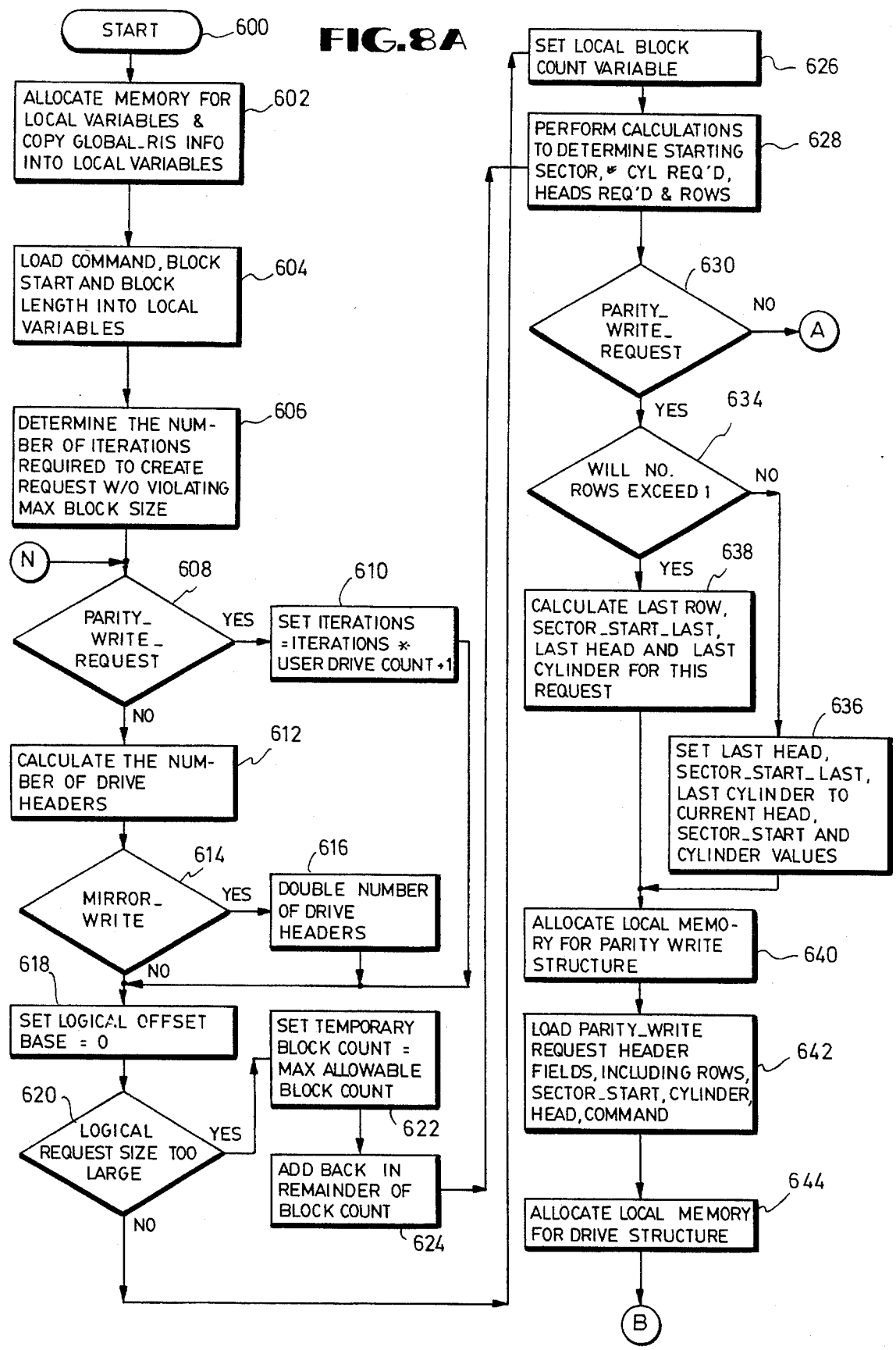
Figure 8C:
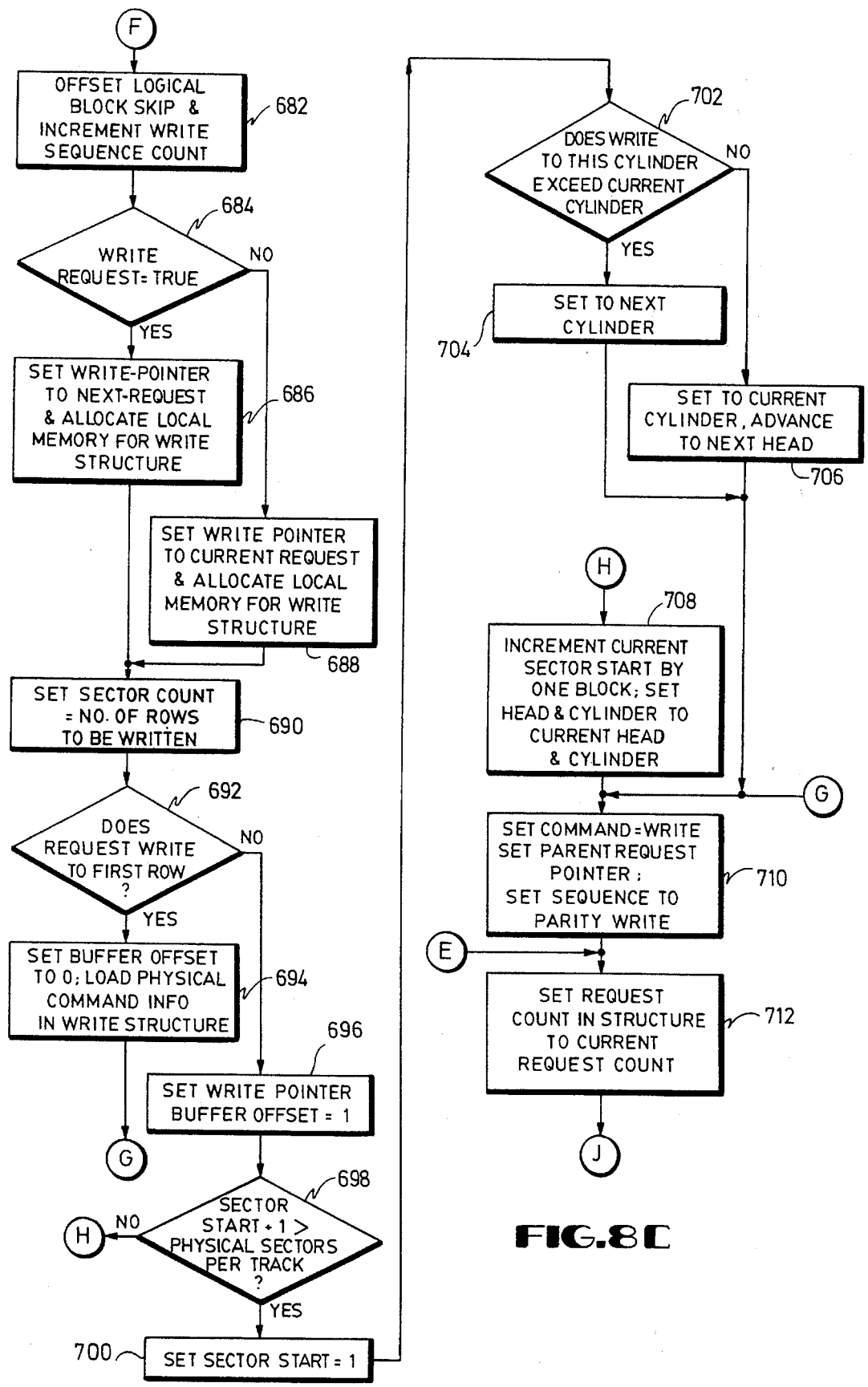
Figure 8D:
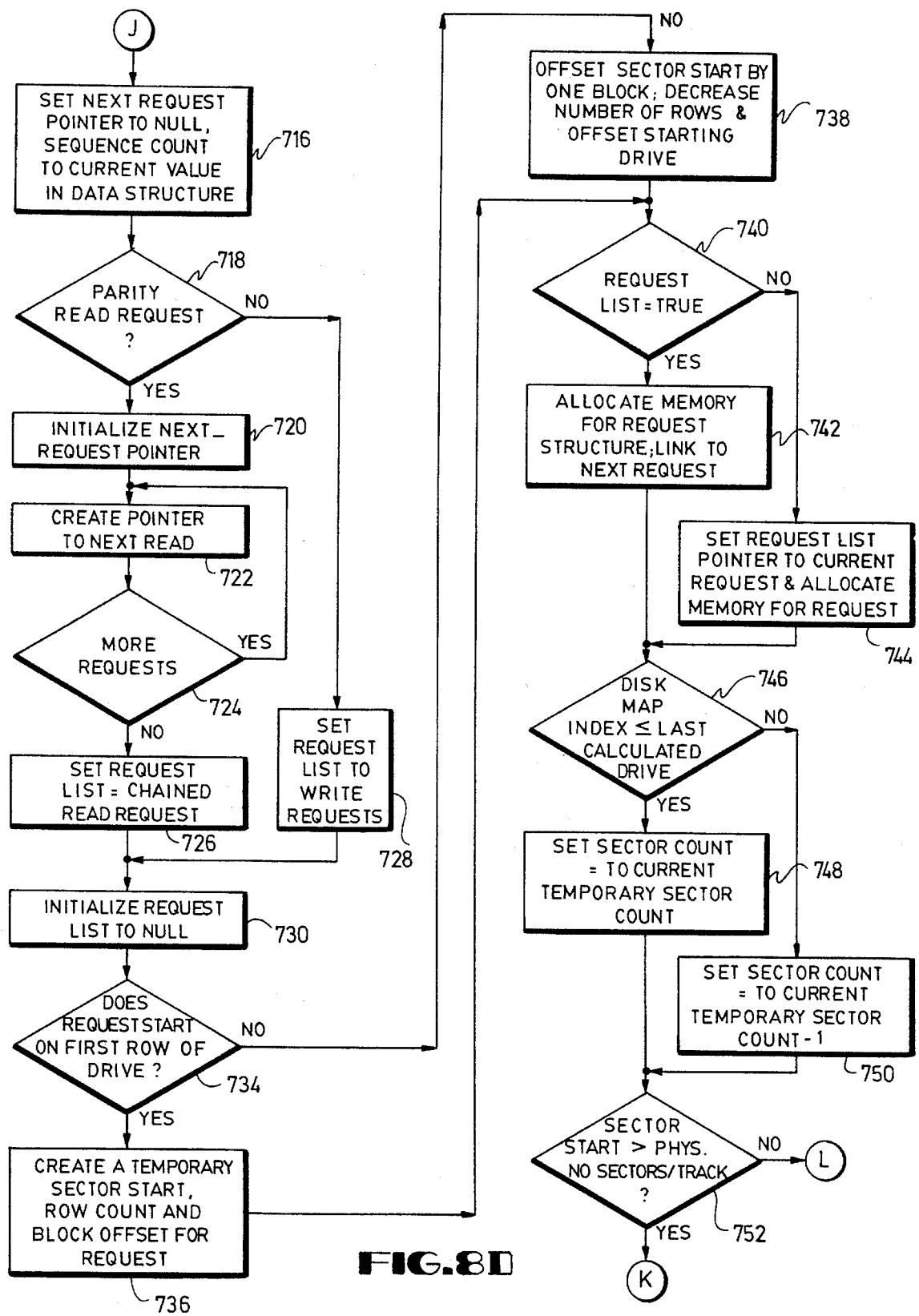
Figure 8F:
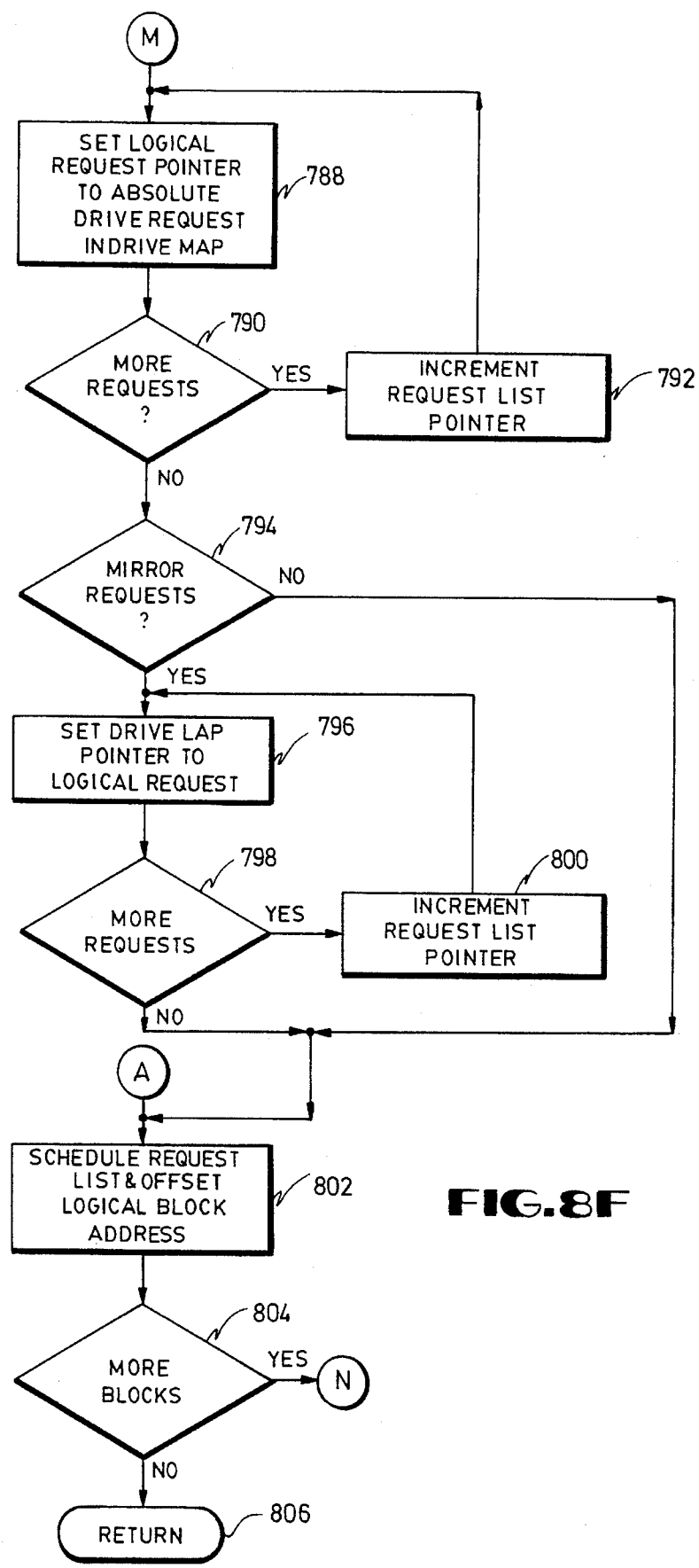

FIGS. 5A and 5B are flow diagrams of the method utilized by the preferred embodiment according to the present invention to load a configuration for a particular disk array. A disk array configuration is created by the EISA configuration utility (see Appendix 1) and stored in system CMOS memory. Upon power up of the computer system, the system processor 20 sets a pointer to the disk configuration in CMOS memory and sends this information to the local processor 122 via the BMIC 118. The local processor 122 then builds and verifies the disk configuration. Operation begins at step 400. Control transfers to step 402, wherein the local processor 122 determines if there is an existing GLOBAL RIS for the array by reading the reserved information sectors. If there is an existing RIS, control transfers to step 404, wherein the local processor 122 releases the memory for the existing disk array GLOBAL RIS. Control then transfers to step 406. If in step 402, the local processor 122 determines that there is no existing GLOBAL RIS, control transfers to step 406. In step 406 the local processor 122 determines whether the first physical drive in the array is present. If the first drive is not physically present, control transfers to step 408 wherein the local processor 122 sets the flag for the drive to FALSE and sets the drive RIS data structure to a NULL value. Control transfers to step 412. If in step 406 the local processor 122 determines that the drive being addressed is present, control transfers to step 410, wherein the local processor 122 sets a flag for the present drive to TRUE. The local processor the reads 122 then RIS sectors from the selected drive. Control transfers to step 412. In step 412 the local processor 122 determines whether there are additional drives within the disk array. If there are additional drives, control transfers to step 406. If there are no more drives in the array, control transfers to step 414. In step 414, the local processor calls routine RIS_VALID which is used to determine the validity of the RIS sectors for each of the drives read. Control transfers to step 416. In step 416 the local processor 122 determines whether the RIS_VALID subroutine has found at least one valid RIS structure among the individual disk RIS information. If no valid RIS structures have been found, control transfers to step 418 wherein the local processor 122 sets an error code and control transfers to step 420, which returns to the calling program. If in step 416 the local processor 122 determines that there is at least one valid RIS structure, control transfers to step 422. In step 422, the local processor 122 calls function ALL_CONSISTENT. The ALL_CONSISTENT function determines if the RIS sectors are consistent among all existing drives with the exception of a particular drive I.D. Control transfers to step 424. In step 424 the local processor 122 determines whether ALL_CONSISTENT has returned a code which indicates that all drives have consistent RIS data within their structures. If the drives are not consistent, control transfers to step 426, wherein the local processor 122 calls routine VOTE to determine which of the existing valid RIS data structures is to be used to configure the entire array. Routine VOTE returns a RIS data structure which is to be used as a template for the remaining disk drives within the disk array. Control transfers to step 428, wherein the local processor 122 invalidates any RIS data structures among the drives which are not consistent with the template returned by routine VOTE. Control transfers to step 430.

If in step 424 it is determined that all drives are consistent, control transfers to step 430. In step 430, the local processor 122 determines whether all drives have a unique drive I.D. If the drives do not have unique drive I.D.'s, control transfers to step 432, wherein the local processor 122 sets the GLOBAL RIS data structure to null value and control transfers to step 434. If in step 430, the local processor 122 determines that all drives have a unique I.D., control transfers to step 434. In step 434, the local processor 122 determines whether the drive being addressed matches its position in the drive map as determined by the GLOBAL RIS. This would indicate whether a particular drive within the array has been moved with respect to its physical location within the array. If the drives does not match its expected position within the drive map, control transfers to step 436, wherein the local processor 122 sets the GLOBAL RIS data structure to NULL. Control transfers to step 438. If it is determined in step 434 that the drives match their position within the drive map, control transfers to step 438, wherein the local processor 122 determines whether a disk has RIS data but a non-valid RIS structure. If the particular disk has RIS data but non-valid RIS structure, control transfers to step 440 wherein the local processor 122 sets the drive status flag to indicate that the drive is a replacement drive. Control transfers to step 442. If it is determined in step 438 that the disk does not have data and non-valid RIS structure, control transfers to step 442. Steps 430–440 are used to test each drive within the drive array. In step 442 the local processor 122 allocates local memory for a new GLOBAL RIS data structure. Control transfers to step 444, wherein the local processor 122 copies RIS data structure as determined by either the consistent configuration or the template as determined by VOTE. Control transfers to step 446, wherein the local processor 122 releases local RIS data structure memory, and writes the new GLOBAL RIS to all drives within the array. Control transfers to step 448 which terminates operation of the current function and returns control of the local processor 122 to the calling program.

3. Distribution Scheme Selection

FIG. 6 is a flow diagram of the manner in which logical commands are received and processed by the current invention. Operation begins in step 450. Control transfers to step 451 wherein the local processor 122 reads the logical request and forwards the logical request data to a switch set which chooses the particular mapping scheme based on the fault tolerance mode, controller type, operating system and the logical request. Control transfers to step 452, wherein if configuration information indicates a standard operating system, the local processor calls the STANDARD_MAPPER function. If a direct map onto the disks within the array is required, in step 454 the local processor 122 will call the DIRECT_MAPPER function. If it is determined from the configuration and the logical request that the request is a multiblock request, in step 456 the local processor 122 will call the MULTI_BLOCK_MAPPER function. The logical request will have been sent to one of the three mapping functions set forth in step 452–456. Control transfers to step 458 which terminates the operation of this particular function.

4. MULTI_BLOCK Mapper Module

FIGS. 7A through 7G are flow diagrams of the MULTI-BLOCK MAPPER method of distribution of data within a logical unit. MULTI-BLOCK MAPPER is called by the MAPPER function and begins operation at step 500. Control transfers to step 502, wherein the local processor 122 retrieves global RIS use drive count and interleave information. Control transfers to step 504, wherein the local processor 122 copies logical request parameters from the command list to local variables. Control transfer to step 506, wherein the local processor 122 performs initial drive calculations as follows:

| | |
|---|---|
| Temp_Block | = Block_Start + Block_Offset |
| Sectors_Per_Segment | = User_Drive_Count* Interleave |
| Last_Block | = Temp_Block + Block_Count-1 |
| Last_Segment | = Last_Block/Sectors_Per_Segment |
| First_Segment | = Temp_Block/Sectors_Per_Segment |
| Offset_Block | = Temp_Block-(First_Segment* Sectors_Per_Segment) |
| First_Disk | = Offset_Block-(First_Disk* Interleave) |
| Segment_Diff | = Last_Segment-First_Segment |
| Base_Row | = First_Segment* Interleave |

Control transfers to step 508, wherein the local processor 122 determines whether the current command is a write and the logical unit RIS structure specifies parity fault tolerance mode. If yes, control transfers to step 510, wherein the local processor 122 sets the parity write flag to true and sets the physical drive count equal to the physical drive count specified in the logical RIS. Control transfers to step 512, wherein the local processor 122 determines whether blocks being written to are non-contiguous or there is a gap. If the blocks are non-contiguous, control transfers to step 514, wherein the local processor 122 sets the gap flag to TRUE and sets the number of drive headers required for the current request equal to the number of physical drives times 2. Control then transfers to step 518. If in step 512, that there is no gap, control transfers to step 516, wherein the local processor 122 sets the gap flag equal to FALSE and sets the number of drive headers equal to the drive count times the segment difference +1. Control transfers to step 518. If in step 508 the local processor 122 determines that the command is not a write and the logical unit is not in parity mode, control transfers to step 518. In step 518, the local processor 122 sets the parity_write flag to FALSE and recalculates the last offset block and the last disk. Further, the local processor 122 recalculates drive count and sets it equal to the last_disk—the first disk +1. Control transfers to step 520, wherein the local processor 122 determines whether segment_difference is not equal to 0. If not equal to 0, control transfers to step 522, which increases the drive header count by the segment difference times the number of user available drives. Control transfers to step 523. If in step 520 it is determined that the segment difference is equal to 0, control transfers to step 523. In step 523, the local processor 122 determines whether the request type is a write and whether the logical unit is in a mirror fault tolerance mode. If the array is in mirror fault tolerance mode, control transfers to step 524, wherein the local processor 122 sets a mirror write flag equal to TRUE and doubles the number of drive headers required to account for writes to the mirror drives. Control transfers to step 526. If in step 523 it is determined that the request type is not a write or the logical unit is not in a mirror tolerance mode, control transfers to step 525 wherein the local processor 122 sets the mirror_write flag to FALSE. Control transfers to step 526.

In step 526, the local processor 122 determines the maximum block count size for the first iteration. Further, the local processor 122 initializes the logical offset base to 0. Control transfers to step 527, wherein the local processor 122 determines whether the block count for the iteration is larger than the current set chunk_size of 1K bytes. If yes, control transfers to step 528, wherein the local processor 122 sets the temporary block count equal to the chunk size and decrements the number of blocks to be transferred. Control transfers to step 529. If in step 527, the local processor 122 determines that the block count for the iteration is not larger than the chunk size, control transfers to step 529, wherein the local processor 122 sets the block size equal to the temporary block count and the number of blocks to be transferred is set to equal to zero. This indicates that this is the last iteration for the MULTI_BLOCK MAPPER loop. Control transfers to step 529.

In step 529, the local processor 122 initializes the temporary logical offset to 0. Control transfers to step 530, wherein the local processor 122 determines whether the parity write request flag is equal to TRUE. If not, control transfers to step 613. If yes, control transfers to step 531, wherein the local processor 122 recalculates last_disk_segment. Control transfers to step 532, wherein the local processor 122 determines whether the gap flag has been set to TRUE. If not, control transfers to step 661. If yes, control transfers to step 533, wherein the local processor 122 initializes a write for the upper row of disks and sets local variables equal to the current base_row; last_disk_segment; sector_count and logical_offset. Control transfers to step 534, wherein the local processor 122 recalculates physical parameters including cylinder, head and sector start based on the base_row. The local processor 122 also sets the read pointer and write pointer to NULL and allocates local memory for a drive request.

Control transfers to step 535, wherein the local processor 122 allocates local memory for a drive header. Control transfers to step 536, wherein the local processor 122 determines whether the current drive is to be written to. If yes, control transfers to step 537, wherein the local processor 122 determines whether the current disk is equal to the disk specified by the last_disk_segment. If yes, control transfers to step 538, wherein the local processor 122 sets the pointer equal to the next write request and allocates local memory for the drive request. Control transfers to step 548. If in step 537, the local processor 122 determines that the current disk is not equal to the disk specified in the last segment, control transfers to step 539, wherein the local processor 122 sets the write pointer to the write list and allocates local memory for the drive request. Further, the local processor 122 loads the command information into the drive request. Additionally, the local processor 122 allocates transfer buffer space for the request and sets a pointer back to the logical request. Control transfers to step 548.

If in step 536, the local processor 122 determines that the current disk is not to be written to, control transfers to step 540, wherein the local processor 122 determines whether the current disk is equal to the number of user drives in the logical group. If yes, control transfers to step 541, wherein the local processor 122 allocates local memory for the drive request and loads the request command structure and advances to the next user drive. Control transfers to step 548. If in step 540, the local processor 122 determines that the current disk is not equal to the number of user drives in the logical group, control transfers to step 542, wherein the local processor 122 determines whether the write pointer is set to TRUE. If yes, control is transferred to step 543, wherein the local processor 122 allocates memory for the drive request and sets the write pointer to the next request. Control transfers to step 545. If in step 542 it is determined that the write pointer is not set to TRUE, control transfers to step 544, wherein the local processor 122 sets the write pointer to the next request and the write list and allocates local memory for the write request. A local processor 122 further loads the request including sector and command information. This effectively blocks out the remainder of the disk array row for this particular request. Control transfers to step 545.

In step 545, the local processor 122 determines whether the read pointer is set to True. If yes, control transfers to step 546, wherein the local processor 122 sets the read pointer to the next request and allocates local memory for a drive request. Control transfers to step 548. If in step 545 it is determined that the read pointer is not set to TRUE, control transfers to step 547, wherein the local processor 122 sets the read pointer to the read list and allocates memory for a drive request. Further, the local processor 122 loads the drive request for the dummy read command; that is a command which specifies a read and no transfer. Control transfers to step 548.

In step 548, the local processor 122 loads the remainder of the drive request with cylinder, sector count, sector start, head and logical request information. Control transfers to step 549, wherein the local processor 122 determines whether the current drive is the last drive in the row. If not, control transfers to step 535. If yes, control transfers to step 550, wherein the local processor 122 resets the read and write pointers to NULL. Control transfers to step 551, wherein the local processor 122 sends the first row request to be scheduled. The local processor 122 then resets the sector_count, logical_offset and write pointers. Control transfers to step 522, wherein the local processor 122 determines whether the current row is equal to the last_row. If not, control transfers to step 553, wherein the local processor 122 increments to the next row. Control then transfers to step 533.

If in step 552 it is determined that the current row is equal to the last_row, control transfers to step 554. In step 554, the local processor 122 determines whether the block_count is greater than the interleave factor. If not, control transfers to step 555, wherein the number of rows is set equal to the block_count. Control transfers to step 557. If in step 554 it is determined that the block_count is greater than the interleave factor, control transfers to step 556, wherein the local processor 122 sets the number of rows equal to the interleave factor. Control transfers to step 557. In step 557, the local processor 122 allocates local memory for a parity_write request. Control transfers to step 558, wherein the local processor 122 determines whether the request starts at the currently calculated base_row. If yes, the local processor 122 sets a temporary variable equal to the base_row.

Control transfers to step 561. If is step 558 it is determined that the request does not start at the base_row, control transfers to step 560, wherein the local processor 122 sets the temporary variable equal to the base_row+first_offset. Control transfers to step 561. In step 561, the local processor 122 recalculates the head, cylinder and sector start information based upon the temporary variable. Control transfers to step 562, wherein the local processor 122 allocates local memory for a drive header and loads drive header information including drive map, drive ID, and logical pointer. Further, the local processor 122 completes the loading of the parity write data structure. The control transfers to step 563, wherein the local processor 122 initializes the read list, write count and read count. Control transfers to step 564, wherein the local processor 122 allocates local memory for the first write request. Control transfers to step 565, wherein the local processor 122 allocates local memory for a drive header and loads the pointer, ID, map position into the drive header. Further, local processor 122 initializes the disk counter. Control transfers to step 566, wherein the local processor 122 determines whether the disk count value is less than first_disk value or greater than the last_disk segment value. If not, control transfers to step 574. If yes, control transfers to step 567, wherein the local processor 122 increases the request_count by 2 and increments the read count. Control transfers to step 568, wherein the local processor 122 determines whether the write pointer is set to TRUE. If yes, control transfers to step 569, wherein the local processor 122 sets the write pointer to the next request and allocates local memory for a drive request. Control transfers to step 571. If in step 568 it is determined that the write pointer is not equal to TRUE, control transfers to 570, wherein the local processor 122 sets the write pointer to the write list and allocates local memory for a write request. The local processor 122 further loads the drive request information and sets the drive command equal to a blocking command. Control transfers to step 571. In step 571, the local processor 122 determines whether the read list flag is set to true. If set to TRUE, control transfers to step 572, wherein the local processor 122 sets the read pointer to the next request and allocates local memory for the drive request. Control transfers to step 601. If in step 571, the local processor 122 determines that the read list flag is not equal to TRUE, control transfers to step 573, wherein the local processor 122 sets the read pointer to the read list and allocates local memory for a drive request. The local processor 122 then loads the drive request with request command information and sets the command to a read, no transfer command. Control transfers to step 601. Steps 568 through 573 have the effect of creating a blocking request, such that a request including a write to a parity drive within the logical unit, is guaranteed to be performed prior to a read request to the very same disk within the unit. Without setting the blocking functions, it would be possible for a read request to be executed prior to the write request, thereby causing incorrect parity data to be read.

If in step 566 it is determined that the current disk counter value is not less than the first_disk value or greater than the last_disk value, control transfers to step 574, wherein the local processor 122 increments the request and write counters. Control transfers to step 575, wherein the local processor 122 determines whether the write pointer is set to TRUE. If TRUE, control transfers to step 576, wherein the local processor 122 sets the write pointer to the write_list and allocates local memory for a drive request. Control transfers to step 578. If in step 575 the local processor 122 determines that the write pointer is not set to true, control transfers to step 577, wherein the local processor 122 sets the write pointer to the write list. Control transfers to step 578. In step 578, the local processor 122 determines whether the current disk is equal to the first disk. If it is determined in step 578 that the current disk is equal to the first disk, control transfers to step 579, wherein the local processor 122 sets the row count equal to the disk interleave minus the first_offset. Control transfers to step 580, wherein the local processor 122 determines whether the current row count is greater than the block_count. If yes, control transfers to step 581, wherein the local processor 122 sets the row_count equal to the block_count. Control transfers to step 582. If in step 580 it is determined that the row_count is not greater than the block_count, control transfers to step 582. If in step 578 it is determined that the current disk is not equal to the first_disk, control transfers to step 583, wherein the local processor 122 determines whether the block_count is greater than the interleave factor. If yes, control transfers to step 584, wherein the local processor 122 sets the row_count equal to the interleave factor. Control transfers to step 582. If in step 583 it is determined that the block_count is not greater than the interleave factor, control transfers to step 585, wherein the local processor 122 sets the row_count equal to the block count.

In step 582, the local processor 122 decrements the block_count for the number of blocks of data to written by the number of blocks assigned to the particular row_count. Control transfers to step 586, wherein the local processor 122 determines whether the current starting address is a unique starting address by determining whether the current disk is set equal to the first disk and whether the first_offset is TRUE and that the current disk value is not equal to the last_disk_segment. If not a unique starting address, control transfers to step 592. If a unique starting address, control transfers to step 587, wherein the local processor 122 recalculates the cylinder head and sector start information based upon a variable equal to the base_row+first_offset. Control transfers to step 588, wherein the local processor 122 increments the request and read counts. Control transfers to step 589, wherein the local processor 122 determines whether the read list flag is set equal to TRUE. If set equal to TRUE, control transfers to step 591, wherein the local processor 122 sets the read pointer to the next request in the command list and allocates local memory for the read request. Control transfers to step 598. If in step 589 it is determined that the read list flag is set equal to FALSE, control transfers to step 590, wherein the local processor 122 allocates local memory for the drive request and loads the drive request as a read and no transfer thereby creating a blocking request. Control transfers to step 598.

If in step 586 it is determined that the starting address is not a unique starting address, control transfers to step 592, wherein the local processor 122 sets the write data structure pointers to the sector start, cylinder and head information which has been calculated for parity write values. Control transfers to step 593, wherein the local processor 122 increments request and read counters. Control transfers to step 594, wherein the local processor 122 determines whether the read list is set to TRUE. If set to TRUE, control transfers to step 595, wherein the local processor 122 sets the read pointer to the next request in the command list and allocates local memory for a drive request. Control transfers to step 597. If in step 594 it is determined that the read list is not set to TRUE, control transfers to step 596, wherein the local processor 122 sets the read pointer to the read list and allocates local memory for the drive request. Further, the local processor 122 recalculates the sector_count, head, cylinder and sector_start information based upon a variable equal to the base_row+row_count. The local processor 122 then loads drive header and drive request for the read command into the data structures and sets equal to a read, no transfer. Thus, the local processor 122 creates blocking requests to prevent a parity misread. Control transfers to step 597, wherein the local processor 122 determines whether the row_count is equal to the number of rows. If not, control transfers to step 593. If yes, control transfers to step 598. In step 598, the local processor 122 loads the write request data structure with sector_count equal to the row count, command set to write, sequence request set to parity write, and loads a pointer back to the request header. Control transfers to step 599, wherein the local processor 122 updates the header, logical block skip and offset field.

Control transfers to step 601, wherein the local processor 122 sets the request count field within the header's structure equal to the current request count maintained in a local variable counter. Control transfers to step 603, wherein the local processor 122 increments the drive counter by 1. Control transfers to step 605, wherein the local processor 122 determines whether the drive counter is less than the number of user_drives in the logical drive. If yes, control transfers to step 565. If not, control transfers to step 606, wherein the local processor 122 sets the write request structure pointers as follows: next_request is set to NULL; sequence_count is set to current user_drive_count; sequence_request is set to write_list; row_block is set equal to user_drive count+1; and row_unblock is set to write_count+1. Control transfers to step 607, wherein the local processor 122 determines whether read list is set to TRUE. If set to TRUE, control transfers to step 611, wherein the local processor 122 sets the read pointers to the current data structure to the next pointer, NULL, the sequence_count equal to read_count, and the request list equal to the read list. Control transfers to step 661. If in step 607 it is determined that the read list flag is not set to TRUE, control transfers to step 609, wherein the local processor 122 sets the request list equal pointer to the write list. Control transfers to step 661. If in step 530 the local processor 122 determines that the current request is not a parity write, control transfers to step 613. In step 613, the local processor 122 initializes variables, setting the request list pointer to NULL and the disk counter value equal to the first_disk. Control transfers to step 615, wherein the local processor determines whether the current disk is equal to the first_disk. If yes, control transfers to step 617, wherein the local processor 122 sets the row_count equal to the interleave—first_offset. Control transfers to step 619, wherein the local processor 122 determines whether the row_count is greater than the block_count. If yes, control transfers to step 621, wherein the row_count is set equal to the block_count. Control transfers to step 623. If in step 619, the local processor 122 determines that the row_count is not greater than the block_count, control transfers to step 623. In step 623, the active row is set to the value of the base_row+first_offset. Further, the local processor 122 recalculates the last_row equal to the row+1. Control transfers to step 633.

If in step 615 the local processor 122 determines that the current disk is not the first_disk value, control transfer to step 625, wherein the local processor 122 determines whether the block_count value is greater than the interleave factor. If yes, control transfers to step 627, wherein the local processor 122 sets the row_count equal to the interleave factor. Control transfers to step 631. If in step 625 the local processor 122 determines that the block_count is not greater than the interleave factor, control transfers to step 629, wherein the row_count is set equal to the block_count. Control transfers to step 631. In step 631, the local processor 122 sets the current value row equal to the base_row. Control transfers to step 633.

In step 633, the local processor 122 determines whether the current row value is not equal to the last_row. If true, control transfers to step 635, wherein the local processor 122 sets the row value equal to the last_row and recalculates cylinder, head and sector_start information based upon the row value. Control transfers to step 637. If in step 633 the local processor 122 determines that the row is equal to the last_row, control transfers to step 637. In step 637, the local processor 122 determines whether the request list flag is set to TRUE. If set to TRUE, control transfers to step 641, wherein the local processor 122 sets the request pointer to the next request and allocates local memory for the drive request. Control transfers to step 643.

If in step 637 it is determined that the request list flag is not set to TRUE, control transfers to step 639, wherein the local processor 122 allocates local memory for the request list. Control transfers to step 643. In step 643, the local processor 122 loads the request block with sector_count, sector start, head and request-type information. Control transfers to step 654. In step 654, the local processor 122 allocates local memory for the request header and loads header block information with the drive map position, request_count, row_count, drive ID, and logical_block_offset. Control transfers to step 647. In step 647, the local processor 122 determines whether the current request is a mirror write request. If not a mirror write request, control transfers to step 649 wherein the local processor 122 allocates transfer buffer space and sets the sequence_request pointer to NULL. Control transfers to step 657. If in step 647, it is determined that the mirror write flag is set to TRUE, control transfers to step 651, wherein the local processor 122 allocates transfer buffer space. Further, the local processor 122 sets the sequence_request pointer to the mirror pointer and allocates local memory for the drive request. Control transfers to step 653, wherein the local processor 122 loads drive request information including command, sequence_count, sequence_request, row_block and row_unblock. Control transfers to step 655, wherein the local processor 122 allocates memory for the drive header and loads the drive header information including a pointer back to the drive request. Control transfers to step 657. In step 657, the local processor 122 increments the disk pointer to the next disk. Further, the local processor 122 decrements the block_count value by the number of blocks assigned to the row and updates the logical_offset by the row_count. Control transfers to step 659, wherein the local processor 122 determines whether there are additional blocks in the request list. If yes, control transfers to step 615. If not, control transfers to step 661, wherein the local processor 122 schedules the disk request list by calling the SCHEDULE function. Control transfers to step 662, wherein the local processor 122 determines if there are additional request blocks in the command list. If there are additional request blocks, control transfers to step 527. If not, control transfers to step 663, wherein the local processor 122 updates the base row by the interleave value; resets the first_disk and first_offset values to zero and updates logical_offset. Control transfers to step 665, which returns to the calling program.

5. Direct Mapper

FIGS. 9A and 9B are flow diagrams of the DIRECT_MAPPER function. DIRECT_MAPPER is used to convert a logical request to a list of drive requests utilizing a direct logical to physical mapping scheme. Operation begins in step 550. Control transfers to step 552, wherein the local processor 122 allocates local memory for a copy of the GLOBAL RIS data into the local variables. Control transfers to step 554, wherein the local processor 122 reads a request command start address and command length. Control transfers to step 556 wherein the local processor 122 determines the number of drive headers required for the particular logical request. The logical request will be broken up into smaller segments such that the size of the physical request segments are not larger than a predefined maximum size. This ensures that the processing of the logical request will not cause system lockup as a result of the physical request requiring too much transfer buffer memory space. Control transfers to step 558, wherein the local processor 122 determines whether the disk array is in a MIRROR_WRITE tolerance mode. If in a MIRROR_WRITE tolerance mode, control transfers to step 560 wherein the local processor 122 doubles the number of calculated drive headers to account for duplicate write operations. Control transfers to step 562. If it is determined in step 558 that the disk array is not in a MIRROR_WRITE tolerance mode, control transfers to step 562. In step 562 the local processor 122 sets the logical offset base equal to 0, thus indicating the beginning block. Control transfers to step 564, wherein the local processor 122 reads the next request block. Control transfers to step 566, wherein the local processor 122 determines whether the block count associated with the request exceeds the maximum block count allowable for any one transfer. If it is determined that the block count is larger then the maximum allowable block count for a transfer, control transfers to step 568, wherein the local processor 122 limits the size of the current transfer to the maximum block count. Control transfers to step 570 wherein the local processor 122 creates a temporary block for the remainder of blocks. Control transfers to step 572, wherein the local processor 122 performs initial calculations required for the physical drive command including starting sector, number of cylinders required, heads required and length of request. The calculations performed by the local processor are directed toward the specific disk parameters, such as the initial cylinders and heads to be utilized. The following is an example of the type of calculations which may be performed. The variables referred to are the cylinder (cyl); the number of blocks to be transferred (temp_block_count); the sectors per each disk cylinder (sectors_per_cylinder) and the specific block address for which the request is being developed (block):

| | |
|---|---|
| cyl | = block/sectors_per_cylinder |
| temp_ulong | = block - (cyl * sectors_per_cylinder) |
| head | = temp_ulong/sectors_per_track |
| sector_start | = temp_ulong (head * |

Control transfers to step 574, wherein the local processor 122 determines whether the logical request is a PARITY_WRITE request. If the request is a PARITY_WRITE request, control transfers to step 576, wherein the local processor 122 initializes the request list by setting it to NULL. Control transfers to step 578. If it is determined in step 574 that the command is not a PARITY_WRITE request, control transfers to step 578. In step 578, the local processor 122 begins building the physical drive request by first allocating local memory for the data structure for the request. Control transfers to step 580, wherein the local processor 122 loads the block count, starting address, command type, offset and pointer to the logical parent request. Control transfers to step 582, wherein the local processor 122 allocates local memory for the drive request sequence structure placement in queue. Control transfers to step 584, wherein the local processor 122 determines whether the command is a MIRROR_WRITE. If a MIRROR_WRITE, control transfers to step 586, wherein the local processor 122 builds a second physical drive request and loads the drive request information into the structure and directs it to the mirrored drives. Control transfers to step 590.

If in step 584 it is determined that the command is not a MIRROR_WRITE, control transfers to step 588, wherein the local processor 122 sets the transfer buffer for a single block count as opposed to dual physical blocks. Control transfers to step 590. In step 590 the local processor 122 loads request header data from the transfer buffer. Control transfers to step 592, wherein the local processor 122 determines whether the current command is a MIRROR_WRITE. If the command is a MIRROR_WRITE, control transfers to step 594, wherein the local processor 122 allocates memory for the duplicate drive request and loads the request header information for the transfer buffer. Control transfers to step 595, wherein the local processor 122 sets the drive map to mirror the current drive and sets the sequence as a mirror pointer. Control transfers to step 596. In step 596, the local processor 122 calls the Schedule function to load the drive request into queue. Control transfers to step 597, wherein the local processor 122 offsets the logical base block count in the request. Control transfers to step 598 wherein the local processor determines whether there are additional blocks associated with this particular logical command or whether a temporary block was created in step 570. If yes, control transfers to step 564. If not, control transfers to step 599, which returns control to the calling program.

6. Standard Mapper

FIGS. 8A–8F are flow diagrams of the STANDARD_MAPPER method for distribution of data among the disk within the disk array. STANDARD_MAPPER is used to convert a logical request to a list of drive requests utilizing a standard interleave scheme specified in the GLOBAL RIS of the disk array. Operation begins at step 600. Control transfers to step 602, wherein the local processor 122 allocates local memory for the copying of GLOBAL RIS structure into local memory. Control transfers to step 604, wherein the local processor 122 loads the command, block start and block length data into the local structure. Control transfers to step 606, wherein the local processor 122 determines the number of individual requests required to transfer the logical request without violating maximum block size. This breaks up the logical request into smaller segments such that size of the physical requests will not exceed a predefined maximum size. This ensures that the system will not lockup as a result of any physical request requiring too much transfer buffer space. Control transfers to step 608, wherein the local processor 122 determines whether the command is a PARITY_WRITE request. If a PARITY_WRITE request, control transfers to step 610, wherein the local processor 122 increases the number of iterations required by one. Control then transfers to step 618.

If in step 608 it is determined that the command is not a PARITY_WRITE request, control transfers to step 612 wherein the local processor 122 calculates the number of drive headers that will be required to process the logical request to physical request. Control transfers to step 614, wherein the local processor 122 determines whether the command is a MIRROR_WRITE command. If yes, control transfers to step 616, wherein the local processor 122 doubles the number of drive headers to process the logical request to account for the mirror operations. Control transfers to step 618.

If in step 614 it is determined that the command is not a MIRROR_WRITE, control transfers to step 618, wherein the local processor 122 sets the logical offset base address equal to 0. Control transfers to step 620, wherein the local processor 122 determines whether the first logical request block exceeds the maximum size allowed for a physical request. If yes, control transfers to step 622, wherein the local processor 122 will transfer the maximum block count size for a particular iteration and control transfers to step 624. In step 624, the local processor 122 creates a temporary block for the remainder of the blocks not a part of the transfer. Control transfers to step 628. If in step 628 it is determined that the logical request does not exceed the maximum block count, control transfers to step 626. In step 626 the block count is loaded into a local structure. Control transfers to step 628, wherein the local processor 122 performs calculations to determine the starting sector, number of cylinders required, heads required and rows.

The calculations performed by STANDARD_MAPPER at this point in processing are directed toward the development of disk specific commands for all I/O commands and fault tolerance schemes. Thus, the parameters at this stage in the development of the drive request are identical for PARITY and MIRROR fault tolerance modes. The variables used in determining the initial disk parameters include the block address for the request (temp_block); the number of blocks to be transferred (temp_block_count); the number of drives which are available for data storage (user_drive_count); and the number of sectors per track on the disks within the array. These last two variables are determined from reading the GLOBAL RIS two variables are determined from reading the GLOBAL RIS information.

| | |
|---|---|
| last_block | = temp_block + block_count - 1 |
| first_row | = temp_block/user_drive_count |
| last_row | = last_block/user_drive_count |
| first_drive | = temp_block - (first_row * user_drive_count) |
| last_drive | = temp_block - (last_row * user_drive_count) |
| rows | = last_row - first_row + 1 |
| cylinder | = first_row - sectors_per_cylinder |
| temp_ulong | = first_row - (cylinder + sectors_per_cylinder) |
| head | = temp_ulong - sectors_per_track |
| sector_start | = temp_ulong - (head * sectors_per_track + 1)) |

These initial calculations are utilized to build the drive request for the particular information packet with the exception of PARITY_WRITE requests.

Control transfers to step 630, wherein the local processor 122 determines whether the command is a PARITY_WRITE request. If not a PARITY_WRITE request, control transfers to step 802. If a PARITY_WRITE request, control transfers to step 634, wherein the local processor 122 determines whether the number of rows calculated in step 628 is greater than 1. If not greater than 1, control transfers to step 636, wherein the local processor 122 sets the last head, sector start last, last cylinder information in the particular drive request equal to the current head, SECTOR_START and cylinder values.

If in step 634 it is determined that the number of rows is greater than 1, control transfers to step 638 wherein the local processor 122 calculates the lasts row, the last sector start, the last head and last cylinder for the request. Control transfers to step 640. In step 640 the local processor 122 allocates local memory for the PARITY_WRITE data structure. Control transfers to step 642, wherein the local processor 122 loads the PARITY_WRITE request header fields, including rows, sector start, cylinder, head and command information. Control transfers to step 644, wherein the local processor 122 allocates local memory for the drive request structure. Control transfers to step 646, wherein the local processor 122 loads the drive map buffer index, the row, drive I.D. and pointer information into the drive header. Control transfers to step 648, wherein the local processor 122 determines whether the first row is to be read on the current particular disk.

If not, control transfers to step 660. If yes, control transfers to step 650, wherein the local processor increments the request count by 1 and sets a flag indicating the first row on the disk is not to be written to. Control transfers to step 652, wherein the local processor 122 determines whether the command is a READ request. If not a READ request, control transfers to step 654, wherein the local processor 122 sets the READ pointer to the current request and allocates the local memory for the READ data structure. Control transfers to step 658. If in step 652 it is determined to be a READ request, control transfers to step 656, wherein the local processor 122 sets the READ drive request pointer to the next request in the request list and allocates local memory for the READ drive request data structure. Control transfers to step 658, wherein the local processor 122 loads the READ drive request data structure with the sector count, sector start, cylinder and logical request parent information. Control transfers to step 660, wherein the local processor 122 determines whether the last row on the current drive must be read. If not, control transfers to step 672.

If yes, control transfers to step 662, wherein the local processor 122 increments the request and read sequence counts. Control transfers to step 664, wherein the local processor 122 again determines whether the READ drive request flag is set to TRUE. If not set to TRUE, control transfers to step 666, wherein the local processor 122 sets the READ pointer to the current request and allocates local memory for the READ drive request data structure. Control transfers to step 670. If in step 664 it is determined that the READ request flag is set to TRUE, control transfers to step 668, wherein the local processor 122 sets the READ pointer to the next request in the command list and allocates the local memory for the READ drive request data structure. Control transfers to step 670.

In step 670 the local processor 122 loads the READ data structure. Control transfers to step 672, wherein the local processor 122 determines whether any rows are written to the current drive. If no rows are written to the current drive, control transfers to step 712. If rows on the current drive are to be written to, control transfers to step 674, wherein the local processor 122 increments the request count by 1. Control transfers to step 676, wherein the local processor 122 determines whether the current drive value is greater than or equal to the first drive. If not, control transfers to step 678, wherein the local processor 122 recalculates the logical block offset based on the number of user drives, the calculated first drive value, the number of the current drive value and the logical offset base. Control transfers to step 682. If in step 676 it is determined that the current drive value is greater than or equal to the first drive, control transfers to step 680, wherein the local processor 122 recalculates the logical block offset based on the current drive, the number of the calculated first drive and the logical offset base.

Control transfers to step 682, wherein the local processor 122 sets the logical block skip and increments the write sequence counter. Control transfers to step 684. In step 684 the local processor 122 determines whether the WRITE request flag is set to TRUE. If not set to TRUE, control transfers to step 688, wherein the local processor 122 sets the WRITE pointer to the current request and allocates local memory for the WRITE drive request data structure. Control transfers to step 690.

If in step 684 the WRITE request flag is set to TRUE, control transfers to step 686, wherein the local processor 122 sets the WRITE pointer to the next request in the request list and allocates local memory for the WRITE drive request data structure. Control transfers to step 690. In step 690 the local processor 122 sets the sector count equal to the number of rows to be written. Control transfers to step 692, wherein the local processor 122 determines whether the current WRITE request will write to the first row on the current disk. If yes, control transfers to step 694, wherein the local processor 122 sets the buffer offset equal to 0 and loads the physical command information into the WRITE drive request data structure. Control transfers to step 710. If it is determined in step 692 that the current request does not require a write to the first row of the current drive, control transfers to step 696, wherein the local processor 122 sets the WRITE pointer buffer offset equal to 1.

Control transfers to step 698, wherein the local processor 122 determines whether the sector count and sector start information to be used for the current block will exceed the physical number of sectors per track on the disk. If not, control transfers to step 708. If yes, control transfers to step 700, wherein the local processor 122 sets the sector start for the particular track equal to the first sector for that track. Control transfers to step 702, wherein the local processor 122 determines whether the write to the particular cylinder will exceed the current physical cylinder limits. If not, control transfers to step 706, wherein the local processor 122 sets the cylinder parameter to the current cylinder and advances the disk head selection to the next head following the current calculated head. Control transfers to step 710.

If in step 702 it is determined that the write to the current cylinder will exceed physical cylinder limits, control transfers to step 704, wherein the local processor 122 advances the cylinder selection to the next cylinder on the current disk. Control transfers to step 710. In step 708, the local processor 122 increments the current sector by one block and sets the head and cylinder parameters to the current head and cylinder information. Control transfers to step 710. In step 710 the local processor 122 sets the command to WRITE; sets the parent request pointer to the logical request; and sets the sequence to PARITY_WRITE. Control transfers to step 712. In step 712 the local processor 122 sets the drive request structure request count equal to the current request count. Control transfers to step 716, wherein the local processor 122 sets the next request pointer to NULL and the sequence count to the current value of the sequence count in the drive request data structure. Control transfers to step 718, wherein the local processor 122 determines whether the logical command is a PARITY_READ request.

If the next request is a PARITY_READ request, control transfers to step 720, wherein the local processor 122 initializes the next request pointer. Control transfers to step 722, wherein the local processor 122 sets a pointer to the next READ command. Control transfers to step 724, wherein the local processor determines if there are more read requests. If yes, control transfers back to step 722 until all read request are linked. Control transfers to step 726, wherein the local processor 122 sets the request list equal to the linked read request list. Control transfers to step 730.

If in step 718 it is determined that the command is not a PARITY_READ request, control transfers to step 728, wherein the local processor 122 sets the request list equal to the linked WRITE request. Control transfers to step 730. In step 730 the local processor 122 initializes the request list. Control transfers to step 734, wherein the local processor 122 determines whether the request starts on the first row of the current drive. If true, control transfers to step 736, wherein the calculated sector start information is copied into the local variable and the sector count and logical block offset are calculated and loaded into local variables. Control transfers to step 740.

If it is determined in step 734 that the request does not start on the first row of the drive, control transfers to step 738, wherein the local processor 122 offsets the sector start by one block, increases the number of rows and offsets the starting drive. Control transfers to step 740, wherein the local processor 122 determines whether the request list flag has been set to TRUE. If not set to TRUE, control transfers to step 744, wherein the local processor 122 sets the request list pointer to the current request and allocates local memory for the request. Control transfers to step 746. If in step 740 the request list flag is set to TRUE, control transfers to step 742 wherein the local processor 122 allocates local memory for a drive request data structure and links the current drive request to the next request. Control transfers to step 746, wherein the local processor 122 determines whether the disk map index is less than or equal to the last calculated drive. If not, control transfers to step 750, wherein the local processor 122 sets the sector count equal to the current temporary sector count minus one block. Control transfers to step 752. If the disk map index is less than or equal to the last calculated drive, control transfers to step 748, wherein the local processor 122 sets the sector count equal to the current temporary sector count.

Control transfers to step 752, wherein the local processor 122 determines whether the calculated sector start value is greater than the physical number of sectors for the disk within the array. If not, control transfers to step 762. If yes, control transfers to step 754, wherein the local processor 122 sets the sector start value to the first sector in the current track. Control transfers to step 756 wherein the local processor determines whether the request size exceeds the number of heads for the selected cylinder. If not, control transfers to step 760, wherein the local processor 122 sets the start sector value to the current start sector, cylinder and advances to the next head for the particular drive. Control transfers to step 764. If in step 756 it is determined that the request size exceeds the number of heads for the cylinder, control transfers to step 758, wherein the local processor 122 advances the current cylinder pointer to the next cylinder and the head pointer to the first head for that cylinder. Control transfers to step 764. In step 762 the local processor 122 sets the start sector equal to the current calculated values for the start sector, cylinder and head for the disk drive. Control transfers to step 764.

In step 764 the local processor loads the drive request data structure with the command type and any buffer offset. Control transfers to step 766, wherein the local processor 122 allocates local memory for the drive request header and creates a pointer to the drive request. Control transfers to step 768, wherein the local processor 122 initializes the drive sequence request and loads the current drive number into the drive request data structure. Control transfers to step 770, wherein the local processor 122 determines whether the command is a MIRROR_WRITE request. If a MIRROR_WRITE request control transfers to step 772 which allocates memory for a twin drive request and loads the drive request data structure for the mirror request. The local processor 122 will load a parameter showing that the drive request is directed to the mirror bank of drives. Control transfers to step 776.

If in step 770 it is determined that the command is not a MIRROR_WRITE request, control transfers to step 774 which allocates local memory for the transfer buffer and loads sector count, disk I.D., block offset, user drive count, and request count into the drive request data structure. Control transfers to step 776. In step 776 the local processor determines whether the MIRROR_WRITE flag has been set to TRUE. If set to TRUE, control transfers to step 782, wherein the local processor 122 allocates memory for the current request in the mirror request list. If not set to TRUE, control transfers to step 778, wherein, the local processor 122 initializes the sequence counter, mirror list and request list. Control transfers to step 780, wherein the mirror list pointer is set to the next request and allocates local memory for the drive request data structure. Control transfers to step 784. Following execution of step 782 control transfers to step 784. In step 784 the local processor 122 loads the request structure with information relating to the parent logical request, the drive count, command and sets the pointer to the next request in the list. Control transfers to step 786, wherein the local processor 122 determines whether there are additional request blocks associated with the particular command request.

If yes, control transfers to step 776 and all blocks are read in until the command request has been completely loaded. If there are no additional blocks, control transfers to step 788, wherein the local processor 122 sets the logical request pointer to the absolute drive request in the drive map. Control transfers to step 790, wherein the local processor 122 determines whether there are any additional requests.

If there are additional requests, control transfers to step 792, wherein the local processor 122 increments the request list pointer and control transfers back to step 788, wherein the local processor 122 continues to loop until all requests associated with this particular command list are read in and linked.

If there are no more requests, control transfers to step 794, wherein the local processor 122 determines whether the commands are mirror request. If not a mirrored request, control transfers to step 802. If a mirrored request, control transfers to step 796, wherein the local processor 122 creates a pointer which links the current drive request back to its logical parent. Control transfers to step 798, wherein the local processor 122 determines if there are additional requests. If yes, control transfers to step 800, wherein the local processor 122 sets the request list pointer to the next request in the list and control transfers back to step 796. The local processor 122 will continue to loop until the entire request is read in. If there are no more drive requests, control transfers to step 802, wherein the local processor 122 calls the SCHEDULE function and offsets the logical block address. Control transfers to step 804 wherein the local processor 122 determines if there are additional request blocks to be read. If yes, control transfers to step 608. If not, control transfers to step 806 which terminates the STANDARD_MAPPER operation and returns control to the calling program.

7. Scheduler

Figure 13:
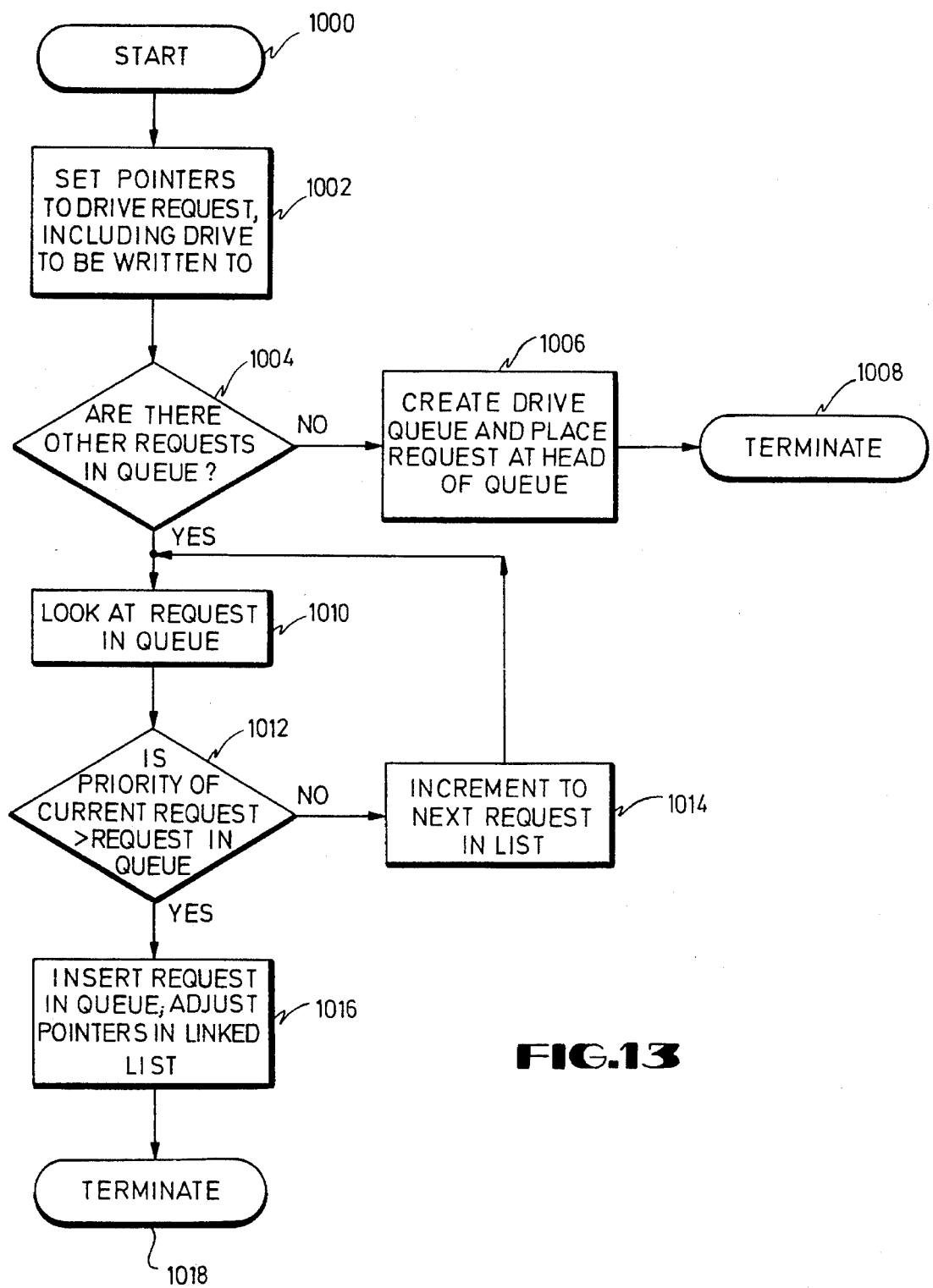
FIG. 13 is a flow diagram of the manner in which the preferred embodiment schedules physical drive requests.

FIG. 13 is a flow diagram of the manner in which the present invention schedules drive requests. Operation begins in step 1000. Control transfers to step 1002, wherein the local processor 122 sets pointers to the current drive request including the drive to be written or read. Control transfers to step 1004, wherein the local processor 122 determines whether there are other requests in a drive scheduling queue. If not, control transfers to step 1006 wherein the local processor 122 creates a drive queue and places the current drive request at the head of the drive queue. Control transfers to step 1008 which returns to the calling program. If in step 1004 it is determined there are other drive requests in a queue, control transfers to step 1010, wherein the local processor 122 examines the drive request at the head of the queue. Control transfers to step 1012, wherein the local processor determines whether the priority of the current request is greater than the request being examined in the request queue. If not, control transfers to step 1014 which increments to the next request in the drive request queue. Control then transfers to step 1010. In step 1012, the local processor 122 determines whether the current request has a higher priority then the request in the queue being examined. If the local processor 122 determines that the current drive request has a higher priority, control transfers to step 1016 which inserts the request in the queue and adjusts the pointers to maintain the length list of schedule request. Control transfers to step 1018 which returns to the calling program. In this manner, in the current invention will examine all drive requests within the queue and place the current request in a prioritized FIFO queue. If current request priority exceeds a request already in the queue's priority, the current request inserted into the queue at that position and pointers are adjusted to maintain a linked list. If the current request priority is not greater than any of the requests currently in queue, the current request is placed at the end of the queue.

While not set forth in FIG. 13, the local processor 122 acts upon the queued requests and forwards the specific requests to the TCC 124 for disk read/write or parity check operations. The specific request is then removed from the queue and the queue pointer is advanced to the next disk request.

8. Check Drive

Figure 14:
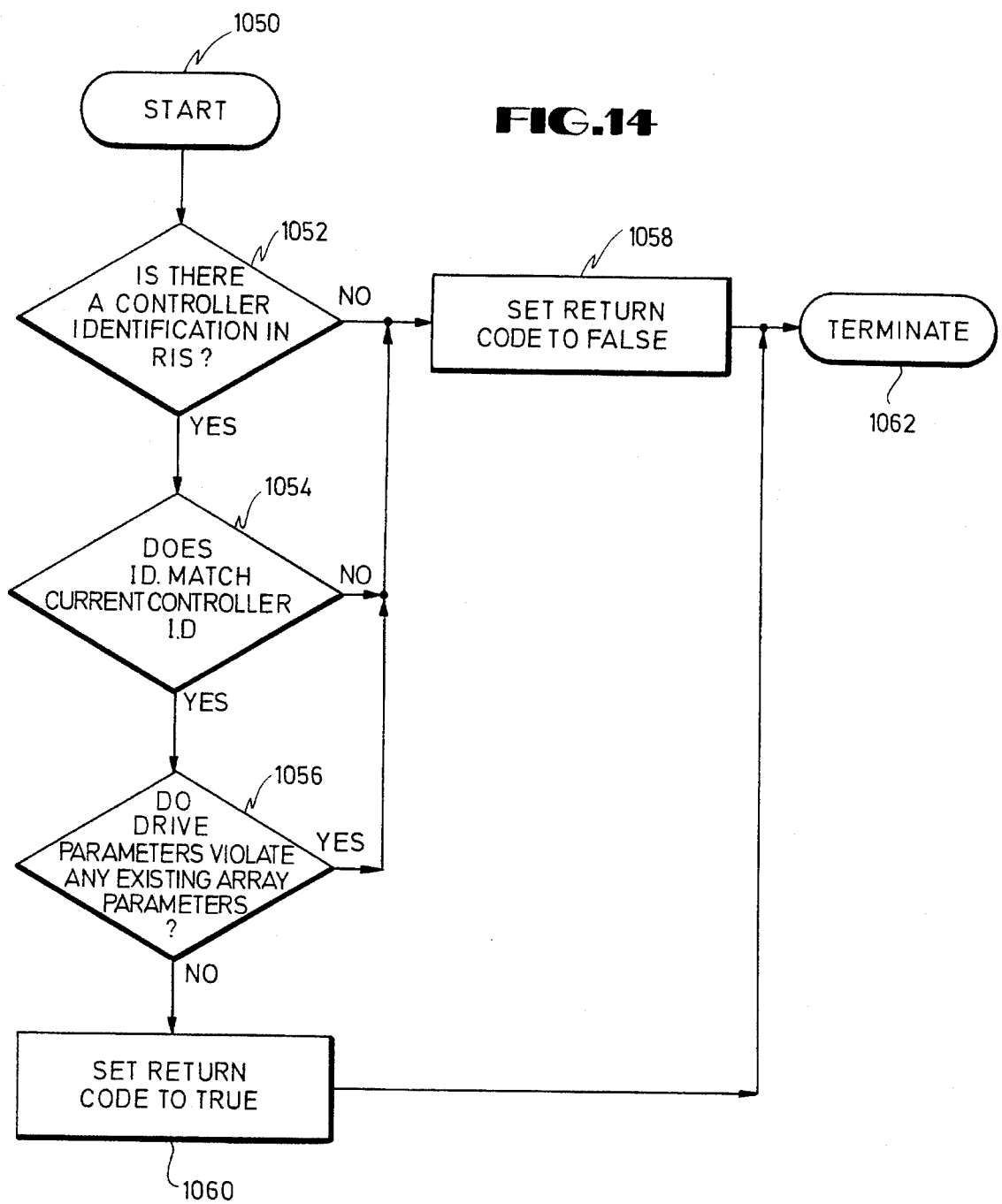
FIG. 14 is a flow diagram of the manner in which the preferred embodiment determines whether the reserved information sectors on a particular disk are valid.
Figure 15:
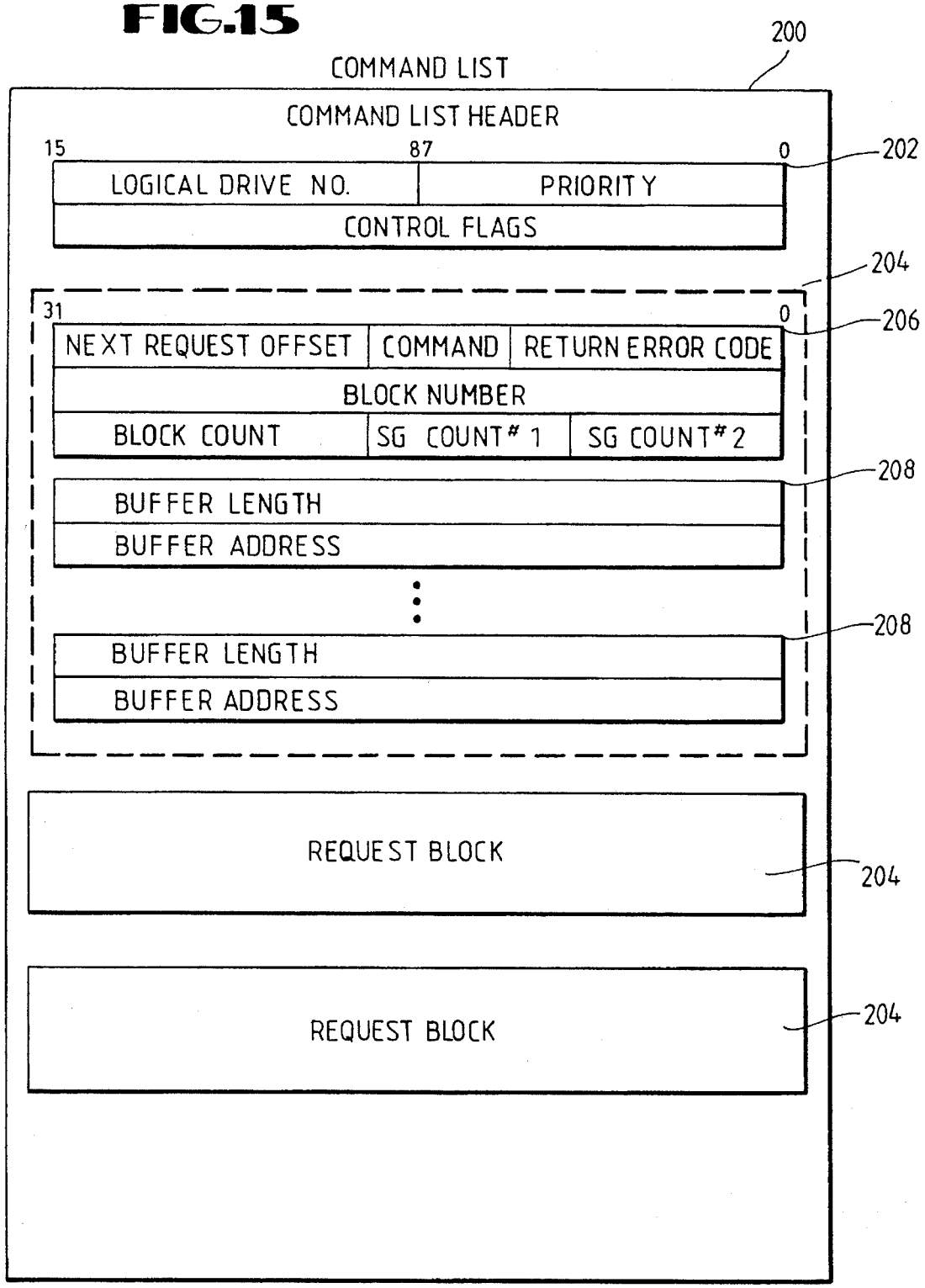
FIG. 15 is a schematic block diagram depicting a command list, including command list header and request blocks.

FIG. 14 is a flow diagram of the manner in which the preferred embodiment determines whether the RIS sectors for a particular drive are valid. Operation begins at step 1050. Control transfers to step 1052, wherein the local processor 122 determines if the RIS data structure for a given drive includes the proper controller identification or signature. This is done by comparing the drive RIS structure with the GLOBAL RIS structure. If not, control transfers to step 1058, wherein the local processor 122 sets a return code of FALSE and control transfers to step 1062, which returns to the calling program. If there is a controller identification or signature in the RIS data structure for the drive, control transfers to step 1054, wherein the local processor 122 determines whether the signature matches the current controller signature and RIS version number. If not, control transfers to step 1058. If the signature matches, control transfers to step 1056, wherein the local processor determines whether drive parameters within the drive RIS data structure violate any logical unit limits parameters as set forth in the GLOBAL RIS. If yes, control transfers to step 1058. If not, control transfers to step 1060 and the local processor sets a return code equal to TRUE. Control then transfers to step 1062 which returns to the calling program.

9. All Consistent Module

Figure 10:
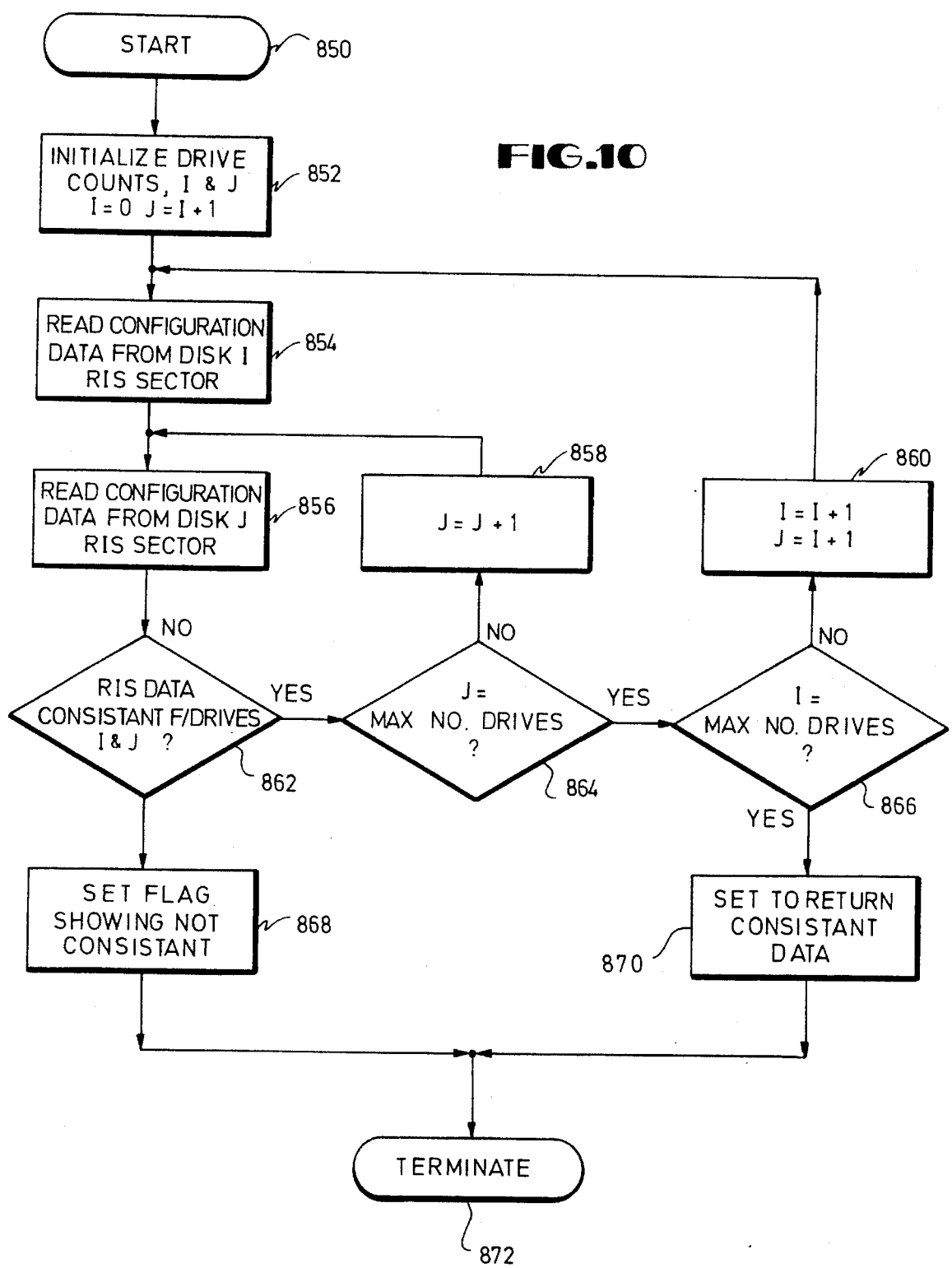
FIG. 10 is a flow diagram of a function in which the preferred embodiment determines whether all drives within the disk array have consistent drive parameter information.

FIG. 10 is a flow diagram of the manner in which the preferred embodiment determines whether all RIS sectors for disks within the array are consistent. In determining whether all drives are consistent, the local processor 122 will read the RIS sectors for the first drive in the drive map, excluding the drive I.D., and compare the information therein with the corresponding RIS sectors for the second, third, etc. drives until it has compared the first disk to all others in the array. The local processor 122 will advance to the second drive and compare its RIS sectors with all subsequent drives in the array. This will continue until it is determined that all drives are consistent or the module determines an inconsistency exists. Operation begins at step 850. Control transfers to step 852, wherein the local processor 122 initializes drive count variables. Control transfers to step 854, wherein the local processor 122 reads the configuration data from a disk RIS sector (Drive I). Control transfers to step 856, wherein the local processor 122 reads the configuration data from the RIS sectors of the next disk in the drive map (Drive J). Control transfers to step 862, wherein the local processor 122 determines whether the RIS data for drives I and J are consistent. If not consistent, control transfers to step 868, wherein the local processor 122 sets a flag indicating that the drives are not consistent. Control thereafter transfers to step 872, which returns to the calling program. If the RIS data is consistent for drives I and J, control transfers to step 864 wherein the local processor 122 determines whether J is equal to the maximum number of drives the array. If not equal to the maximum number of drives in the array, control transfers to step 858, wherein the local processor 122 increments the J counter and control thereafter transfers to step 856 in this manner the program will read the first disk and compare RIS data from the first disk with the RIS data from all other drives. If J is equal to the maximum number of drives, control transfers to step 866, wherein the local processor 122 determines whether I is equal to the maximum number of drives in the disk array. If I is not equal to the maximum number of drives in the disk array, control transfers to step 860 wherein I is set equal to I+1 and J is equal to I+1. Control transfers to step 854. If I is equal to the maximum number of drives, control transfers to step 870 which sets a flag indicating that all RIS disk sectors are consistent. Control transfers to step 872 which returns to the calling program.

10. Consistent Module

Figure 11:
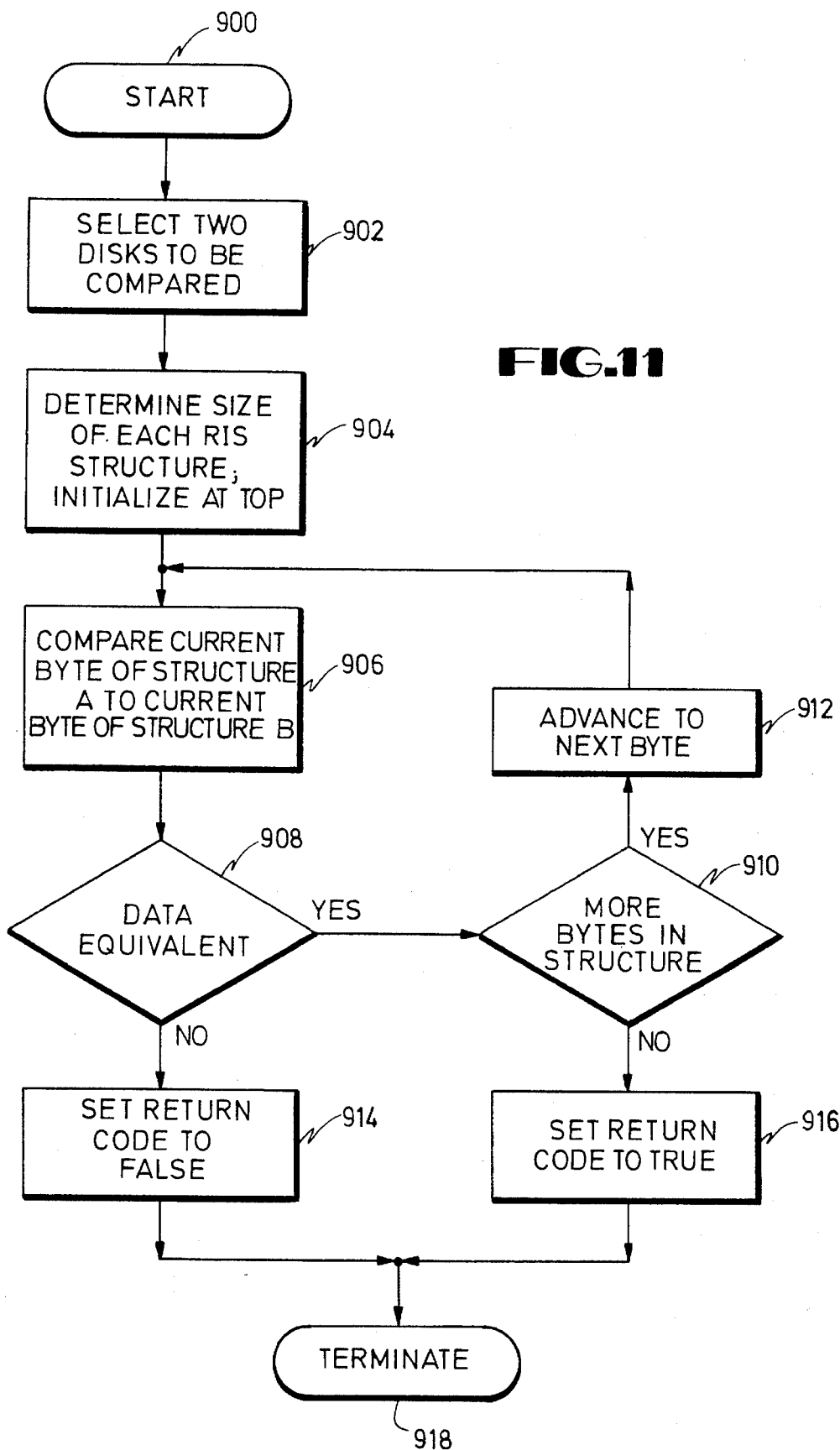
FIG. 11 is a flow diagram of a function in which the preferred embodiment determines whether two individual drives have consistent drive parameter information.

FIG. 11 is a flow diagram setting forth how the present invention determines whether the RIS data sectors for two disks are consistent with each other by comparing certain drive parameters. Operations begins in step 900. Control transfers to step 902 wherein the local processor 122 is passed information identifying the two disks drives in the array to be compared. Control transfers to step 904, wherein the local processor 122 determines the size of each of the RIS structures to be compared. A pointer for each of the disk RIS structures is initialized such that the local processor 122 will begin with the first byte of each RIS structure. Control transfers to step 906, wherein the local processor 122 compares the current byte of RIS structure for the first disk structure A to the current byte of RIS structure for the second disk structure B. Control transfers to step 908, wherein the local processor 122 determines whether the bytes are equivalent. If equivalent, control transfers to step 910, wherein the local processor 122 determines whether there are additional bytes in each of the data structures. If yes, control transfers to step 912, wherein the local processor 122 advances the pointer to the next byte in the respective RIS structures. Control then transfers to step 906. If in step 908 it is determined that the data contained within the current bytes of both structures A and B are not equivalent, control transfers to step 914 which sets a return code of FALSE and control transfers to step 918, which returns to the calling program. In step 910 if it is determined that there are no more bytes in the RIS structures of the two disks being compared, control transfers to step 916, wherein the local processor 122 sets a return code of TRUE and control transfers to step 918 which returns to the calling program. In this manner the present invention will check each byte in the two selected disk arrays a byte at a time until an inconsistency is found or the structures are found to be identical.

11. VOTE

Figure 12:
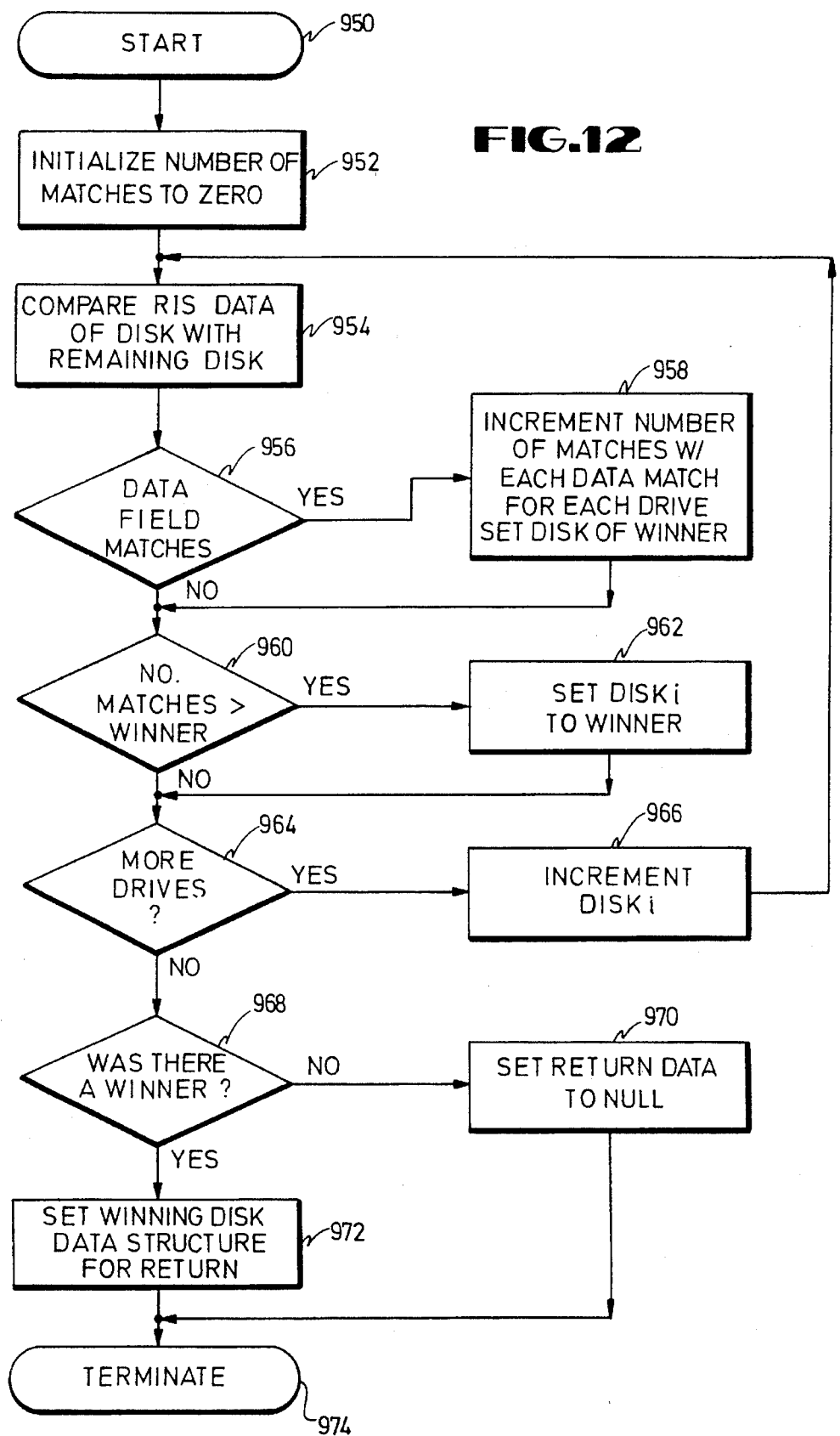
FIG. 12 is a flow diagram of the manner in which the preferred embodiment determines which of the drives within the array contains valid array configuration information.

FIG. 12 is a flow diagram of the VOTE function by which the present invention determines which of any number of valid RIS configurations which may exist on a disk is to be used as a templet for configuring the entire disk array. Operation begins at step 950. Control transfers to step 952 which initializes the winner pointer to NULL and the number of matches to 0. Control transfers to step 954, wherein the local processor 122 compares the RIS data for the current disk (Disk I) with all remaining disks. Control transfers to step 956, wherein the local processor 122 determines whether the data field within the RIS structure for disk I matches the corresponding data fields in the remaining disk RIS structures. If a match exists, control transfers to step 958 which increments the number of matches with which each data match for each drive within the disk array. Upon finding the first match, the first drive is declared a temporary winner. Control transfers to step 960. If there are no further data field matches in step 956, control transfers to step 960, wherein the local processor 122 determines whether the number of matches for the current disk being examined exceeds the number of matches determined for the disk currently designated as a winner. If yes, control transfers to step 962, wherein the local processor 122 sets the current disk equal to the winner. Control transfers to step 964. In step 964 the local processor 122 determines whether there are additional drives to be examined in voting. If yes, control transfers to step 966 which increments the current disk to the next disk within the array. Control transfers to step 954. The local processor 122 will continue to loop between step 954 and 964 until all drive RIS structure have been examined and the drive with the most data matches is designated as a winner or in the case of no matches in the RIS sector of the disk there is no winner. If in step 964 it is determined there are no further drives in the array, control transfers to step 968, wherein the local processor 122 determines whether there has been a winner. If there is no winner, control transfers to step 970, wherein the local processor 122 sets a return data to null. Control then transfers to step 974 which returns to the calling program. If in step 968 the local processor 122 determines that there is a winner, control transfers to step 972, wherein the winning disk data structure is flagged as the data structure template for return. Control transfers to step 974 which returns to the calling program.

V. Conclusion

It will be appreciated that the preferred embodiment will enhance system processor operations by offloading the creations of disk specific commands to the local processor. The queueing and execution of the disk requests, as well as managing the transfer of data by the disk controller 112, permits a more efficient use of the system processor 20.

The foregoing disclosure and description of the invention are illustrative and explanatory thereof, and various changes in the size, shape, materials, components, circuitry, wiring connections and contacts, as well as in the details of the illustrated circuitry, construction and method of operation may be made without departing from the spirit of the invention.

We claim:

1. For use with a computer system having an intelligent mass storage disk array subsystem, the disk array subsystem including a plurality of disks and a microprocessor based disk array controller, a method for controlling disk access operations within the disk array comprising:

determining a disk array configuration and a selectable data distribution scheme for the particular computer system and disk array configuration, said data distribution scheme including a logical address to physical address mapping scheme and a fault tolerance mode;

the computer system generating a logical disk access request and sending said logical disk access request to the disk array controller;

the disk array controller receiving said logical disk access request;

the disk array controller creating at least one disk drive specific access command from said logical disk access request;

the disk array controller developing said disk drive specific access command by calculating physical drive parameters including disk drive cylinder, head and sector information to be used to access at least one disk drive within the disk array in response to said logical disk access request, the calculation of said physical drive parameters based on said disk array configuration and said data distribution scheme, the disk array controller loading said physical drive parameters into said disk drive specific access command after completing the calculation; and the disk array controller queuing said disk drive specific access command for execution by the disk array controller.

2. The method of claim 1, wherein said logical to physical mapping scheme of said data distribution scheme is a direct logical to physical mapping technique and wherein the step of the disk array controller calculating physical drive parameters includes calculating said physical parameters based upon said direct logical to physical address mapping technique.

3. The method of claim 1, wherein said logical to physical mapping scheme of said data distribution scheme includes a disk drive interleave technique and wherein the step of the disk array controller calculating physical drive parameters includes calculating said physical parameters based upon said disk drive interleave technique.

4. The method of claim 1, wherein said logical to physical mapping scheme of said data distribution scheme includes a multi-sector disk drive interleave technique and wherein the step of the disk array controller calculating physical drive parameters includes calculating said physical parameters based upon said multi-sector disk drive interleave technique.

5. The method of claim 1, wherein the step of the disk array controller calculating physical drive parameters includes:

the disk array controller reading disk array and disk specific information from reserved sectors on disk drives within the disk array, said information describing the disk array operating mode and all disk drives within the disk array; and the disk array controller calculating disk sector information for disk sectors to be accessed by said disk specific access command according to said disk array and disk specific information.

6. The method of claim 5, wherein the step of the disk array controller creating at least one disk drive specific access command includes:

the disk array controller allocating memory within the disk array controller for the development of a disk specific access command structure;

the disk array controller loading said calculated disk sector information into said disk specific access command structure; and the disk array controller loading information from said logical disk access request into said disk specific access command structure.

7. For use with a computer system having an intelligent mass storage disk array subsystem, the disk array subsystem including a plurality of disks and a microprocessor based disk array controller, a method for controlling disk access operations within the disk array comprising:

the disk array controller determining a disk array configuration and a data distribution scheme for the particular computer system and disk array configuration;

the computer system generating a logical disk access request and sending said logical disk access request to the disk array controller;

the disk array controller receiving said logical disk access request;

the disk array controller creating at least two disk drive specific access commands from said logical disk access request;

the disk array controller developing said disk drive specific access command by calculating physical drive parameters including disk drive cylinder, head and sector information to be used to access at least two disk drives within the disk array in response to said logical disk access request, the calculation of said physical drive parameters based on said disk array configuration and said data distribution scheme, the disk array controller loading said physical drive parameters into said disk drive specific access command after completing the calculation; and the disk array controller queuing said disk drive specific access command for execution by the disk array controller.

8. The method of claim 7, wherein said data distribution scheme is based on the disk array fault tolerance mode.

9. The method of claim 7, wherein said data distribution scheme includes a direct logical to physical address mapping technique and wherein the step of the disk array controller calculating physical drive parameters includes calculating said physical parameters based upon said direct logical to physical address mapping technique.

10. The method of claim 7, wherein said data distribution scheme includes a disk drive interleave technique and wherein the step of the disk array controller calculating physical drive parameters includes calculating said physical parameters based upon said disk drive interleave technique.

11. The method of claim 7, wherein said data distribution scheme includes a multi-sector disk drive interleave technique and wherein the step of the disk array controller calculating physical drive parameters includes calculating said physical parameters based upon said multi-sector disk drive interleave technique.

* * * * *